United States Patent [19]
Maruoka et al.

[11] Patent Number: 5,765,005
[45] Date of Patent: Jun. 9, 1998

[54] METHOD FOR PREPARING FORM

[75] Inventors: Tetsuya Maruoka; Tetsuya Masuishi, both of Sagamihara; Kohichi Shimazaki, Yokohama; Yoshimasa Kanamori, Ishikawa-ken; Nobuo Takahashi, Fujisawa, all of Japan

[73] Assignees: Hitachi, Ltd., Tokyo; Hitachi Software Engineering Co., Ltd., Naka-ku, both of Japan

[21] Appl. No.: 67,667

[22] Filed: May 26, 1993

[30] Foreign Application Priority Data

Jun. 1, 1992 [JP] Japan ................................ 4-140263
Oct. 12, 1992 [JP] Japan ................................ 4-272666

[51] Int. Cl.$^6$ ................................................ G06T 1/00
[52] U.S. Cl. ............................................................ 395/766
[58] Field of Search ............................ 395/148, 146, 395/147, 149, 153, 155, 157, 600, 764–770, 601–615

[56] References Cited

U.S. PATENT DOCUMENTS

| | | | |
|---|---|---|---|
| 4,520,457 | 5/1985 | Hagler et al. | 395/770 X |
| 4,980,841 | 12/1990 | Sugitani | 395/771 |
| 5,089,985 | 2/1992 | Chang et al. | 395/600 |
| 5,105,365 | 4/1992 | McDaniel et al. | 364/496 |
| 5,157,767 | 10/1992 | Nihei | 395/769 |
| 5,175,810 | 12/1992 | Young et al. | 395/770 |
| 5,241,648 | 8/1993 | Cheng et al. | 395/600 |
| 5,355,505 | 10/1994 | Suzuki | 395/800 |
| 5,359,729 | 10/1994 | Yarnell et al. | 395/600 |
| 5,379,372 | 1/1995 | Wu | 395/770 X |
| 5,396,621 | 3/1995 | MacGregor et al. | 395/161 |
| 5,544,296 | 8/1996 | Mineo | 395/771 |

OTHER PUBLICATIONS

Lotus User's Guide for Lotus 1-2-3 for Windows, Release 1.0, pp. 73–86, 1991.

"Wordperfect for Windows", Apr. 30, 1992, Figures 1–5.

"Databox II" Manual, pp. 280–283. (Previously provided to PTO) (Partial English translation attached).

"KIRI Version 3" Manual, pp. 290–292 and 301–303. (Previously provided to PTO) (Partial English translation attached).

*Primary Examiner*—Joseph H. Feild
*Attorney, Agent, or Firm*—Fay Sharpe Beall Fagan Minnich & McKee

[57] ABSTRACT

With employment of a computer, table format data is arranged to produce a desirable form in accordance with the following sequential operation. The designated data table is displayed on a relational table display window, and a base record is set with respect to the relational table on this window. An arranging display window is produced, and an allocation and an initialization of a memory region are performed. A basic portion of the form is created by arranging the data from the relational data to the arranging display window. Furthermore, repeating data among the arranged data is designated, and then a repeating parameter for designating the sort of repeating process and also the display position during the repeating representation are inputted, and thereafter the repeating process is applied to the designated data based upon these parameter and display position, whereby a form is created. Furthermore, based upon the form arranging data table, the relational format table data containing such a specific column data as a total and an average is displayed on a display screen. A designation is made of the column whose layout is changed on the screen, the table data corresponding to the designated column is discriminated, and then the data whose layout should be updated is stored into the specific data arranging data table so as to be separately managed.

4 Claims, 50 Drawing Sheets

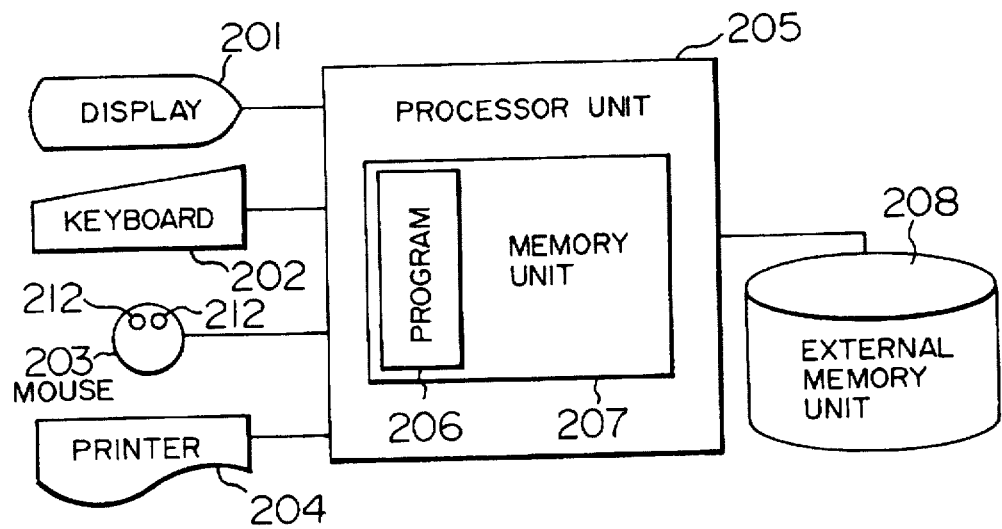

FIG. 5
TABLE TITLE: INCOME LIST
| FIELD NUMBER / RECORD NUMBER | 1 | 2 | 3 | 4 | 5 |
|---|---|---|---|---|---|
| | EMPLOYEE'S ID NUMBER | EMPLOYEE'S NAME | LIVING-OUT HOURS | YEARLY INCOME OF '89 | YEARLY INCOME OF '90 |
| 1 | 14521 | TETSUYA MARUOKA | 1:00 | 4,000,000 | 4,500,000 |
| 2 | 18386 | SINSAKU SAKAMOTO | 0:45 | 8,000,000 | 8,800,000 |
| 3 | 24062 | TAKAMORI TAKASUGI | 1:30 | 7,800,000 | 8,200,000 |
| 4 | 31069 | KOGORO SAIGO | 2:00 | 6,300,000 | 6,900,000 |
| 5 | | | | | |
FIG. 6
FIRST FIELD NUMBER ON THE RELATIONAL TABLE WINDOW 
FIRST RECORD NUMBER ON THE RELATIONAL TABLE WINDOW 
TOP BASE RECORD NUMBER 
BASE RECORD WIDTH 

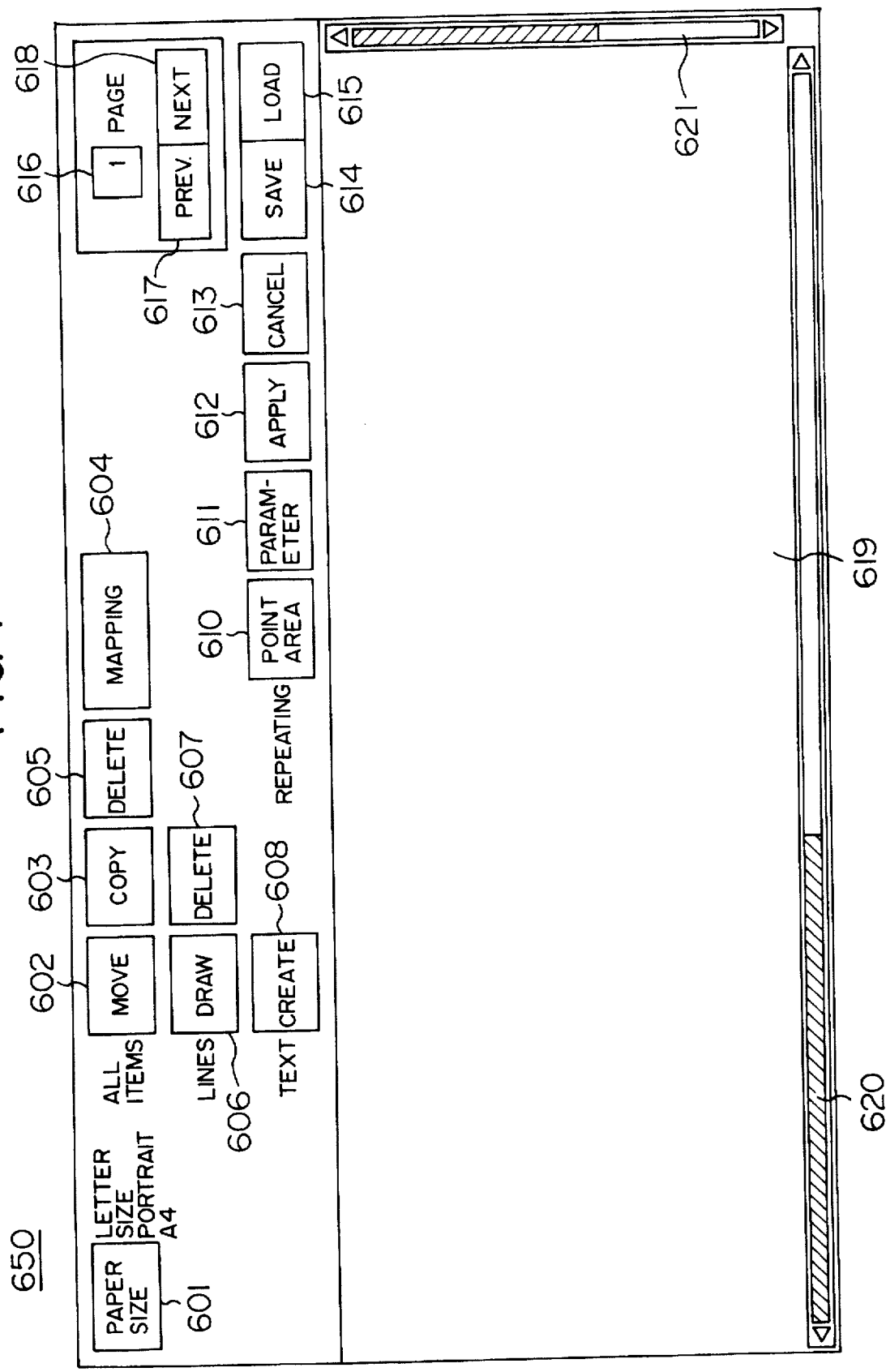

FIG. 8

700 PAPER SIZE DATA AREA

| | | |
|---|---|---|
| SORT OF PAPER | LETTER SIZE PORTRAIT A4 | 701 |
| WIDTH SIZE | 700 | 702 |
| HEIGHT SIZE | 1100 | 703 |
| USING PAGE | 1 | 704 |
| POINTER TO REPEATING DATA AREA | (ADDRESS VALUE ON MEMORY) | 705 |

FIG. 9

800 REPEATING DATA AREA

| | | |
|---|---|---|
| RELATIONAL TABLE NAME | INCOME LIST | 801 |
| UPPER LEFT X-COORDINATE OF REPEATED AREA | 30 | 802 |
| UPPER LEFT Y-COORDINATE OF REPEATED AREA | 30 | 803 |
| LOWER RIGHT X-COORDINATE OF REPEATED AREA | 110 | 804 |
| LOWER RIGHT Y-COORDINATE OF REPEATED AREA | 60 | 805 |
| Y-COORDINATE OF REPEATING POSITION A | 30 | 806 |
| X-COORDINATE OF REPEATING POSITION B | 55 | 807 |
| X-COORDINATE OF REPEATING POSITION C | | 808 |
| REPEATING NUMBER IN Y-AXIS DIRECTION | | 809 |
| REPEATING NUMBER IN X-AXIS DIRECTION | | 810 |
| REPEATING NUMBER IN BRICKS | | 811 |
| REPEATING TYPE | SIMPLE REPEATING | 812 |
| TOP NUMBER OF BASE RECORD | | 813 |
| WIDTH OF BASE RECORD | | 814 |
| POINTER TO ITEM DATA AREA | (ADDRESS ON MEMORY) | 815 |
| POINTER TO NEXT REPEATING DATA AREA | (ADDRESS ON MEMORY) | 816 |

FIG. 10

900 ITEM DATA AREA

| Field | Value | Ref |
|---|---|---|
| UPPER LEFT X-COORDINATE OF ITEM ARRANGEMENT POSITION | 33 | 901 |
| UPPER LEFT Y-COORDINATE OF ITEM ARRANGEMENT POSITION | 58 | 902 |
| LOWER RIGHT X-COORDINATE OF ITEM ARRANGEMENT POSITION | 233 | 903 |
| LOWER RIGHT Y-COORDINATE OF ITEM ARRANGEMENT POSITION | 83 | 904 |
| ITEM TYPE | MAPPING | 905 |
| MAPPING FAELD NAME OR TEXT | YEARLY IMCOME OF '89 | 906 |
| MAPPING RECORD NUMBER | 0 | 907 |
| CHARACTER SIZE OR LINE TYPE | MIDDLE CHARACTER | 908 |
| REPEATED TARGET FLAG | ON | 909 |
| ITEM ID | 23 | 910 |
| POINTER TO NEXT ITEM DATA AREA | (ADDRESS ON MEMORY) | 911 |

F I G. 13
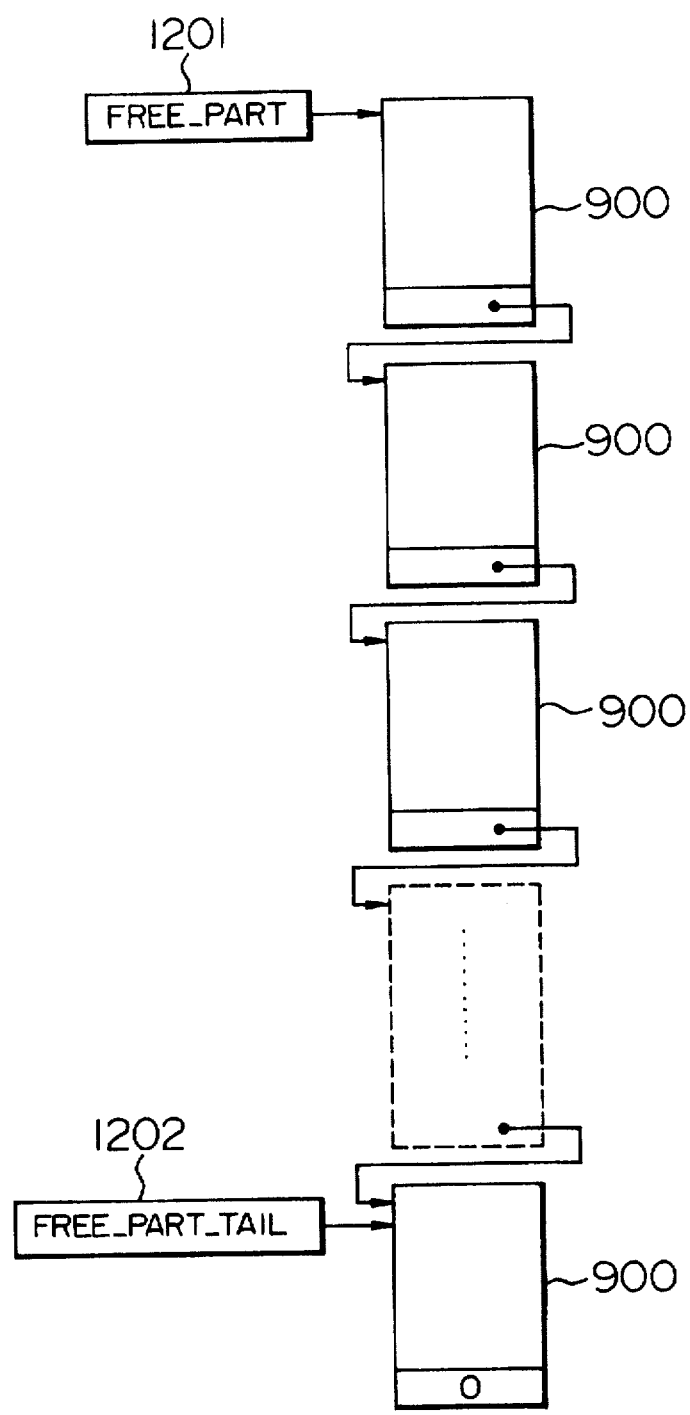

FIG. 20

| MENU IDENTIFIER | MENU STRING | UPPER LEFT X-COORDINATE | UPPER LEFT Y-COORDINATE | LOWER RIGHT X-COORDINATE | LOWER RIGHT Y-COORDINATE |
|---|---|---|---|---|---|
| 1 | PAPER SIZE | 20 | 10 | 150 | 35 |
| 2 | MOVE | 220 | 10 | 270 | 35 |
| 3 | COPY | 280 | 10 | 330 | 35 |
| 4 | ERASE | 340 | 10 | 390 | 35 |
| ............ | | | | | |

FIG. 28

| EMPLOYEE'S NAME (EMPLOYEE'S NUMBER) | YEARLY INCOME OF '90 |
|---|---|
| TETSUYA MARUOKA (14521) | 4,500,000 |
| SINSAKU SAKAMOTO (18386) | 8,800,000 |
| TAKAMORI TAKASUGI (24062) | 8,200,000 |

LIST OF YEARLY INCOME OF '90

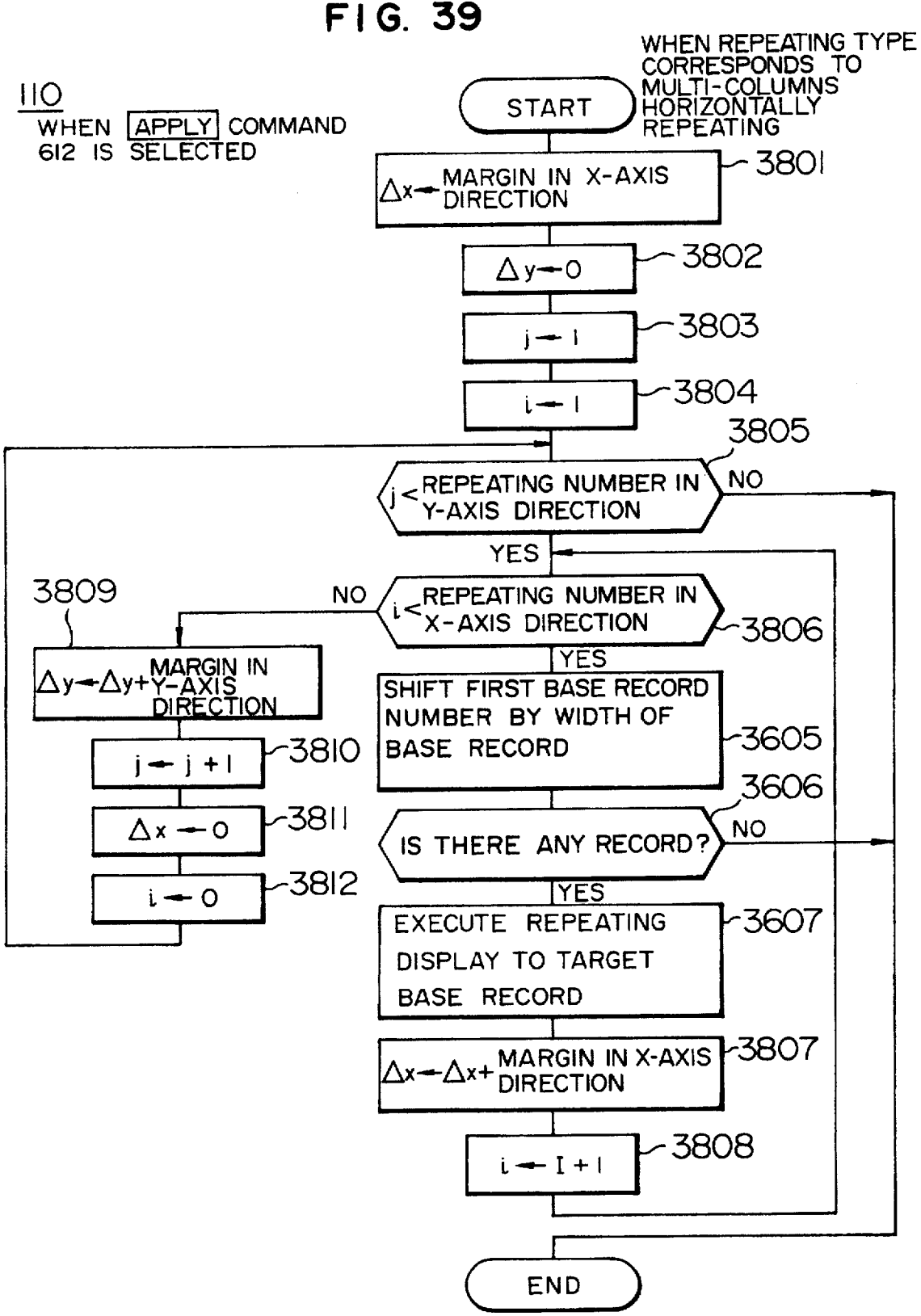

FIG. 40

110
WHEN [APPLY] COMMAND 612 IS SELECTED

START — WHEN REPEATING TYPE CORRESPONDS TO REPEATING BRICKS

- 3901: $\Delta z \leftarrow$ MARGIN IN BRICK
- 3902: $\Delta x \leftarrow 0$, $\Delta y \leftarrow 0$
- 3903: $k \leftarrow 1$
- 3904: $i \leftarrow 0$, $j \leftarrow 0$
- 3905: $j <$ REPEATING NUMBER IN Y-AXIS DIRECTING — NO → END
- YES
- 3906: $i <$ REPEATING NUMBER IN X-AXIS DIRECTION — NO
- YES
- 3907: REPEATING NUMBER IN BRICK — NO
- 3905: SHIFT BASE RECORD
- 3906: IS THERE ANY RECORD — NO
- YES
- 3916: EXECUTE REPEATING DISPLAY
- 3908: $\Delta z \leftarrow \Delta z +$ MARGIN IN BRICK
- 3909: $k \leftarrow k + 1$
- 3910: $k \leftarrow 0$, $\Delta z \leftarrow 0$
- 3911: $\Delta x \leftarrow \Delta x +$ MARGIN IN X-AXIS DIRECTION
- 3912: $i \leftarrow i + 1$
- 3913: $\Delta y \leftarrow \Delta y +$ MARGIN IN Y-AXIS DIRECTION
- 3914: $j \leftarrow j + 1$
- 3915: $\Delta x \leftarrow 0$, $i \leftarrow 0$

F I G. 44

350 RELATIONAL FORMAT TABLE DATA

| SALES FLOOR | GOODS | TURNOVER | PROFIT | QUANTITY | RECORD TYPE |
|---|---|---|---|---|---|
| 1F | TELEVISION | 400,000 | 40,000 | 4 | 0 |
| 1F | RADIO | 30,000 | 2,000 | 3 | 0 |
| 1F | TELEPHONE | 200,000 | 25,000 | 4 | 0 |
| 1F | SUBTOTAL | 630,000 | 67,000 | 11 | 1 |
| 2F | AIR CONDITIONER | 440,000 | 42,000 | 2 | 0 |
| 2F | FAN | 60,000 | 5,500 | 5 | 0 |
| 2F | SUBTOTAL | 500,000 | 47,500 | 7 | 1 |
|  | TOTAL | 1,130,000 | 114,500 | 18 | 2 |

321 322 323 324 325 326

330 { 331 { 332 { 333 {

F I G. 45

450 FORM ARRANGING DATA TABLE

| | |
|---|---|
| RECORD TYPE | 0 |
| INTERNAL | 20 |

411
412

| NUMBER | TYPE | SIZE | X0 | Y0 | X1 | Y1 | REPEAT | CHARACTER SERIES/ITEM NAME |
|---|---|---|---|---|---|---|---|---|
| 1 | LINE | NARROW | 20 | 70 | 215 | 70 | ON | |
| 2 | TEXT CHARACTER | LARGE | 80 | 7 | 165 | 23 | OFF | TURNOVER LIST |
| 3 | VARIABLE CHARACTER | MEDIUM | 20 | 50 | 60 | 70 | ON | SALES FLOOR |
| ... | | | | | | | | |

TURNOVER LIST

| SALES FLOOR | GOODS | TURNOVER | PROFIT | QUANTITY |
|---|---|---|---|---|
| 1 F | TELEVISION | 400,000 | 40,000 | 4 |
| 1 F | RADIO | 30,000 | 2,000 | 3 |
| 1 F | TELEPHONE | 200,000 | 25,000 | 4 |
| 1 F | TOTAL | 630,000 | 67,000 | 11 |
| 2 F | AIR CONDITIONER | 440,000 | 42,000 | 2 |
| 2 F | FAN | 60,000 | 5,500 | 5 |
| 2 F | TOTAL | 500,000 | 47,500 | 7 |
|  | GROUND TOTAL | 1,130,000 | 114,500 | 18 |

Buttons: 511 START ARRANGEMENT CHANGE | 512 END ARRANGEMENT CHANGE | 513 DELETE ARRANGEMENT CHANGE | 514 EDIT Labels: 201, 515, 516, 821, 822, 823, 824, 825, 826, 831, 832

| RECORD TYPE | — |
|---|---|
| MARGIN | 20 |

412

1000 SPECIFIC DATA ARRANGEMENT TABLE

| NUMBER | TYPE | SIZE | X0 | Y0 | X1 | Y1 | CHARACTER SERIES/ITEM NAME |
|---|---|---|---|---|---|---|---|
| 1 | LINE | FINE | 20 | 70 | 215 | 70 | |
| 2 | VARIABLE CHARACTER | MEDIUM | 20 | 50 | 60 | 70 | SALES FLOOR |
| ... | ... | | | | | | |
| 10 | VARIABLE CHARACTER | MEDIUM | 180 | 50 | 215 | 70 | QUANTITY |
| | | | | | | | |
| 413 | 414 | 415 | 416 | 417 | 418 | 419 | 421 |

1002

WHEN SUBCOMMAND "ERASE" IS SELECTED

WHEN SUBCOMMAND "MOVE" IS SELECTED

| ARRANGE-MENT CHANGE START | ARRANGE-MENT CHANGE END | ARRANGE-MENT CHANGE DELETE | EDIT |

TURNOVER LIST

| SALES FLOOR | GOODS | TURNOVER | PROFIT | QUANTITY |
|---|---|---|---|---|
| 1F | TELEVISION | 400,000 | 40,000 | 4 |
| 1F | RADIO | 30,000 | 2,000 | 3 |
| 1F | TELE-PHONE | 200,000 | 25,000 | 4 |
| 1F | TOTAL | 630,000 | 67,000 | |
| 2F | AIR CONDI-TIONER | 440,000 | 42,000 | 2 |
| 2F | FAN | 60,000 | 5,500 | 5 |
| 2F | TOTAL | 500,000 | 47,500 | |
| GRAND TOTAL | | 1,130,000 | 114,500 | |

516

METHOD FOR PREPARING FORM

BACKGROUND OF THE INVENTION

1. Field of the Invention

The present invention generally relates to a form preparing method and a form preparing apparatus including a computer. More specifically, the present invention is directed to a form preparing method suitable for producing a form wherein a predetermined display pattern appears repeatedly with reference to a table form data, and further that distinguishably displays such specific data portions as a total, a subtotal, and an average on the form.

2. Description of the Related Art

In general, table format data has a structure so that an attribute called a "field" is represented in an abscissa, and one unit of data called a "record" is represented in an ordinate. The reason why data that has such a simple two-dimensional structure is so processed, is so that a graphic display of the data and a calculation process are easily accomplished. In particular, very recently, a relational format table has been widely employed as basic form of data display of most systems, since a table arranging process operation is readily implemented, and this relational format table is a simple and easily understandable structure to a user. However, when a processing result of such a system is finally printed out in a table format, it is often demanded for a user that the relational format table is not directly outputted in its original format, but may be printed out as a different easily understandable structure.

On the other hand, generally speaking, the finally processed data, as well as a graphic display, are printed out on paper as a form or a document. The actually printed table format of the form may not be such a simple two-dimensional table, as described above, but may also be arranged in various different formats. As a consequence, in general, on table format handled as the basic format by a system may be different from the kind of layout that can be used as a practical form output.

As prior art related to the formation of a form, there are available software products such as "DATA BOX-II" that is operable on the HITACHI Personal Computer B16 Series and the NEC Personal Computer PC 98 Series. For the report output function, this conventional software has a fine printing function used to create a form constructed of a specific repeating pattern.

The above-explained function is to repeatedly and continuously print out a desired data range among data arranged on a report in a list format. Also, ruled line information and a text may be arranged as repeatedly printed data by way of this function. Furthermore, when related information, such as a so-called "memorandum notebook", is stored as table format data, this related information may be arranged by way of this function by simply designating the item name of the designated item data as the storage format for the data to be stored. As a result, during the printing operation, the data corresponding to the respective items of the arranged memorandum notebook, are sequentially displayed in the record unit of the table format data. At this time, the item number of the designated item is displayed as "#01" on the report shown in the display screen, and also the items arranged by the repeating process are similarly displayed as "#01".

Then, when the repeating-process printing operation is carried out, such a designation can be made to simply repeat the designated data range along the lower direction, or to apply this repeating-process printing operation to a plurality of rows (4 rows at maximum).

A more detailed description of this fine printing function is made in the operation manual of "DATA BOX-II" for the Hitachi Personal Computer B16 Series (see pages 280–283).

However, there are the below-mentioned problems in the above-described conventional form preparing method when a user produces a form.

That is to say, since any item of the table format data arranged on the report is limited only to such an item contained in the same record, it is not possible to arrange another item of the record which is positioned immediately before the relevant item in the same column of the report when the table format data are time-sequentially arranged. In other words, only a certain single record can be arranged as a sample, but a sample that would include data extending over a plurality of records that have been arranged in the same column, cannot be repeatedly outputted.

In accordance with the above-explained prior art, when related items not existing on the same record are arranged on a form in such a manner that these related items are easily comparable with each other, such a storage area is required so that these related items can be previously stored in the same record of the table format data. As a result, a double storage region is needed. Furthermore, according to this prior art, since the process for sequentially repeating one record is applied, for instance, such an output process for skipping the records every two records cannot be repeatedly performed.

As previously stated, in accordance with the convention form preparing method, no sufficient care has been taken into such conditions that a plurality of items extending over the plural records are designated as a single sample, and these item designations are repeatedly applied in unit of plural records. As a consequence, there are such problems that useless work and also useless memory are required while creating a form.

The above-described problems of the conventional form producing method occur when the form is produced from the data which have been stored in unit of record. On the other hand, when form data is produced, there are many possibilities to utilize previously prepared table data. More specifically, there are many cases where the relational format table data for constituting the typical relational data base are utilized as the form data. One system for creating a form based on the relational format table data is a commercially available software entitled "KIRI Version 3", for a personal computer. This conventional system has a function such as a table format form, as described in the master manual of KIRI Version 3 written by Y. Takahashi, published by HBJ Publisher (see pages 290–292 and 301–303).

The last-mentioned function is effected as shown in a print sample of this manual (see page 292) such that the lower portion of the specific column is displayed by a wide line, and other character attribute/arranging positions are displayed in a layout similar to that of the normal column. This specific column also contains a class averaged value and a year averaged value, which are expressed as a small total part, a medium total part, and a large total part among the table data.

Also, in accordance with Hitachi's general-purpose decision support system, known as "EXCEED 2", when a column for satisfying a specific condition among table format data is represented as a wide line, a user must write a command and a program specific to this special line representation.

In this conventional system, although it is easy to directly output a relational format table without any modification, as the process result of this conventional system, it is not easy to change the display format, or to display this format in a different layout so as to output the specific column containing a total and an average value in response to a user's request.

As previously described in detail, no sufficient care has been taken in the conventional form preparing methods with regard to such a function that an easy-readable/easy-understandable form is efficiently formed. There is the problem that the display format data involving such a specific portion as the total column and the average column designated by the user, cannot be simply varied into the format desired by the user.

SUMMARY OF THE INVENTION

An object of the present invention is to provide an effective method for producing a form in such a manner that data extensively stored over a plurality of records is arranged on the form, and this data arrangement can be repeated. Another object of the present invention is to provide a method capable of producing a desired form where a user directly designates such a specific portion as a total and an average on a relational format table displayed on a screen, thereby simply changing a screen image. To this end, the form producing method according to the present invention is arranged by a process operation for repeatedly displaying on the form, the data which has been stored in an extended manner over the plural records, and also a process operation for displaying such a specific data as a total and an average of these plural data on the form in a desired format.

To achieve the above-described objects, according to the present invention, there are provided in an output unit of a computer, a region used to display table format data stored in a memory unit, and furthermore, an output area of a form to be produced, and the following process operations are performed.

When information for designating a specific column contained in table format data is inputted from an input unit, the designated specific column is represented in the table format data of the output unit. When the data designated in the table format data is arranged in the form output area, the designated place in the table format data is stored into the memory unit as relative position information from the specific column. Then, when the repeating display operation is carried out, the specific column of the table format data is shifted only by a preselected column number, data corresponding to the relative position information is derived from the table format data under such a condition that the shifted column is used as a reference column, and then the derived data is outputted to the form output area. In this case, the number of columns which are moved during the repeating display operation is entered from the input unit.

In accordance with the above-described process operation of the present invention, both the region for displaying the table format data stored in the memory unit, and the region for outputting the form to be created are provided with the output unit of the computer. Then, the information for designating the specific column of the table format data is entered from the input unit. This specific column is represented in the table format data of the output unit, so that this specific column can be set as the reference place used to arrange the columns desired by the user on the form, and moreover, this reference place can be clearly indicated for the user.

Furthermore, when the data designated in the table format data is arranged in the form output area, since the designated place of the table format data is stored into the memory unit as the relative position information measured form the specific column, not only is the data about the column designated by the user as the reference, but also the information can be stored in the format capable of accessing the position of other column data. In case of the repeating display operation, the specific column of the format data is moved only by a preselected column number, the data corresponding to the relative position information is derived from the table format data under such a condition that the moved column is employed as the reference column, and then the derived data is outputted to the form output area. As a result, while sequentially moving the reference column, the data existing at the place where the relative position is maintained is displayed in the form output area. In addition, the number of the column which should be moved during the repeating display operation is entered through the input unit, so that the repeating process operation is successively applied in units of a column number designated by the user, whereby the form can be displayed.

To achieve the above-described another object of the present invention, the relational format table data is outputted to the output unit based on the arrangement data having the same format as that of this table data, and then this relational format table data is entered through the input unit on such a table data that already represents the information used to designate the specific column. Furthermore, the information used to change the arrangement information about the data of this specific column is entered on the display screen, and then the arrangement information about the designated column which has been changed in accordance with this information is stored into the memory unit. Another column with attribute information similar to that of this specific column is extracted, and then the arrangement information of the changed designated column is applied to the column having a similar attribute which is further displayed on the output unit.

As described above, the normal relational format table may be represented to the user by outputting the relational format table data to the output unit as information arranged to have the same format, and further, the information for designating the specific column is inputted by the input unit on the table data. In addition, since the information used to change the arrangement information with respect to the data of this specific column is inputted on the screen image, the user can execute the layout changing process for the desirable data column on the display screen. Moreover, since the changed result of the arrangement information for the designated column is stored into the memory unit, the above-described changed result can be maintained as another arrangement information having a different format from that of the original arrangement information. Then, another column with the attribute information similar to that of this specific column is extracted, and the arrangement information of the designated column which has been changed is applied to the column having the similar attribute, and thus is displayed to the output unit. As a consequence, for instance, the layouts of the remaining columns with the attribute of the total column may be also changed in a similar manner and displayed by simply changing only the specific column with the attribute of the total column.

BRIEF DESCRIPTION OF THE DRAWINGS

FIG. 3 schematically indicates a hardware structure used to execute the form preparing method according to the present invention;

FIG. 4 schematically shows an example of an output display for a relational table displaying window;

FIG. 5 schematically indicates a structure of a relational table;

FIG. 6 schematically represents a structure of base record information;

FIG. 7 illustrates an example of an output display for an arrange window;

FIG. 8 shows a structure of a storage for form size information;

FIG. 9 schematically shows a structure of a repeating information storage;

FIG. 10 schematically indicates a structure of an item data area;

FIG. 13 schematically indicates an empty storage list for the item data;

FIG. 20 schematically shows a structure of a command menu position table;

FIG. 28 schematically shows a display example of the arranging table positioning area during the form preparing stage;

FIG. 39 is a flow chart for showing a repeating display sequence when a multi-column horizontally repeating is applied;

FIG. 40 is a flow chart for denoting a repeating display sequence when multi-bricks repeating is applied;

FIG. 44 schematically indicates a structure of table data on a relational format;

FIG. 45 schematically shows a structure of a form position information table;

FIG. 49 is an example of a form display screen output;

FIG. 51 schematically indicates an arrangement of an arranging information table for special data;

DESCRIPTION OF THE PREFERRED EMBODIMENTS

A description will now be made of a method for arranging table format data into various layouts of forms, according to a preferred embodiment of the present invention. That is, this embodiment corresponds to a form output method which employs a computer, in which various calculations and other processing methods are performed to the table format data.

The present invention relates to a process sequence for arranging a two-dimensional table handled by a system into various layouts used to prepare forms. For an easy understanding of this preferred embodiment of the present invention, a basic idea of the present invention will now be summarized.

First, a display window of a simple two-dimensional format table (which hereinafter will be called "relational format table") which has not yet been arranged, and an arrange window (first nothing is displayed) used to represent a newly formed table by the arrangement is produced. A user designates data from the display window of this relational format table in an interactive mode, which will become a selected sample, in order to produce a desirable layout, and moves the designated data above the arrange window. Thereafter, the user designates a parameter that repeats for indicating what data will be repeated in the arrange window, thereby forming a new table. Next, the actual repeating occurs to prepare a new form.

More specifically, in a case where a summation and an average are calculated with respect to such data in which an original table is expressed by a relational format, and the calculation results are applied into the relational format table, the average portion and the summation portion must be represented, while being distinguished from the other data. To this end, in accordance with the form preparing method of the present invention, when a direct designation is made of a summation portion or an average portion by a user on a relational format table displayed on a screen, whereby these portions are changed by a screen image, a desired form may be produced. A description will now be made of preferred embodiments of the present invention.

Figure 1:
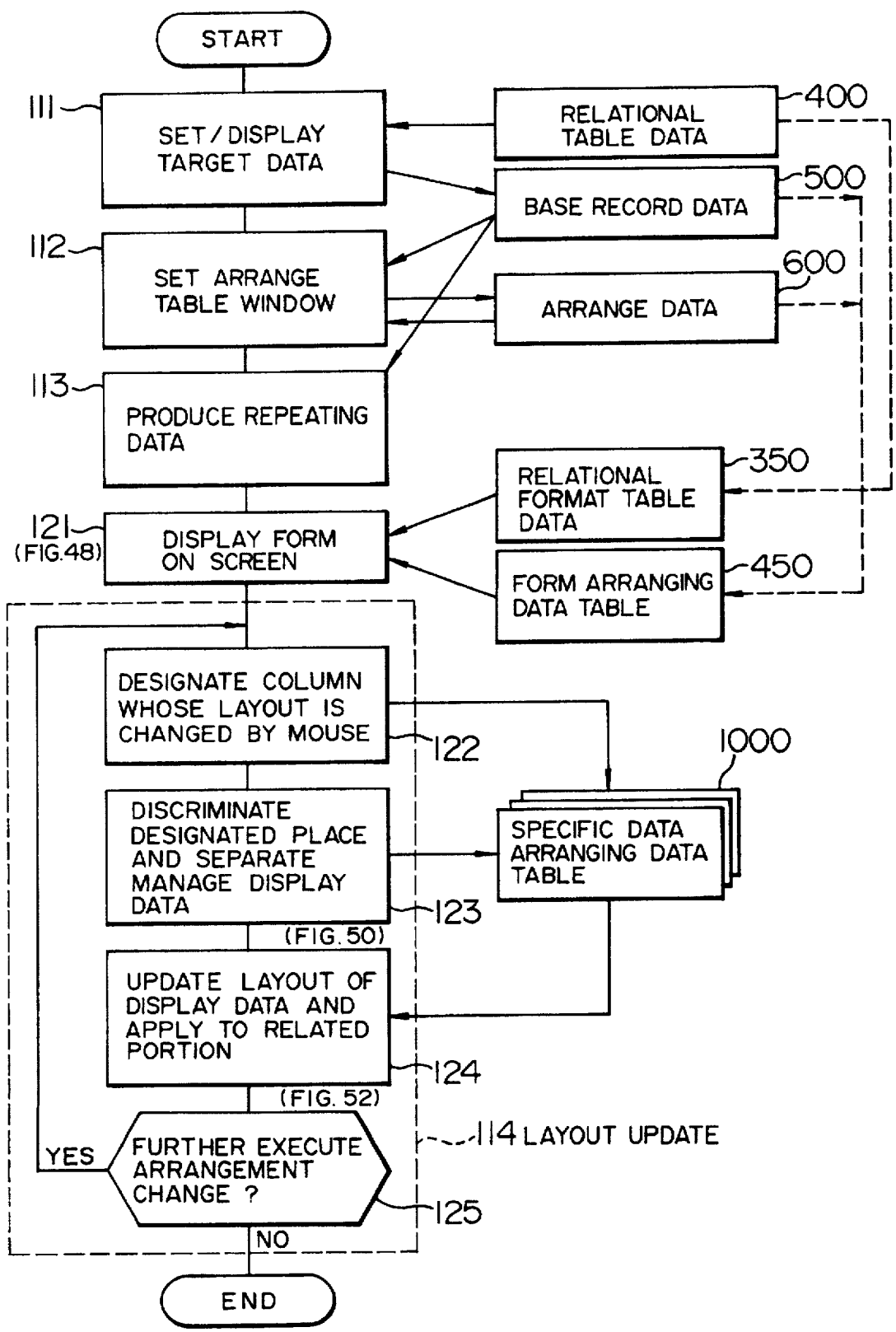
FIG. 1 is a flow chart for representing a form preparing method according to a preferred embodiment of the present invention.

FIG. 1 is a flow chart for showing a process sequence according to this preferred embodiment. FIG. 3 schematically shows a computer system to execute the form preparing method of the present invention. FIG. 4 is an example of a screen output for a relational table window used to create a table before being arranged, namely a two-dimensional table. FIG. 5 shows a concrete example of a representation format of table data stored in a storage device, and corresponds to an example of a screen output shown in FIG. 4.

A display 201 shown in FIG. 3 is an output unit for displaying a value of table data, output information derived from a system of an arranging window, various sorts of menus for suggesting a user to input various demands, and an input area. A keyboard 202 is an input unit for inputting a response to a demand entered from the system, as a numeral form or a text form. A mouse 203 is a pointing type input unit for designating data on a screen of the display 201, and for entering information about a selection of various sorts of menus and also a process initiation. A printer 204 is an output unit for printing a form produced in the interactive operation. In an external storage unit 208, table format data (relational table data) is stored to which the form preparing method of the present invention is applied. A storage unit 207 corresponds to an information storage medium for holding input information derived from the input unit, or various information processed by a processing unit. A processing unit 205 controls the above-described various units. A data read out operation from the respective apparatuses, a data write operation into the respective apparatuses, data investigation, and a calculation process are executed in accordance with a program 206 stored in the storage unit 207.

FIG. 5 schematically shows a storage format of a relational table 400 handled by the system. This table data has been stored into the external storage unit 208, and has a table name 401 for identifying the table. This table data is a two-dimensional format table with such an arrangement that a plurality of field titles 404 are arranged along a horizontal direction and a plurality of records are arranged along a vertical direction. It should be noted that in this table 400, not only a record number 403, but also a field number 402, are given to a field title, and the respective fields can be accessed by numeral values. In the example shown in FIG. 5, a table title is an income list, and a head record represents that an employee's ID (identification) number is "14521", an employee's name is "Tetsuya Marouka", and living-out hours are "1:00".

FIG. 6 schematically indicates a structure of base record information 500, for storing positional information on a form and positional information concerning a repeating representation based upon the respective information shown in FIG. 6, data are displayed on the form. A detailed description of the respective information shown in FIG. 6 will be made in the following process sequence.

Roughly speaking, the process sequence shown in FIG. 1 is constructed of a process (steps 111 to 113) for repeating data which have been stored so as to extend over a plurality of records, but can be displayed on a form, and a process step (step 1149) for displaying specific data such as a summation and an average of these plural data on the form in a desired format.

At step 111, the relational table data 400 for a table title designated by a user is fetched from the external storage unit 208 as target data to be prepared as a form, and then displayed on the relational table window, and further information about a base record set by a user is stored into the base record information 500.

At step 112, an arrange table window used to display a form is set based upon the instruction of the user, and the information used to display the form is stored in arrange information 600.

At step 113, repetition data, or data selected by the user that repeats is fetched from the relational data table 400 based on the base record information 500, and then is outputted.

At step 121, based upon relational format table data 350 containing a format of the relational table data 400, and a special record such as summation and an average, and a form layout information table 450 containing both base record information 500 and arrange information 600, the form is displayed on the screen of the display 201.

At a step 114, the special record selected by the user is changed into a layout instructed by the user to be displayed, and the display information is held in a special data layout information table 1000. A step 114 comprises a step 122 at which a target record whose layout is changed is designated, a step 123 at which a designated place is identified on the form and this identified region is managed independently of other table data, and a step 124 for changing a layout of display data based on the information table 1000 produced at the previous steps 122 and 123. Furthermore, when a layout change is carried out, the above-explained steps 112, 123 and 124 are repeated.

The respective steps and the respective information shown in FIG. 1 will now be described in detail.

Figure 2:
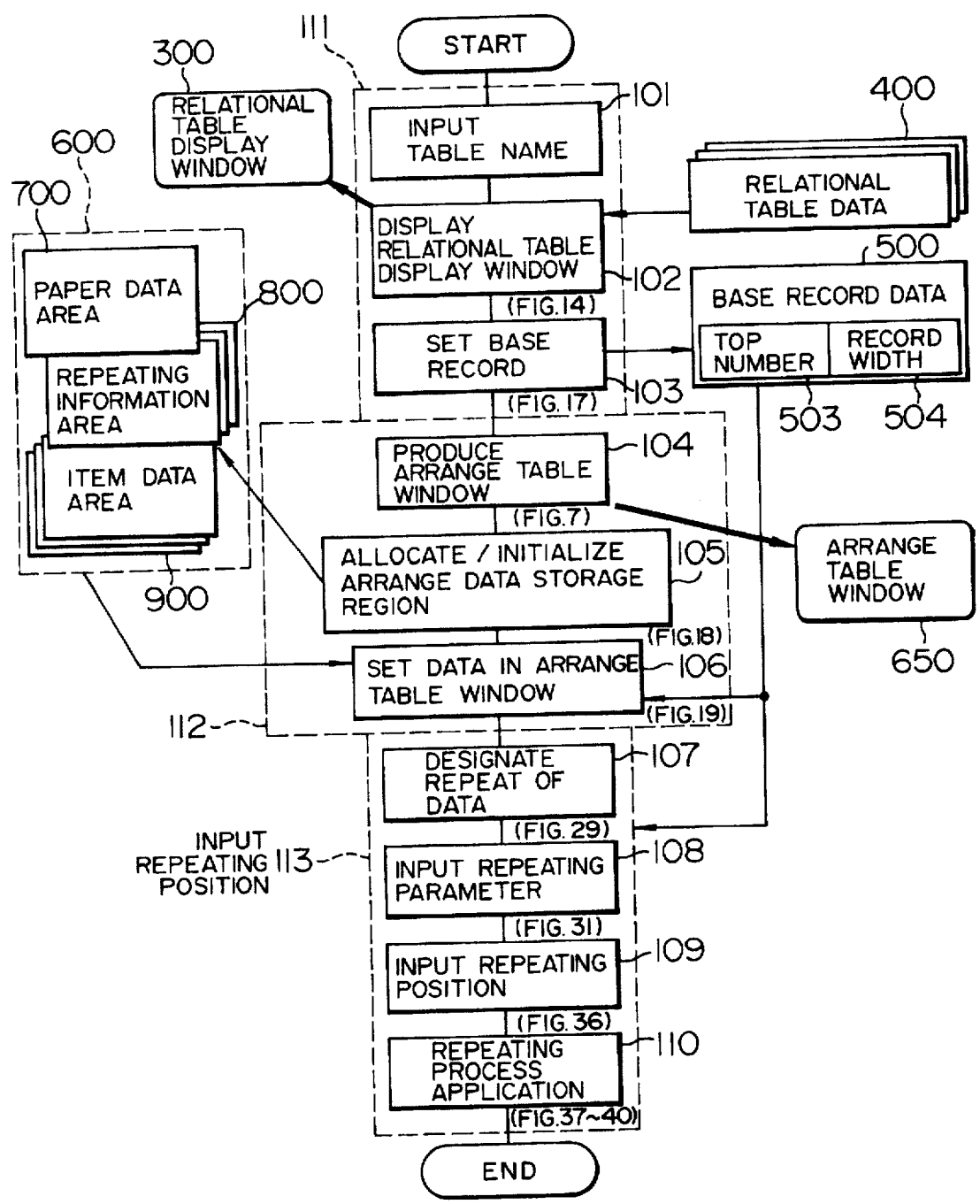
FIG. 2 schematically shows a summary of a form preparing process for repeating data containing table format data.
Figure 11:
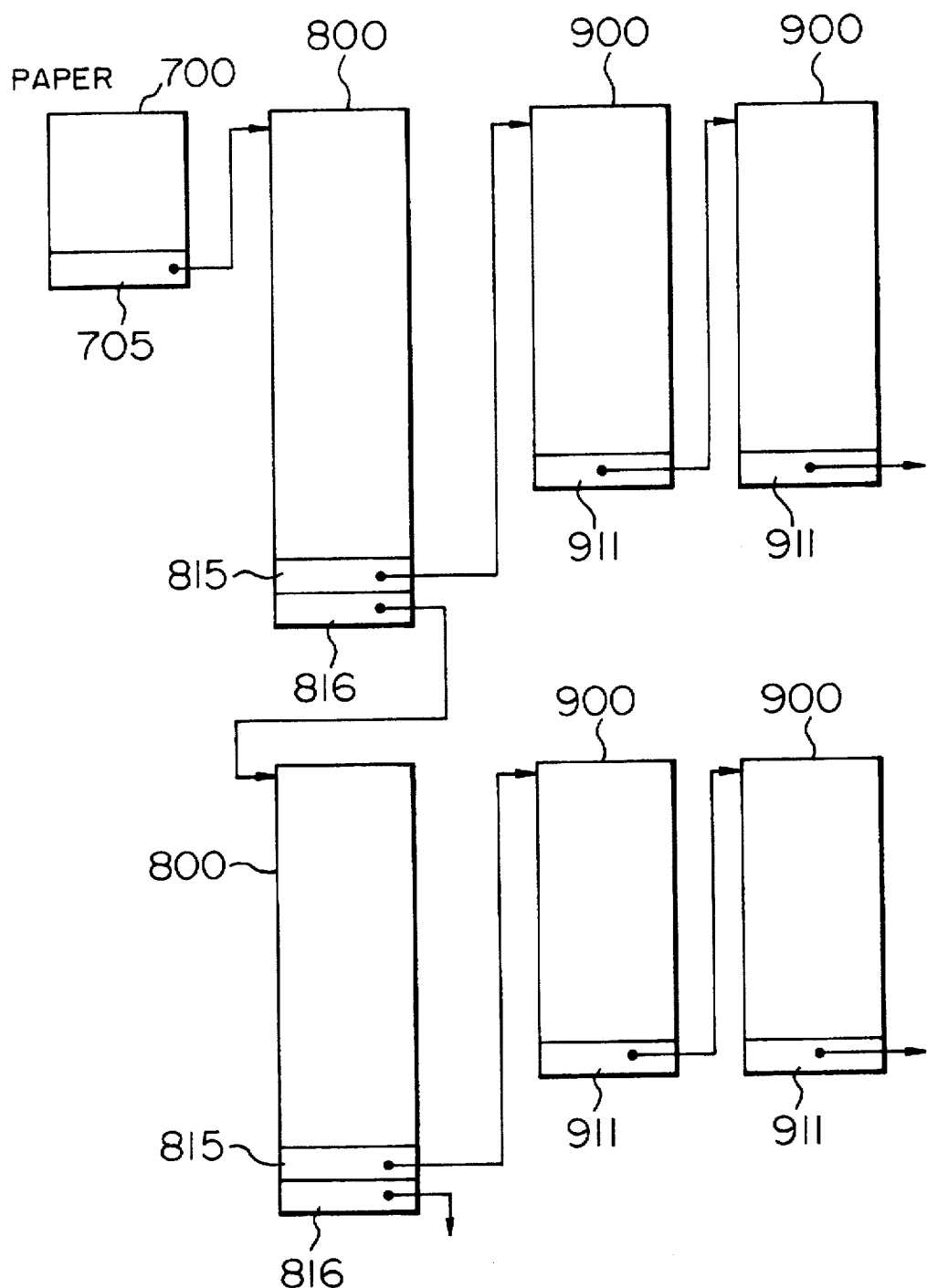
FIG. 11 schematically represents a relationship among the form size information storage, the repeating information storage, and the item data area.

In accordance with a flow chart shown in FIG. 2, a sequence of a process (steps 111 to 113) for repeating data which have been stored so they extend over a plurality of records to display the repeated data on a form.

(1) SETTING/DISPLAYING OF TARGET DATA (STEP 111)

(1-1) Input of Table Title (step 101)

In a step for setting and displaying target data (step 111), a text "INPUT TABLE TITLE" is displayed on the display 201 in order to request a user to issue an input. The user enters a table title of a relational table to be arranged, for example, an income list by using a keyboard (step 101). The step 101 may be realized by way of a method for selecting one of the available table lists by a user.

(1-2) Display of Relational table display window (step 102)

Next, a relational table display window 300 is produced, and data on the relational table 400 corresponding to the title of table entered at the step 101 is displayed at the window 300 (step 102).

In FIG. 4, there is shown an output example of the relational table display window after the data has been represented. In this output example of FIG. 4, data which may be displayed within the screen are 20 pieces of data in total, in which the number of fields is 5 along a lateral direction, and the number of records is 4 along a vertical direction. On the other hand, since, in actual, the size of the relational table 400 is larger than this display region, a portion of the relational table 400 is displayed on the window 300. A detailed description of a sequence (step 102) will now be made with reference to a flow chart shown in FIG. 14, in which the content of the relational table 400 is displayed on the relational table display window 300.

First, "1" is set on a first field number on the relational table window 501 shown in FIG. 6 (step 1301), and "1" is set on a first record number on the relational table window 502 (step 1302). Number 501 and 502 of the base record information 500 indicate which data corresponds to the data to be displayed at an upper left column 320 in the data display region of the relational table display window 300, and correspond to a field number 402 and a record number 403 of the relational table data 400. In the example shown in FIG. 6, 1 record of a first record of the relational table 400 has been set as an initial value.

Figure 15:
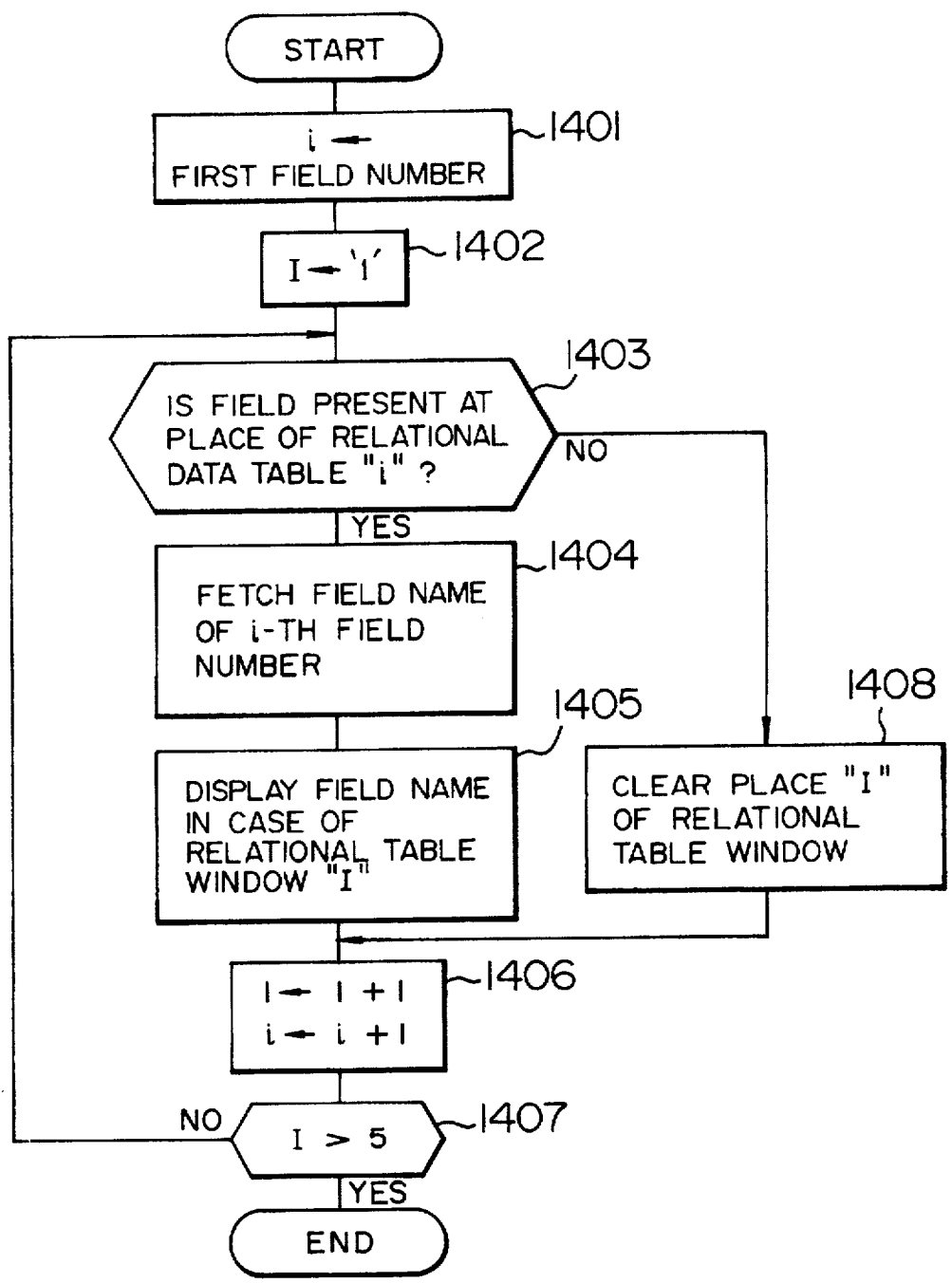
FIG. 15 is a flow chart for indicating a field name display sequence by the relational table displaying window.

Subsequently, names of a field corresponding to the respective fields are outputted to the field name display region 301 of the relational table display window 300 (step 1303). A detailed operation of this step 1303 is represented in a flow chart of FIG. 15.

A value stored in the first field number 501 on the relational table window is substituted by a program variable "i" (step 1401), and "1" is substituted by a program variable "I" (step 1402). In the variable "I", a value indicative of the field 301 on the relational table display window 300 to which the field name should be displayed, is stored.

Then, a check is done whether or not a field is present at a place of "i" on the relational table 400 (step 1403). If there is a field, then a field name 404 is picked up from the place having the field number 402 of "i", of the relational table 400 (step 1404), and the picked field name 404 is outputted and displayed at a first display place of the field name display area 302 in the relational table display window 300 along the left direction (step 1405).

Thereafter, "1" is added to the respective variables "I" and "i" (step 1406). A check is done whether or not this program variable I exceeds 5 (step 1407). If the variable I exceeds 5, then since all of 5 fields have been displayed, the process operation is completed. To the contrary, if the variable I does not exceed 5, then the process operation is returned to the step 1403 at which the pick-up operation of the next field name is carried out.

On the other hand, if no field is present at the place of "i" in the judging process of the step 1403 (in case of such a table that the field number of the relational table is smaller than 5), an I-th display place of the field name display region 301 of the relational table display window 300 is cleared (step 1408), and the process operation is advanced to a step 1406.

Figure 14:
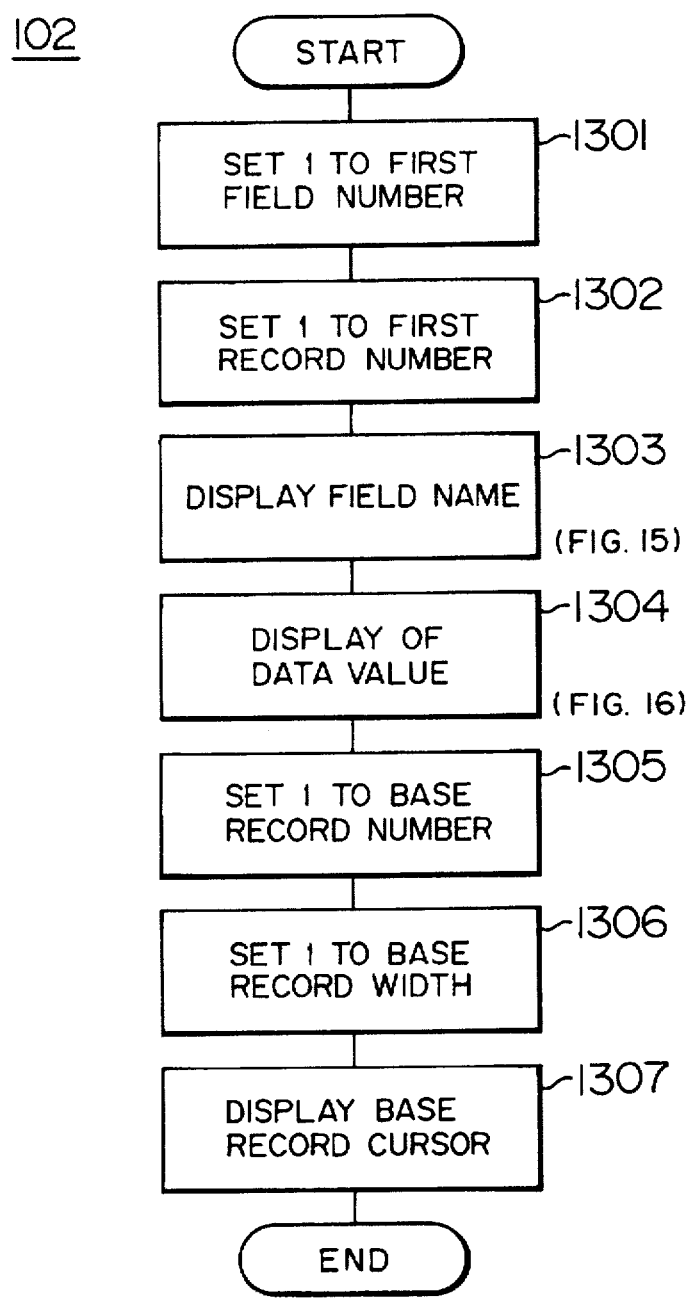
FIG. 14 is a flow chart for showing a display sequence of a relational table displaying window.
Figure 16:
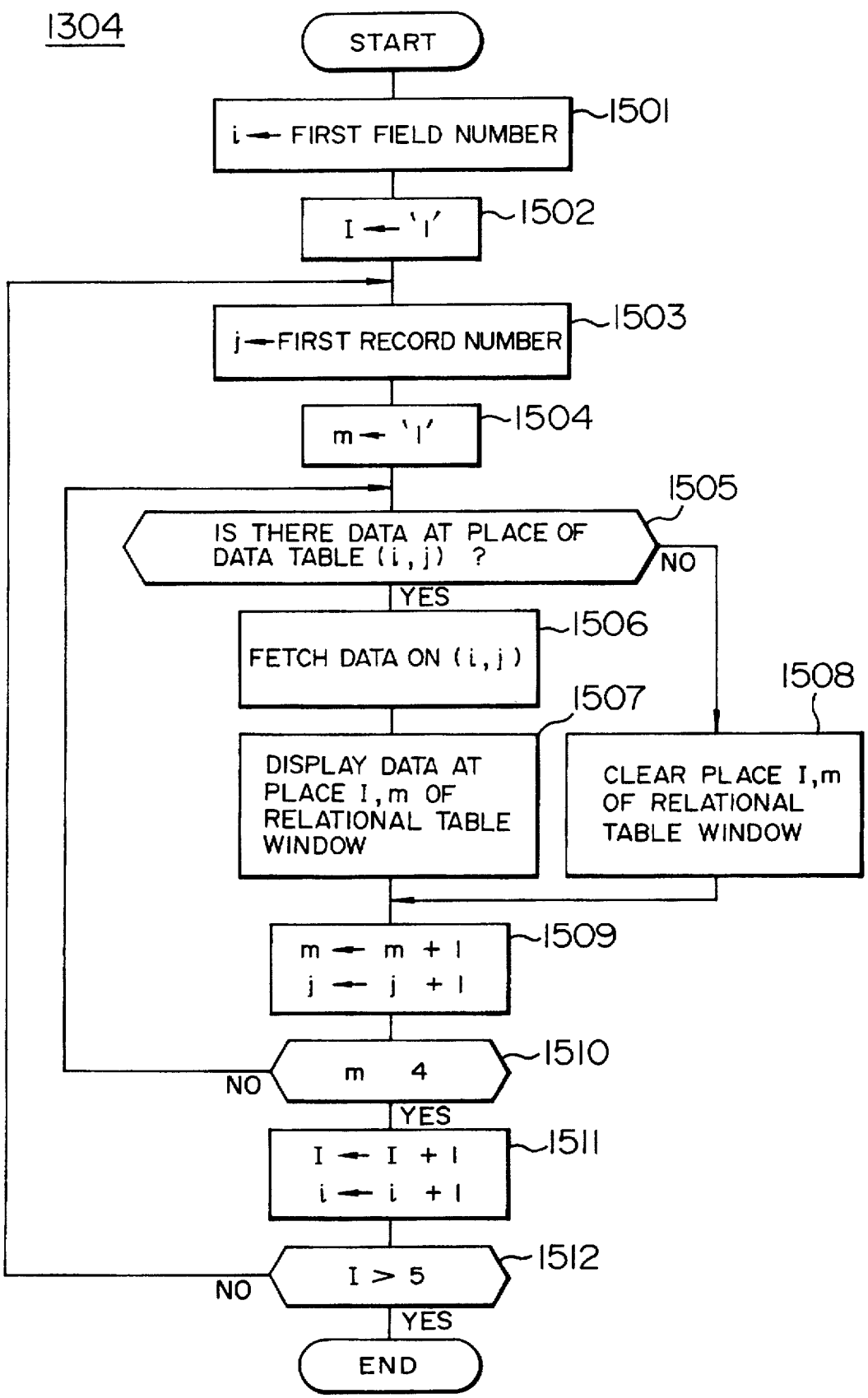
FIG. 16 is a flow chart for representing a data displaying sequence by the relational table displaying window.

In FIG. 14, after the display operation of the field name to the relational table display window 300 has been accomplished, the respective data values of the relational table 400 are represented on the relational table display window (step 1304). Then, a detailed process operation, as defined at the step 1304, is indicated in FIG. 16.

First, the value stored in the first field number on the relational table window is substituted by the program variable "i" (step 1501), and "1" is substituted by the program variable I (step 1502). The variable "I" shows a position of the field (abscissai direction) on the relational table display window 300 to which data should be displayed.

Then, the value stored in the first record number on the relational table window 502 is substituted by a program variable "j" (step 1503), and "1" is substituted) by a program variable "m" (step 1504). This variable "m" indicates a position of the record (abscissa direction) on the relational table display window 300 to which the data should be displayed.

Next, a check is done as to whether or not data is present at a place (i, j) on the relational table 400 (step 1505). If there exists data, then the data is derived from the place (i, j;) of the relational table 300 (step 1506). The derived data is displayed on a frame of such a place (I, m) where an upper left frame 320 of the data display region of the relational table display window 300 has been set as a base place (1, 1) (step 1507).

On the other hand, in the judgement process of the step 1505, when no data is present at the place (i, j) on the relational table 300, an (I, m)-th display place counted from the upper left area of the data display region of the relational table display window 300 is cleared (step 1508). As a result, the data may be displayed, or cleared with regard to a certain one frame on the display.

Thereafter, "1" is added to the respective program variables "m" and "j" (step 1509), and the process operation is advanced to the subsequent object existing along the ordinate direction. Then, a judgement is made whether or not this program variable "m" exceeds 4 (step 1510). If this program variable does not exceed 4, then the process operation is returned to the step 1505 at which the data on the next record is derived. If the program variable "m" exceeds 4 (namely, all of data about 4 records with regard to a certain field are displayed), "1" is added to the respective program variables "I" and "i" in order to advance an object of the field (abscissa direction) to the next place (step 1511). A judgement is done as to whether or not this program variable "I" exceeds 5 (step 1512). If this program variable "I" exceeds 5, then the process operation is accomplished since all of the 5 fields and the 4 records have been displayed. If the program variable "I" does not exceed 5, then the process operation is returned to step 1503, at which data about the next field is fetched.

As described above, the data on the relational table 400 is displayed on the relational table display window 300 by performing the process operation (step 1304) shown in FIG. 16.

(1-3) Setting of Base Record (step 103)

In FIG. 2, after the data display operation to the relational data display window 300 has been accomplished, a base record 302 present at a left edge portion of the window 300 is set (step 103).

A description will now be made of a base record. A user may designate a plurality of continuous records from an arbitrary record position (a single record may be designated) by the base record 302. In a table arranging operation (which will be discussed later), a relative record positional relationship from a head portion of this base record is stored into data (which will be called "mapping data") used to arrange a portion cut out from the relational table display window. Then, at a repeating process application 110, a top portion of this base record is virtually and successively moved by a width of the base record, and the arrangement of the remaining records is repeated based upon the relative record positional relationship which has been stored. As a region for storing the information about this base record, both a storage region 503 for the first record number on the relational table window and a storage region 504 for the base record width are prepared. "1" is set as an initial value to these regions (steps 1305 and 1306). This initial value corresponds only to 1 record from the top record of the relational table 300, and a base record cursor 303 indicative of this position is displayed on the relational table display window 300 (step 1307).

Figure 17:
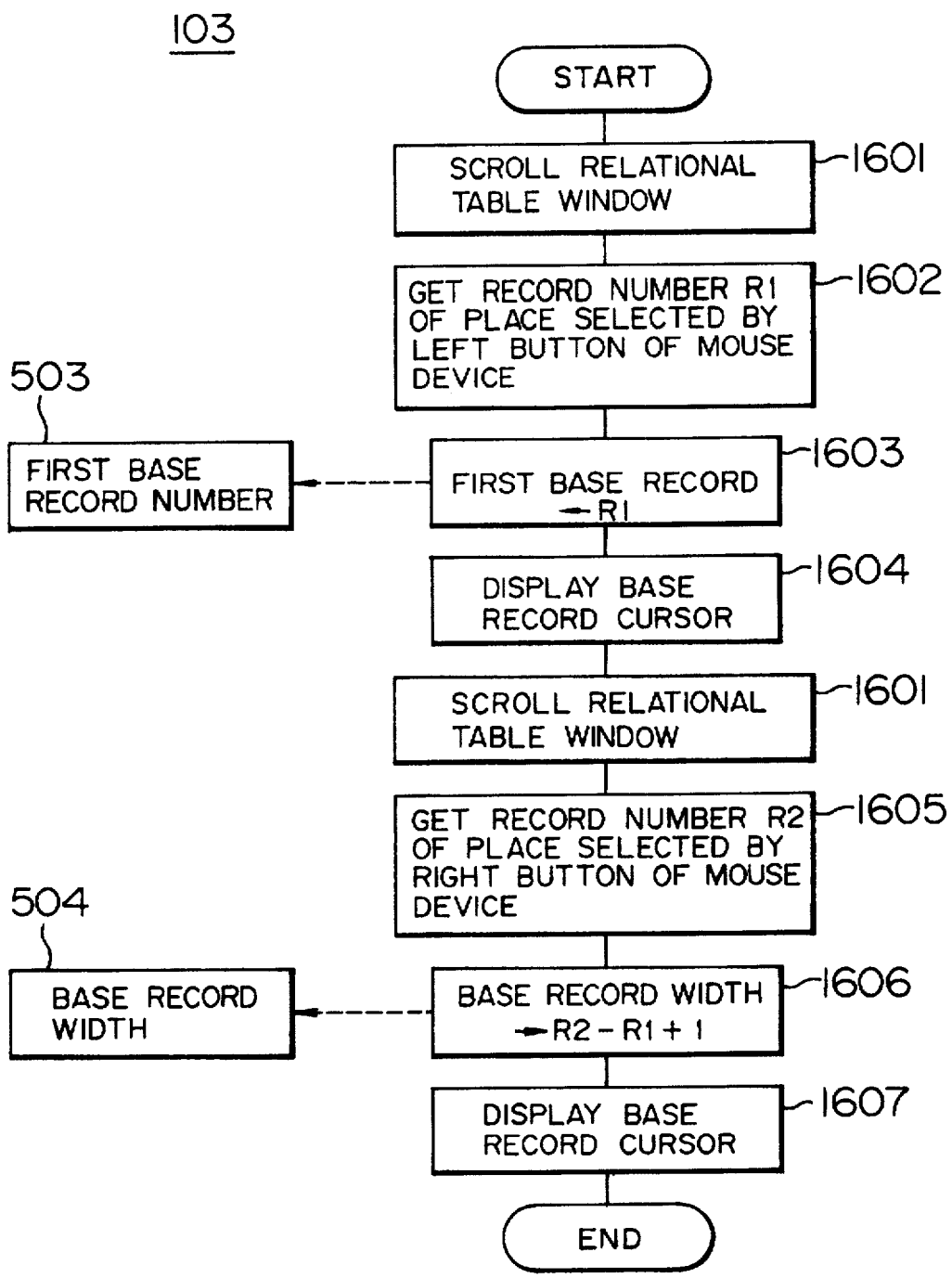
FIG. 17 is a flow chart for indicating a base record setting sequence by the relational table displaying window.

A user may change the base record, if required (step 103). The user selects an arbitrary column of the base record cursor display region 302 on the relational table display window 300 by utilizing a mouse device 203, thereby changing base record information. In a concrete example, the base record information is changed in accordance with a process as defined in a flow chart shown in FIG. 17. First, a user scrolls record data to be displayed with employment of scrolling commands 304 and 305 on the screen 300 (step 1601). When the user selects the base record cursor display region 302 at a place of a desired place by a left button of the mouse device, a record number "R1" corresponding to this desired place is obtained (step 1602). A value of this record number R1 is again set as the top base record number 503 (step 1603), and the base record cursor 303 is again set on the relevant place (step 1604). Thus, the top record of the base record is designated. Thereafter, the user again scrolls the record data to be displayed (step 1601), and when he selects the base record cursor display region 302 at the desired record region 302 at the desired record place by operating a right button 212 of the mouse device, a record number R2 corresponding to this place is obtained (step 1605). A value which is obtained by subtracting the above-described "R1" from this record number R2 and by adding 1 to the subtracted value, is stored into the base record width 504 (step 1606). Then, the base record cursor is displayed at a record range containing the relevant base record (step 1607). With the above-described process operation, the base record desired by the user is set.

The data scroll operation defined at the step 1601 will now be explained more in detail. The scrolling command menu 304, 305, 306 and 307 in the screen 300, for displaying the relational table shown in FIG. 4, are utilized when relational table data 400 greater than an amount of data (5 fields×4 records) which can be displayed on the screen, is displayed. For instance, when the user selects the down-scrolling command menu 305 by the mouse device 203, if "4" is added to the value of the first record number 502 on the relational table window, and the steps 1302 and 1304 are applied, a record succeeding to the presently displayed record can be displayed. Similarly, when the up-scrolling command menu 304 is selected, 4 is subtracted from the first record number 502 for the relational table window and the steps 1303 and 1304 are applied. When the right-scrolling command menu 307 is designated during the scrolling operation along the field (lateral) direction, "5" is added to the value of the first field number 501 of the relational table window, whereas when the left-scrolling command menu 306 is designated, "5" is subtracted from the value of the first field number 501 on the relational table window, and the steps 1303 and 1304 are applied.

With the above-described process sequence, a creation of the relational table display screen window 300 is accomplished. A user inputs the base record having an arbitrary record width from an arbitrary record position of the relational table, and can set the position of the record arranged as a sample and the record width skipped during the repeating application.

(2) Setting of Arranging Window (step 112)

At a step 112, an arranging window is set so as to display the content of the relational table display screen window 300 in the form format.

(2-1) Creation of Arranging Table Window (step 104)

First, an arranging table window 650 is created (step 104). Information related to a display of the arranging table window 650 is stored into an arranging information data area 600 constructed of a paper size data area 700, a repeating data area 800 and an item data area 900. These data areas will now be explained more in detail.

As represented in FIG. 7, this window is constructed of a command menu region for initiating various processes provided on an upper portion of the window (a command process will be explained in detail), and an arrange table positioning region 619 for positioning a table to be newly formed provided at a lower portion of the window. A position of a command menu group displayed on a screen has been previously stored into a storage device 207 as a command menu position table 1900 in a form shown in FIG. 20. Each entry of the table shown in FIG. 20, is constructed of a menu string 1902, an X coordinate 1903 of an upper left summit, a Y-coordinate 1904, an X-coordinate 1905 of a lower right summit, a Y coordinate 1906, and an identification number 1901 of a menu. An identification number corresponding to a command designated from a coordinate (X, Y) inputted from the mouse device 203 is derived by this table, and a process corresponding to this number is executed. Also, in the arranging table window 650, an operation area is provided which is called scroll bars 620 and 621, and used to scroll the region of the arranging table positioning area 619 along either the horizontal direction, or the vertical direction. A user utilizes this scroll bar to scroll the display content of the arranging table positioning area 619.

(2-2) Allocation and Initialization of Arranging Information Data Area (step 105)

Next, an allocation process and an initialization process for a storage area are performed by the operation of the user, which stores various sorts of information stored at a stage during which a new table is produced in the arranging table positioning area 619 (step 105).

Figure 18:
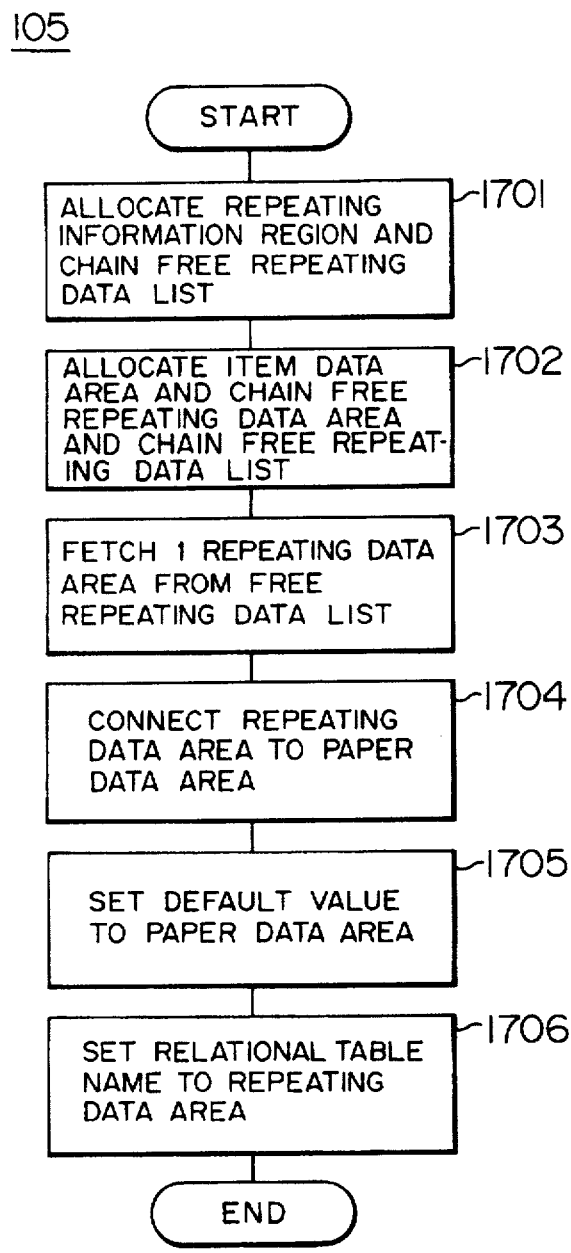
FIG. 18 is flow chart for showing a sequence to maintain/ initialize an arrange table information storage region.

As the above-described various sorts of information, there are information related to a placing position of mapping data cut out from the relational table display window, the record position and the field name on the relation table 400, information about a ruled line frame to be drawn, and furthermore information such as repeating sorts. A process sequence for allocating and initializing these information storage regions is represented in a flow chart of FIG. 18. It should be noted that this process operation may be freely performed anywhere from the step 101 to the step 104, and the storage region to be initialized at this process may be previously present on the storage device 207.

First, a plurality of repeating data areas 800 are allocated, and these areas are chained with each other as an empty list (step 1701). The repeating data area 800 corresponds to a region allocated to an arrangement of a single relational table, and stores information related to a repeating sort (discussed below) and a position of a repeating region. A structure of the repeating data area 800 is shown in FIG. 9. The repeating data area 800 is arranged in the following regions. That is, the regions are a title 801 of a relational table to be arranged; coordinate values 802, 803, 804, 805 representative of coordinate positions of a rectangular area which becomes an origin repeating area among mapping data and a ruled line arranged by an arranging operation; a repeating sort 812; coordinate values 806, 807, 808 representative of coordinate positions to be subsequently arranged by the repeating application; and values 809, 810, 811 indicative of the repeating number when the repeating sort 812 requiring a plurality of repeating positions has been designated. Furthermore, the repeating data area 800 is constructed of a first number 813 of the base record for storing data related to the presently set base record; a base record width 814; a pointer 815 for designating an address of a data storage region for the respective items (mapping data and ruled line and so on) which have been concretely arranged to the arrange table positioning area 619 o-f the screen, and also a pointer 816 for designating an address of the next repeating data area when the arranging operation is performed from the next relational table 400.

Figure 12:
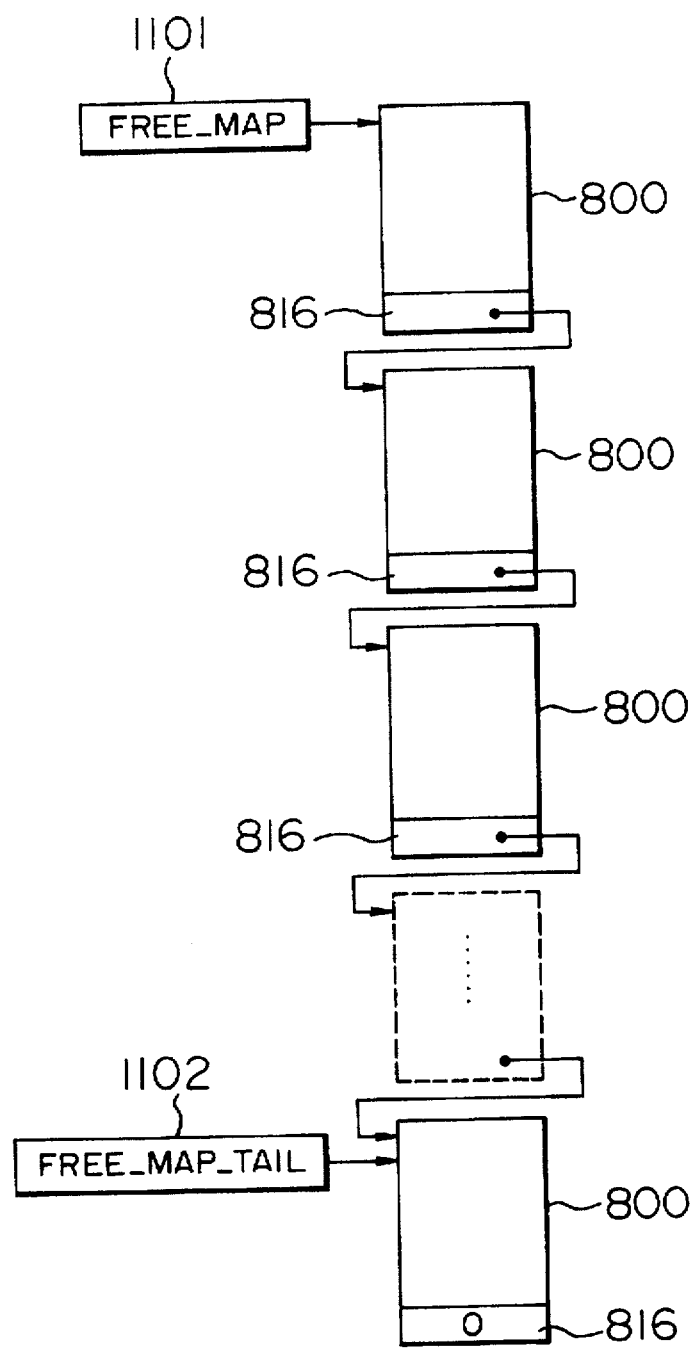
FIG. 12 schematically indicates a structure of an empty storage list for the repeating information.

To be able to execute various repeating process operations, a sufficient number (for instance, 20) of regions capable of storing this repeating data area 800 are allocated, and these plural regions are successively linked with each other as indicated in FIG. 12. The linking operation is realized by sequentially storing an address of the next region into the area 816 for storing the pointer to the next repeating data area. Into the last area 816, "0" is stored as the address value, which indicates that there is no more link. Both of a program variable "free-map (1101)" for holding an address indicative of a top of this list, and a program variable "free-map-tail (1102)" for holding an address of a tail thereof are set. Thus, a list of unused repeating data areas 800 is produced. When the repeating data is required, a single area is derived from the address stored into the free-map (1101) so as to be used. Then, it is changed that a head address of the subsequent area indicates the free-map (1101). An area management may be easily realized by way of the above-described method. Also, an unnecessary area may be repeatedly utilized by lining this area to the trail of the list as a new region.

Then, an item data area 900 is allocated by way of a process similar to that of the above-described step 1701, and these areas are linked with each other as an empty list (step 1702). The item data area 900 is such a region for storing position information about mapping data, text, and ruled lines which are arranged in an arrange table arranging region 619. A structure of the item data area 900 is shown in FIG. 10. The item data area 900 is constructed of coordinate of a rectangular region of an arranging position for the above-described item (upper left X-coordinate 901, Y-coordinate 902, lower right x coordinate 903, Y-coordinate 904); types of items 905 for identifying mapping data, ruled line, and text; a region 906 for storing either a field name, or a text in case of mapping data; a corresponding record number 907 in case of mapping data; a region 908 for storing a size of a displayed character, or a type of a ruled line; a flag 909 for indicating whether or not the above item corresponds to a repeating target; and a pointer 911 for pointing out an address of the next item data area and an ID 910 of the above-described item.

FIG. 13 represents a structure of the empty list of this item data area 900. Similar to the above explained repeating data area 800, a necessary quantity of areas are allocated, which are successively linked to each other. There are provided a program variable "free-part (1201)" indicative of a head portion of this empty list, and a program variable "free-part-trail (1202)" for indicating a trail portion of the list.

After the above-described areas 800 and 900 have been allocated, a single repeating data area 800 is derived from this empty list (step 1703). This area address is stored into a pointer 705 to the repeating data area of the paper size data area 700, and a single repeating data area is connected (step 1704).

Now, a description will be made of the paper size data area 700. A structure of this paper size data area 700 is constructed of, as shown in FIG. 7, a region 701 for storing the type of a form used at the time of the printing operation; information (width size 702, and height size 703) indicative of the size or dimension on the display for this form (dimension on the arrange table setting region); a region 704 for indicating a necessary page number when a repeating application is actually performed; and a pointer 705 for pointing out information to arrange the repeating data linking items on this form, which is used to a repeating data area 800.

Then, the below-mentioned default value is set to the paper size data area 700 (step 1705).

An "A4 size (vertically long)" is set to the form size 701.

"700" is set to the width size 702.

"1100" is set to the height size 703.

"1" is set to the using pages.

Subsequently, the table name 401 inputted at the step 101 is stored into the relational table name 801 of the repeating data area 800 connected at the step 1704.

With the above-described process operation, the initialization (step 1705) for the information storing region is accomplished. As a result, a preparation is performed such that an arrange table is newly formed on paper having a A4 size (vertically long), where the relational table data 400 is used as an target.

(2-3) Arrangement of Data to Arrange Table Window (step 106)

Figure 19:
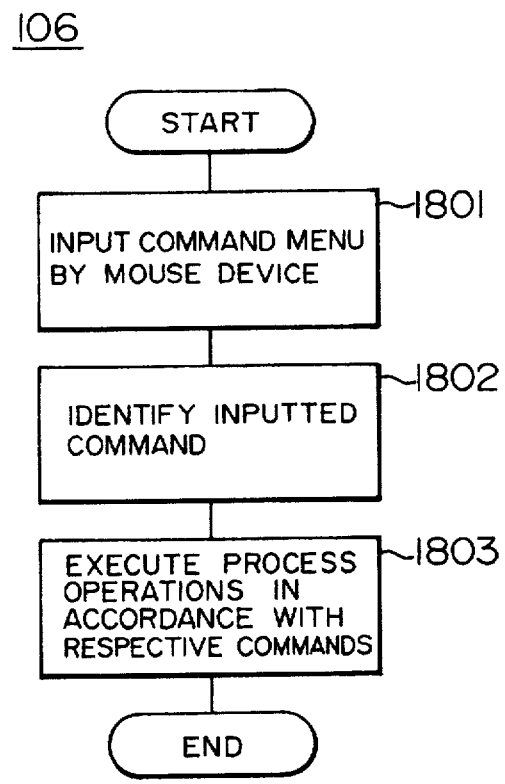
FIG. 19 is a flow chart for denoting a data arranging sequence to an arranging table window.

After the relational table display window 300 and the arrange table window 650 have been formed, mapping data and ruled line data are arranged to the arrange table positioning region 619, thereby to produce new list data (step 106). This process is performed by initiating various process functions owned by the system. The initiation of the respective process functions is performed by selecting the command menu provided over the arrange window table 650. A detailed flow chart of the step 106 is shown in FIG. 19.

First, x and y coordinate information is fetched by inputting this coordinate information with a direct designation on the arrange table window with employment of the mouse device 203 by a user (step 1801). Then, corresponding commands are derived from this coordinate information (step 1802). Concretely speaking, the coordinate (x, y) designated by the mouse device, an upper left X-coordinate 1903 and an upper left Y-coordinate 1904 (X0, Y0) on the command menu position table 1900, and a lower right X-coordinate 1905 and a lower right Y-coordinate 1906 (X1, Y1) can satisfy the following conditions:

condition $X \leq X \leq X1$ condition $Y0 \leq Y \leq Y1$

It can be identified what the command designated by the user is by deriving a menu identifier 1901 of a column that can simultaneously satisfy these two condition formulae.

Thereafter, a process corresponding to the designated command is executed (step 1803). This step 1803 contains a plurality of processes executed for the respective command functions. The individual functions contained in this step will now be explained in turn in connection with the selected command.

Figure 21:
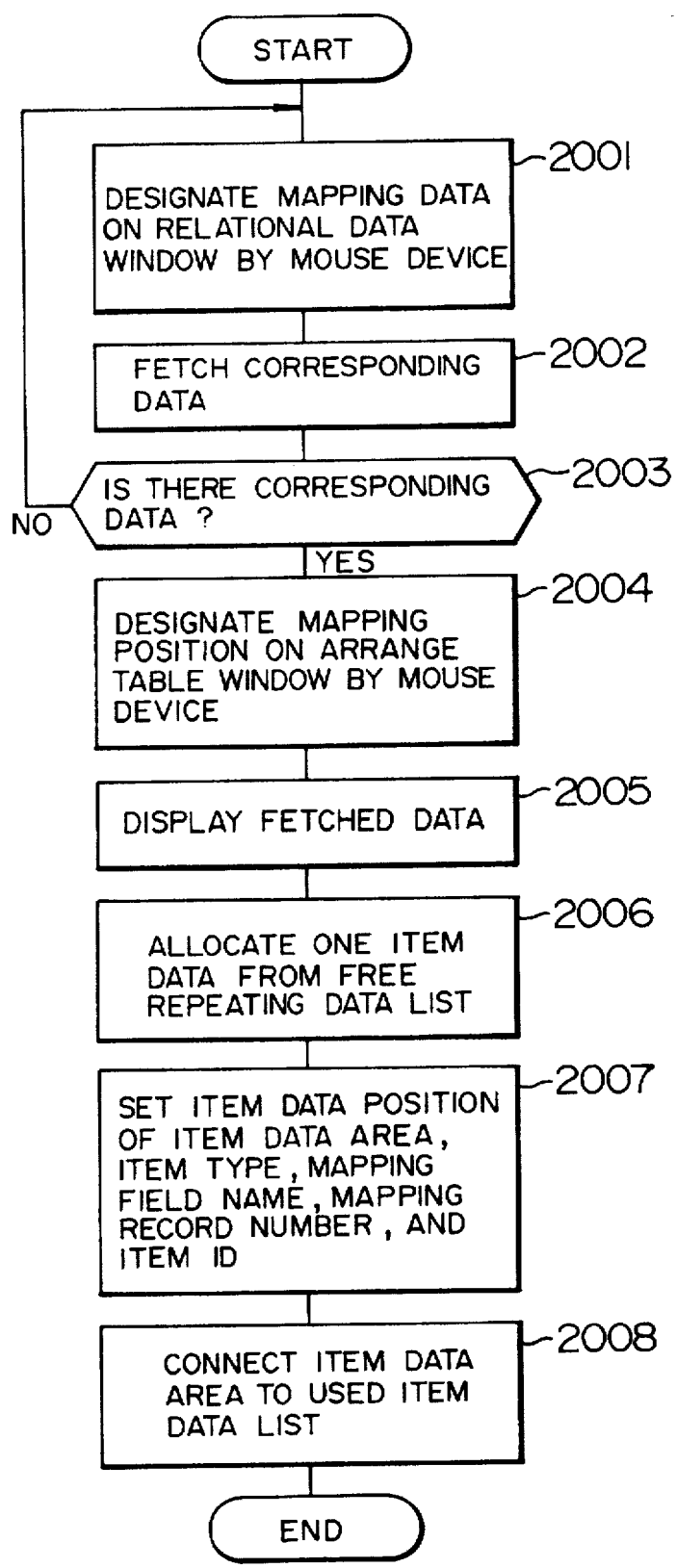
FIG. 21 is a flow chart for indicating a data arranging process from the relational table displaying window to the arranging table window.

First, a process for such a case that the command inputted at the step 1801 corresponds to a command "mapping" 604 in the arrange table window 650, will now be described with reference to a flow chart shown in FIG. 21. In the process operation shown in FIG. 21, data to be displayed on the arrange table positioning region 619 is cut out from the relational table window 300. The cut-out data will be called "mapping data".

First, a user directly designates the relational table window 300 by employing the mouse device 203 to designate mapping data which should be cut out (step 2001). The data corresponding to this designated place is derived (step 2002), and a check is done whether or not there exists corresponding data (step 2003). If there is no data at the place designated by the mouse device (namely, in such a case that a margin of a screen is designated, or a selection is made of a region where no data is actually present), then the process operation is returned to a step 2001 at which the mouse input operation is again performed. On the other hand, if the corresponding data is derived, then the user directly designates a placing position on the arrange table positioning region 619 with employment of the mouse device 203 (step 2004). The data fetched at the step 2002 is displayed on the designated position (step 2005). Thereafter, a single region 900 is allocated from the empty list of the item data area (step 2006), and the following information is set to the allocated item data area 900 (step 2007).

Item arranging position: upper left X-coordinate 901
←X-coordinate value designated at step 2004.
Item arranging position: upper left Y-coordinate 902
←Y-coordinate value at step 2004.
Item arranging position: lower right X-coordinate 903
←a value obtained by adding an X-width of display data to a value of 901.
Item arranging position: lower right Y-coordinate 904
←a value obtained by adding a Y-width of display data to a value of 902.
Item type 905+"mapping".
Mapping field name 906←corresponding field name.
Number 907 of mapping record←a value obtained by subtracting a value of the first base record number 503 from the corresponding record number.
Character size 908←output character type.
Repeated target flag 909←"OFF".
Item ID 910←identification number when being displayed on the screen.
Pointer 911 to the next item data area←: "0" indicative of an end.

Then, this item data area 900 is connected in such a manner that this data area is sequentially coupled to the item data area 815 of the repeating information region 800. In other words, in case of the first item, the address of the above-described item data area 900 is stored into the storage region 815. If the item after the second item is present, then the trail portion of the item data region 900 is detected by sequentially tracing the item data area 900 which has been already linked, and the address is stored into the storage region 911 of the detected item data area 900 (step 2008).

Figure 22:
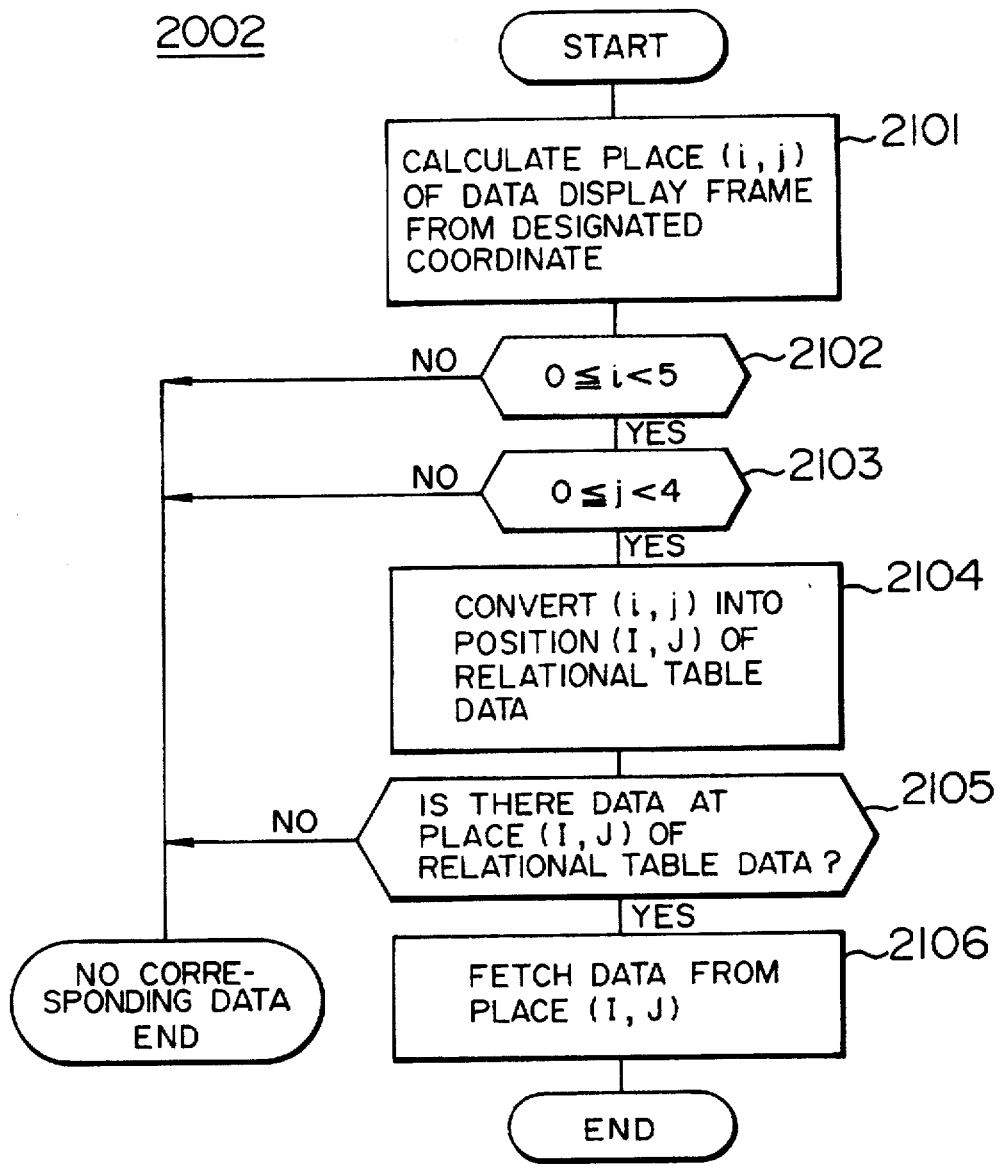
FIG. 22 is a flow chart for showing a sequence to fetch corresponding relational table data from a designated position on the relational table displaying window.

The process sequence of the above-described step 2002 at which the corresponding data on the relational table 400 is obtained based on the designated coordinate, will now be explained with reference to a flow chart shown in FIG. 22.

First, based upon the following formulae, a field number "i" and a record number "j" of a frame on a screen, which correspond to a coordinate (X, Y) on the relational table window 300 designated by the mouse device, are obtained:

(X0, Y0): coordinate of the point 310 on the screen.

W: dimensional 312 of single data display frame along the horizontal direction.

H: dimension 313 of a single data display frame along the vertical direction.

$$i = [(X - X0)/W] \qquad (1)$$
$$j = [(Y - Y0)/H] \qquad (2),$$

where brackets denote Gauss' notation.

In the above-described formulae, when the values are substituted from the right-hand term to the lefthand term, the values become integers. Assuming now that a data display frame located at the uppermost left corner of the screen is expressed by 0-th field and 0-th record, the field number and the record number of the data display frame on the screen, which correspond to the coordinate selected by the mouse device, are obtained (step 2101).

Next, a check is done as to whether or not the values of "i" and "j" obtained at the above step 2101 are proper. That is to say, since there are only 5-field and 4-record display positions along the horizontal and vertical directions, the values of "i" and "j" must not be negative values, or must not become larger than these field and record values of the display positions.

Therefore, a first check is done as to whether or not the value of "i" is greater than "0" and smaller than 5 along the horizontal direction (step 2102), if the value of "i" is present within the above value range, then another check is done as to whether or not the value of "j" is greater than "0" and smaller than 4 along the vertical direction (step 2103). If the value of "j" is also located within the above-described range, it implies that the data display frame is selected. Since the values of "i" and "j" obtained at the step 2102 correspond to the values of the relational table display window, the value of the first field number 501 and the value of the first record number 502 are added to the respective values "i" and ";", so that these values are changed into a field number "I" and a record number "J" corresponding to the actual relational table data 400 (step 2104). That is, data on the place where the field number on the relational table 400 is "I", whereas the record number thereon is "J", become corresponding data. Then, a check is done as to whether or not the data are actually present at the place (I, J) of the relational table 300 (step 2105). If no data is present at this place, then this implies that the designated place corresponds to an empty column, and the process operation is completed under no corresponding data. Conversely, if there exists data at this place (I, J) then the data are derived (step 2106) and the process operation is ended.

On the other hand, if the values of "i" and "j" are outside the above-described range in either judgement process as defined at the step 2102 and 2103, then the place outside the data display frame is designated by the mouse device. Accordingly, the process operation is completed with no corresponding data.

With the above-described process operations, the reference data position of the relational table from the first record position of the base record with the relative position is stored. Since not only a specific record, but also a positional relationship of records located before/after the specific record can be held, the user designates the arbitrary data on the relational table window 300 to position the arrange table positioning region 619. The above-described process is repeatedly rearranged at a desirable place.

A description will now be made of an operation to copy/move an item positioned at an arrange table positioning area, and also of a sequence to arrange a text used in a ruled line frame and a list table.

Figure 23:
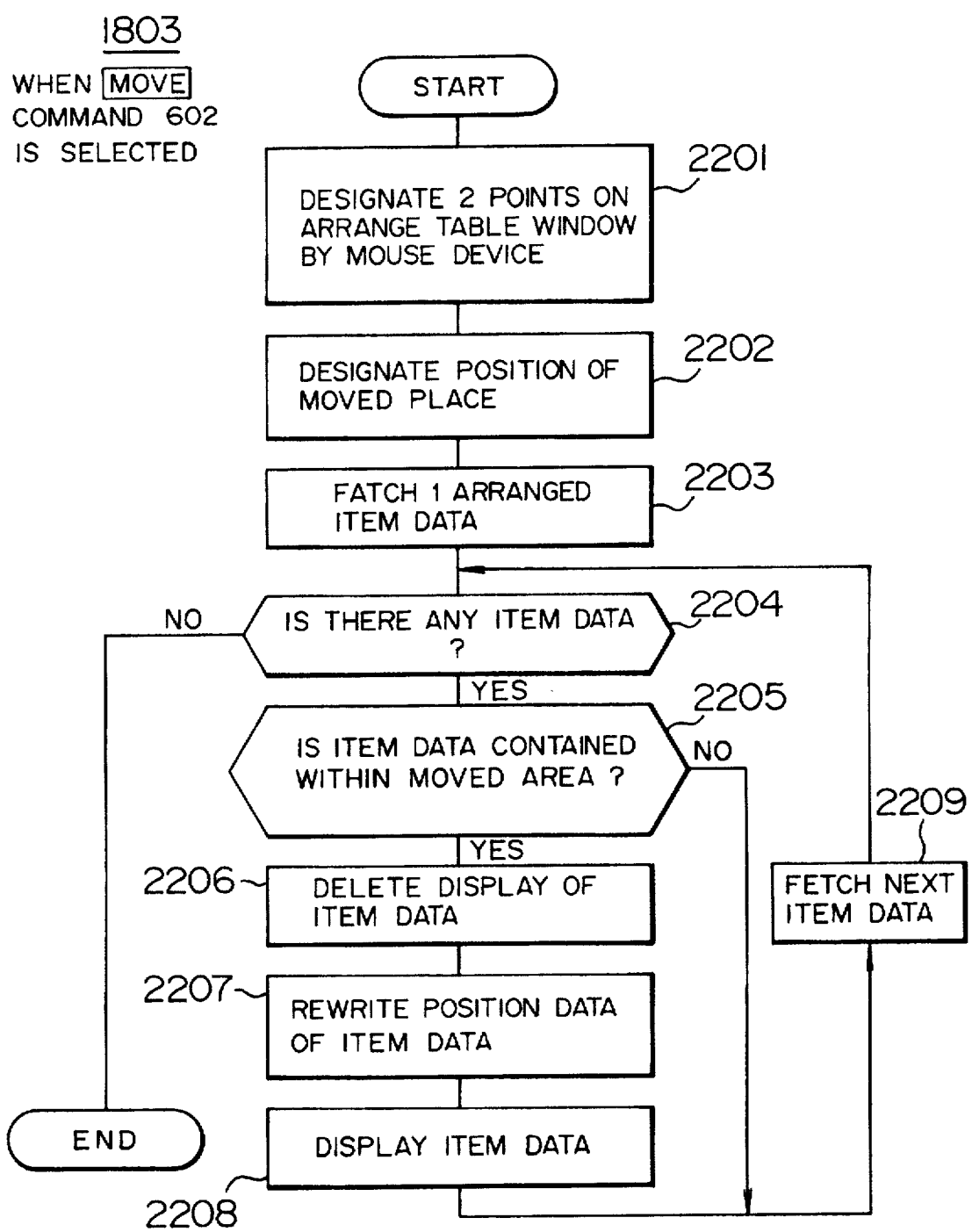
FIG. 23 is a flow chart for indicating a sequence for moving a displayed item at an arranging table positioning area.

First, the sequence to move an item which has been arranged will now be described with reference to a flow chart shown in FIG. 23. This process operation is initiated after "MOVE" of the command 602 has been selected by using the most device 203.

At a first step, a user designates two points of an upper left corner and a lower right corner within a rectangular region to which an item will be transported (step 2201), and designates one point of the position (i.e., moving position) to which the item will be moved (step 2202). It should be noted that this moving position corresponds to the upper left corner where the item is originally located. To sequentially derive the items which have been already positioned (step 2203), a top portion of the item data area 900 coupled to the used item data is derived (step 2203). Then, a check is done whether or not there is item data where a region is used as a unit (step 2204). If there is no item data, then the process operation is accomplished. If there is the region, another check is done whether or not the position of this item data is involved within the rectangular moving region (step 2205). The judgement whether or not the item data is contained within the rectangular region, may be realized by performing such a check whether or not a rectangular item indicated by the arrangement position information 901 to 904 of the item data area 900 is completely contained within the rectangular region designated by the step 2201. If the item data is contained within the region, then the display of the item data is deleted from the screen by employing the ID number 910 of the above-described item data (step 2206). The values of the position information 901 to 904 for the item data are updated by values obtained by adding a difference between the upper left coordinate value of the original moving point and the coordinate value of the moving point (step 2207). The item data is represented based on the new position information (step 2208). Subsequently, the next item data is derived, while tracing the used item data list (step 2209) and then the process operation is returned to the step 2204. Also, if the position of the item data is not located within the moving area in the judgement process 2205, no process operation is carried out, and then the process operation is advanced to a further step 2209 at which the next item data is derived.

Figure 24:
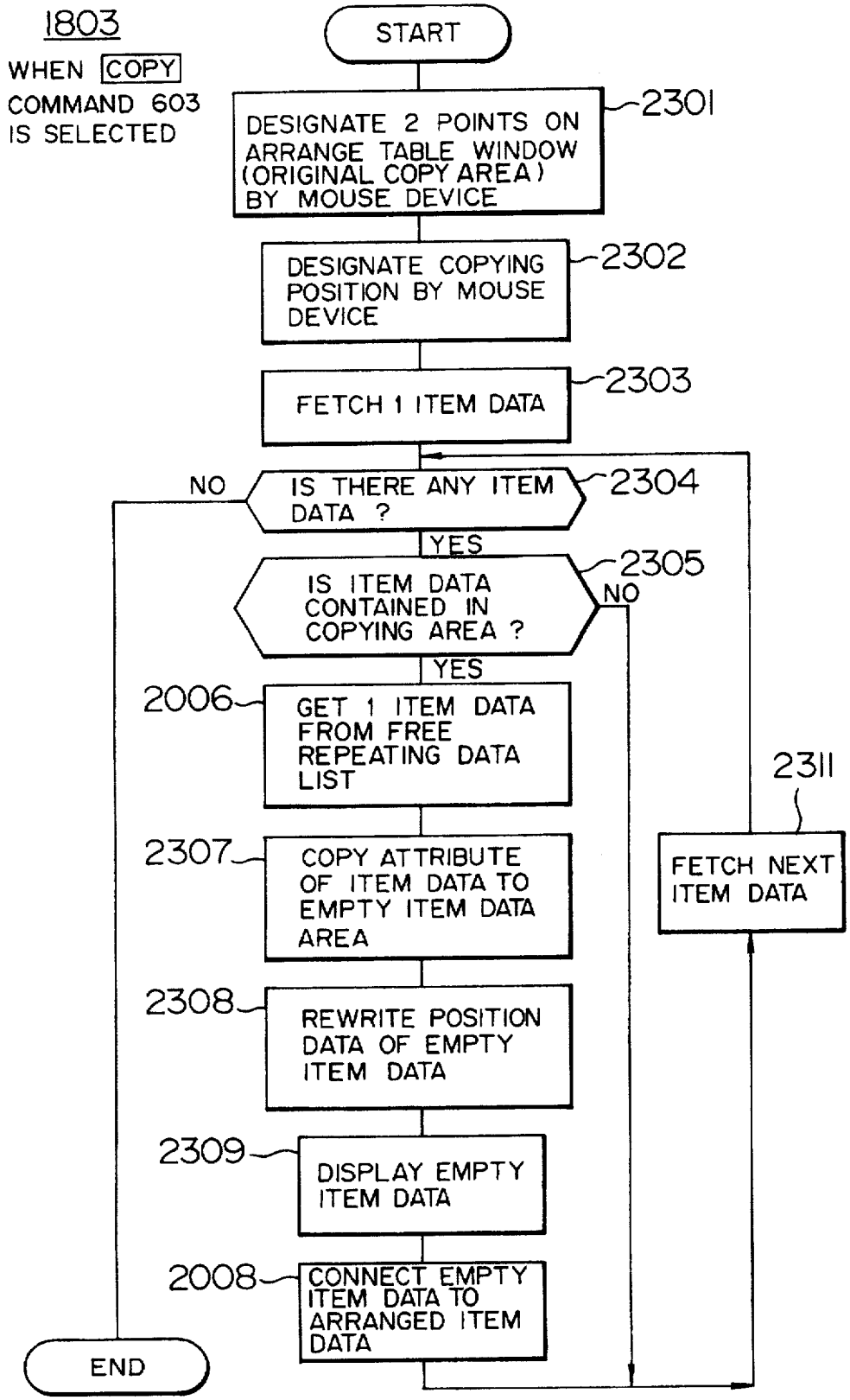
FIG. 24 is a flow chart for indicating a sequence for duplicating a displayed item at the arranging table positioning area.

Subsequently, the sequence to copy the arranged item data will now be explained with reference to a flow chart of FIG. 24. This copying process operation is initiated after a "COPY" command 603 has been selected by operating the mouse device 203.

Similar to the process operation of the above described "move", a rectangular area of an original copying area is designated by the mouse 203 (step 2301). A moving position is designated by the mouse device 203 (step 2302). A top portion of the item data area 900 coupled to the used item data list is derived (step 2303), and a check is done whether or not an area (item data) is present (step 2304). If no item data is present, then the process operation is ended. If the item data is present, then another check is made as to whether or not the corresponding item data is contained within the original copying area (step 2305). If the item data is contained within the area, then a new item data area 900 is allocated to the empty list 1201 (step 2006). To the respective attribute data of the allocated free item data area 900, the attribute data of the above-described used item data are copied (step 2308). Thereafter, the values of the position information 901 to 904 of the free item data region 900 are updated by values obtained by adding only a difference between the coordinate value of the upper-left original copying area and the coordinate value of the copying area (step 2309). The content of this free item data area 900 are displayed on the arrange table positioning area 619 (step 2309). Then, the free item data area 900 is connected to the trail portion of the used item data list (step 2008). Next, the subsequent arranged item data is fetched by tracing the chain (step 2311), and the process operation is returned to the step 2304. Further, if no item data is present within the original copying region at the judgement process 2305, then no process operation is carried out and then the process operation is advanced to a step 2311 at which the next item data is derived.

Figure 25:
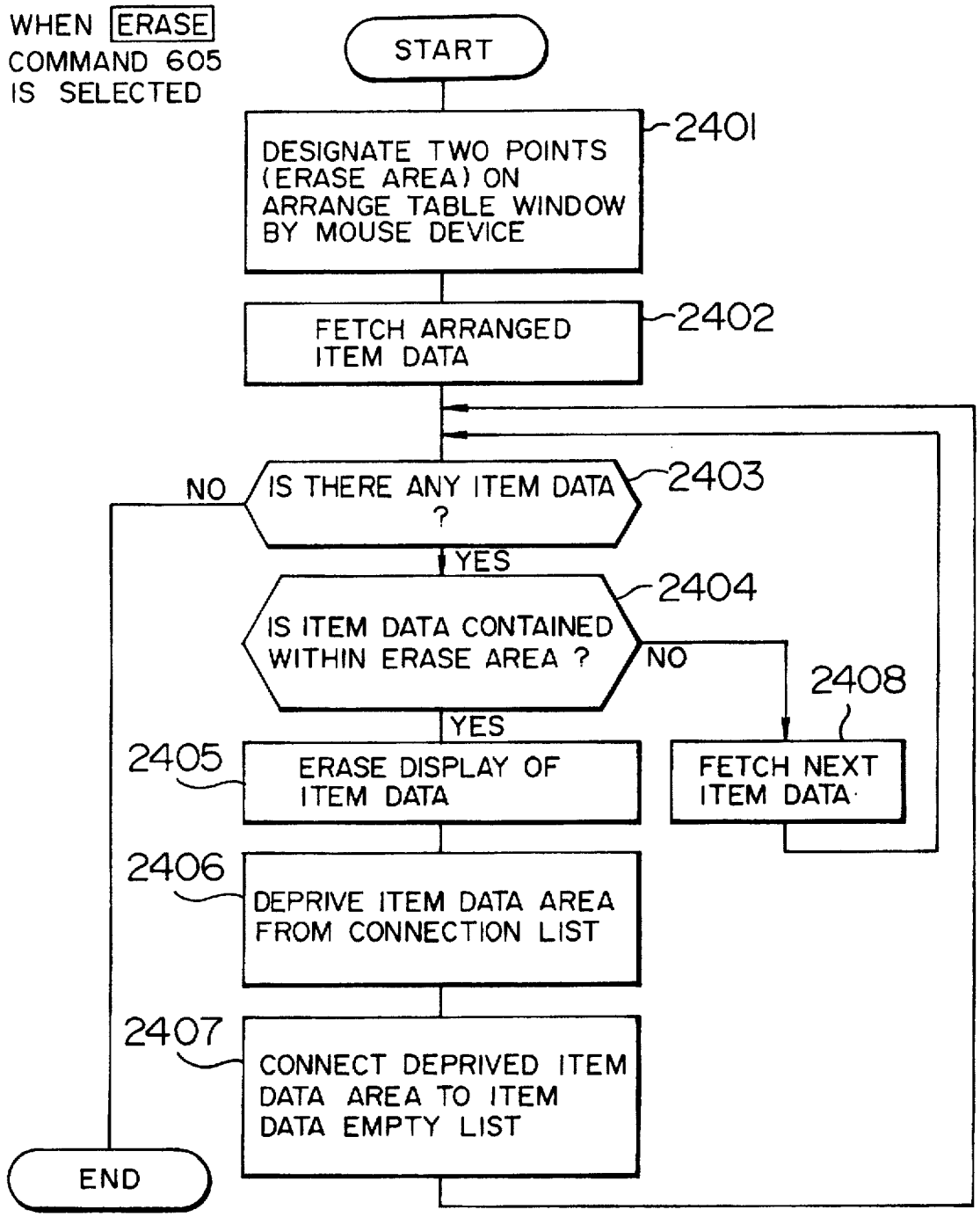
FIG. 25 is a flow chart for denoting a sequence to delete a displayed item at the arranging table positioning area.

Then, a sequence to delete arranged item data will now be explained with reference to a flow chart shown in FIG. 25. This delete process operation is initiated after a "DELETE" command 605 has been selected by the mouse device 203.

Similar to the "move" sequence, when a delete region is designated (step 2401), a top portion of the item data area 900 coupled to the used item data list is derived (step 2402), and a check is done whether or not there is item data where a region is used as a unit (step 2403). If there is no item data, then the process operation is accomplished. If there is the item data, then a judgement is made whether or not the display positions 901 to 904 of the item data are contained in the delete region (step 2404). If the display position is involved in the delete region, then the representation of the item data is deleted (step 2405), and the above explained item date area 900 is deprived from the used item data list (step 2406), and further the deprived item data area 900 is returned to the free item data list (step 2407). Next, the process operation is returned to the step 2403 at which the process operation is continued with respect to the next item data (namely, the next item data has already been derived because the item data had been deprived from the used item data list). If the display position is not contained within the delete region at the judgement process 2404, the subsequent arranged item data is derived, while tracing the item data (step 2408), and the process operation is returned to the step 2403.

Figure 26:
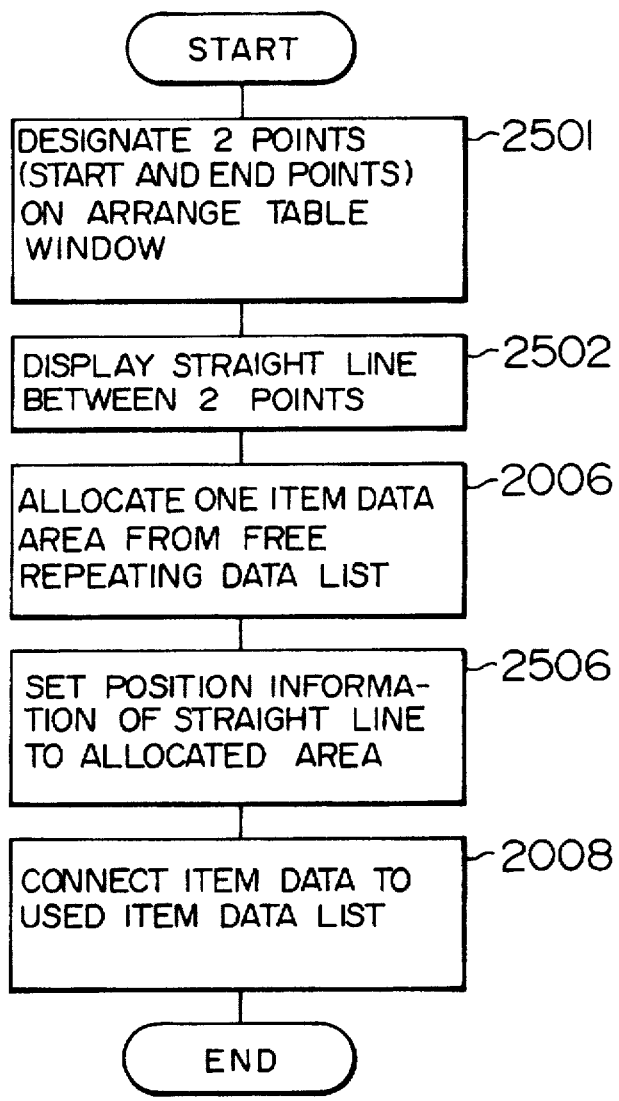
FIG. 26 is a flow chart for showing a ruled line drawing sequence at the arranging table positioning area.
Figure 27:
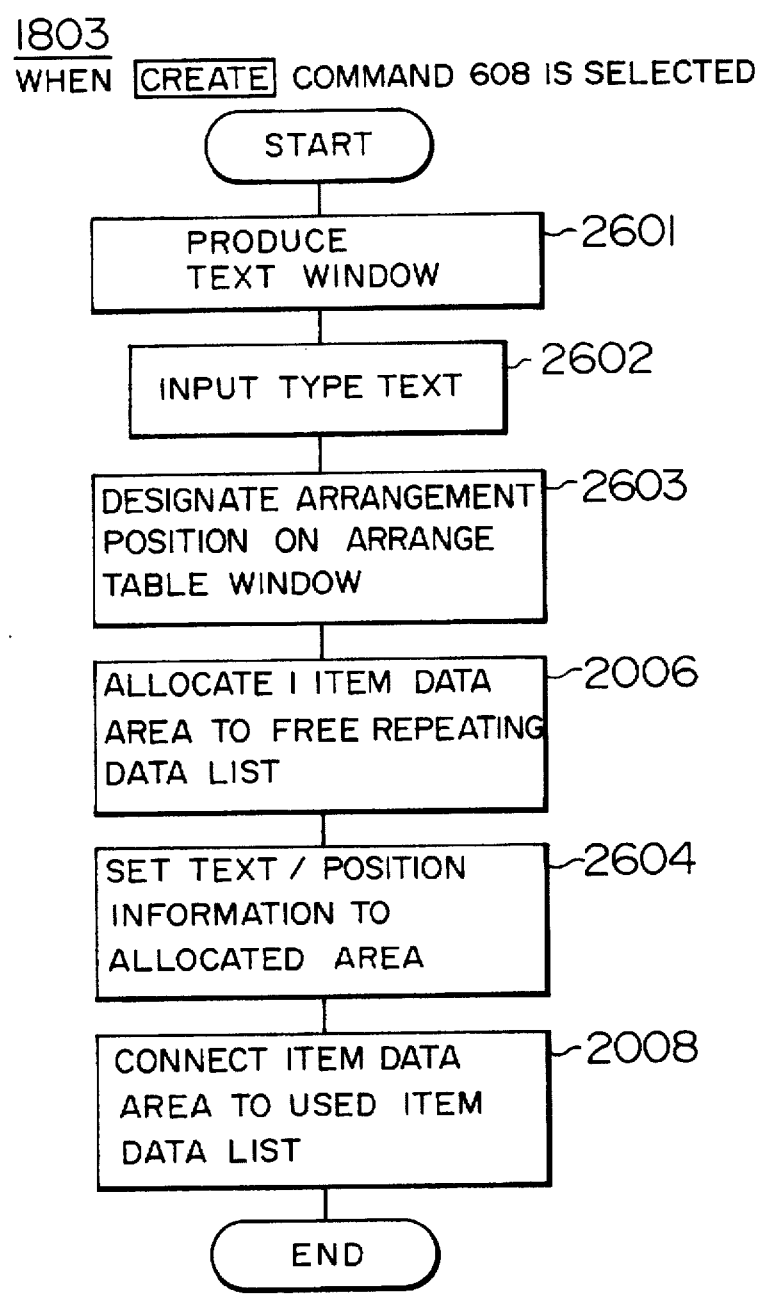
FIG. 27 is a flow chart for indicating a type text arranging sequence at the arranging table positioning area.

In accordance with a flow chart shown in FIG. 26, a sequence to draw a ruled line frame will now be explained. This drawing sequential process is initiated after a "DRAW" command 606 has been selected.

First, a user designates a starting point and an ending point of a straight line by employing the mouse device 203 (step 2501), so that a straight line is displayed between these two points (step 2502). Subsequently, the item data area 900 is allocated to the free item data list 1201 (step 2006). The data on the coordinate positions of the starting point and also the ending point are stored into the position information 901 to 904 of this region 900, and a "straight line" is set to the item type 905 (step 2504). Then, the allocated region is connected to the trail portion of the used item data list (step 2008). A plurality of straight lines are drawn by repeatedly performing the above-described sequence, so that a ruled line frame is produced.

Also, a sequence for deleting only a ruled line from a screen is initiated after the user selects a "DELETE" command 607. This process sequence may be readily realized by simply changing the judgement process defined at the step 2404 of FIG. 25 into such a judgement content that the item data is contained within the delete region and also the item type 905 corresponds to a "straight line".

Next, a description will now be made of a sequence for arranging such a character series as an index character of a form and a comment, which has no direct relationship with the data of the relation table. This sequential process is initiated after a "CREATE" command 608 has been selected.

First, a window to input a character series is produced (step 2601), and a user enters the character series with employment of the keyboard 202. Next, the user designates a position to be arranged on the arrange table positioning area 619 (step 2603). Then, the item data region 900 is allocated from the free item list (step 2006), and the character series inputted at the step 2602 is set into a character series storage region 906 of the region 900. The information related to the arranging position is set to the region 901 to 904, and a "text" is set to the item type 905. Then, this item data area 900 is coupled to the trail of the used item data list (step 2008). With the above-described process operation, an arbitrary character series inputted by the user is arranged on the desired place of the arrange table positioning area.

With the above-described step 106, a basic portion can be produced in the arrange table positioning area 619 which becomes a sample of layout desired by the user, as shown in FIG. 28. In FIG. 28, the character series of 2701 corresponds to such a character series entered by the user as a text. It can be seen from this figure that the ruled line frame 2702 is also arranged.

(3) Production of Repeating Data (step 113)

After the basic portion of the layout desired by the user has been produced in the arrange table positioning region 619, the user designates how to repeatedly display this basic portion on the arrange table positioning region 619.

(3-1) Designation of Repeating Data (step 107)

Figure 29:
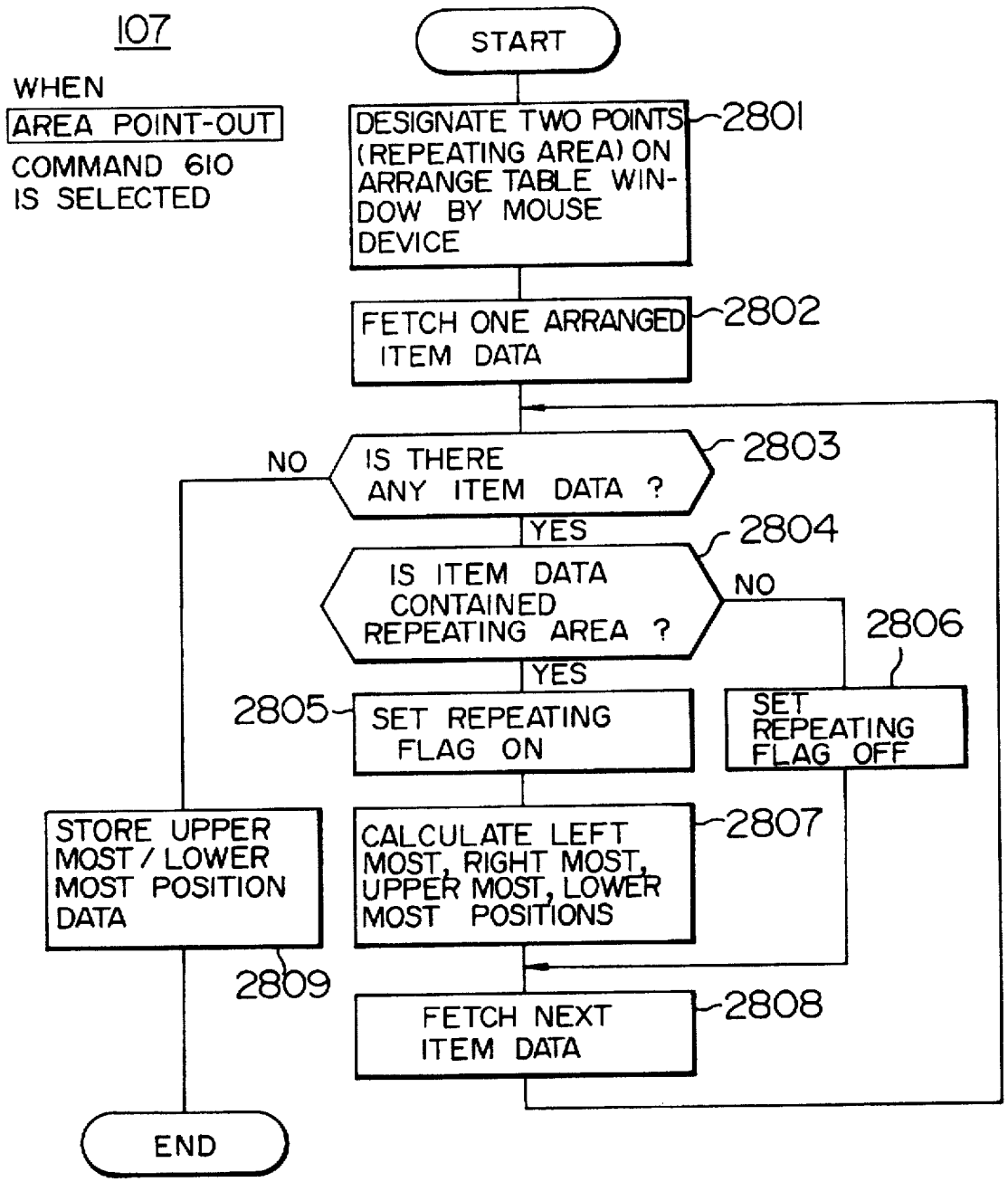
FIG. 29 is a flow chart for indicating a repeating item designation sequence at the arranging table positioning area.

First, the user designates a region on the arrange table positioning region 619, which becomes a repeating portion, so that arrange item data to be repeated is determined (step 107). A detailed process sequence of the step 107 will now be explained with reference to a flow chart shown in FIG. 29. It should be noted that this process sequence is initiated after an "Area Designate" of a command 610 has been selected.

First, a user designates 2 points (namely, an upper left corner and a lower right corner of a rectangular area which becomes a repeating portion) on the arrange table positioning area 619 by employing the mouse device 203 step (2801). Next, in order to sequentially derive the arranged item data, the top portion of the item data area 900 coupled to the used item data list is derived (step 2802), and a check is done whether or not there is item data where it is used as a unit of region (step 2803). If there is the item data, then another check is done whether or not the position of this item data is contained in the rectangular repeating area (step 2804). It should be understood that the judgement whether or not the item data is contained in the region, is realized by checking whether or not the arranging position information 901 to 904 of the item data region 900 are completely contained within the rectangular region designated at the step 2801. If the item data is contained in the region, then "ON" is set to a repeating flag 909 of the item data (step 2805), and the following process is carried out with reference to the values of the item data position information 901 to 904 (step 2807). That is, the left most position, rightmost position, uppermost position, and lowermost position are obtained from the item data contained in the repeating area, which have been so far derived. Thereafter, the next item data is derived, while tracing the used item data list (step 2809), and the process operation is returned to the step 2803. To the contrary, if no item data is present within the repeating region at the judgement process 2205, no process operation is carried out and the process operation is advanced to step 2809, at which the next item data is derived. When the process operation is accomplished for all of the arranged item data and no item data to be judged as defined at the step 2803, the coordinate values of the uppermost, leftmost, rightmost and lowermost positions for the final item data obtained at the step 2807 are stored into the storage regions 802 to 805 of the repeating information region 800, respectively, and then the process operation is ended.

(3-2) input of Repeating Parameter (step 108)

Figure 31:
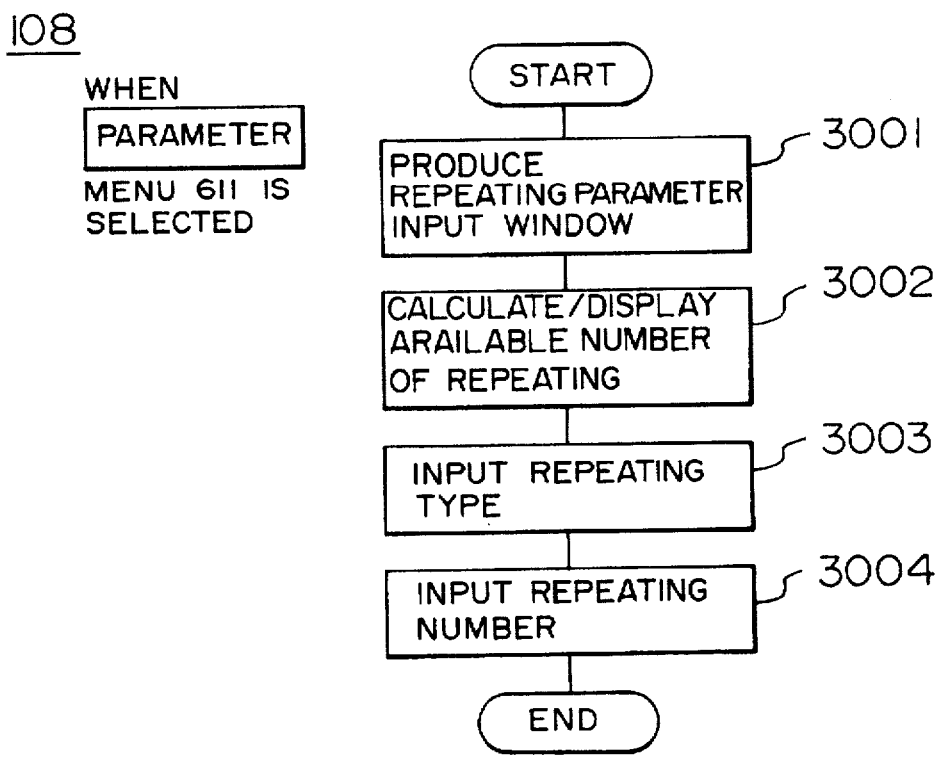
FIG. 31 is a flow chart for indicating a repeating parameter setting sequence.

Then, such a parameter is inputted to specify how the repeating designated at the step 107 is to be repeated in a sequence, or how many times the repeating area is repeated (step 108). A detailed process sequential operation will now be explained with reference to a flow chart shown in FIG. 31.

Figure 30:
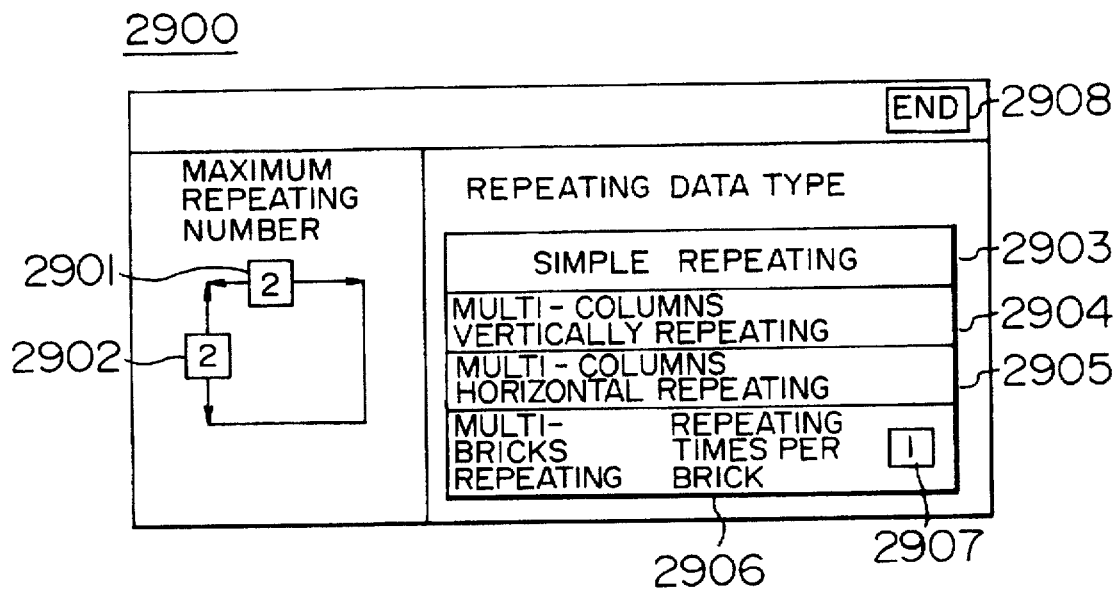
FIG. 30 schematically indicates an output example of a repeating parameter setting display.

First, a repeating parameter input window 2900 is created. An output example of this window parameter 2900 is shown in FIG. 30. As shown in FIG. 30, the window 2900 is constructed of regions 2901, 2902 in which the repeating numbers in the horizontal direction and the vertical direction are inputted, and a repeating type menu (2903 to 2906) for selecting the repeating sequence.

A description of the repeating type will now be made.

Figure 32:
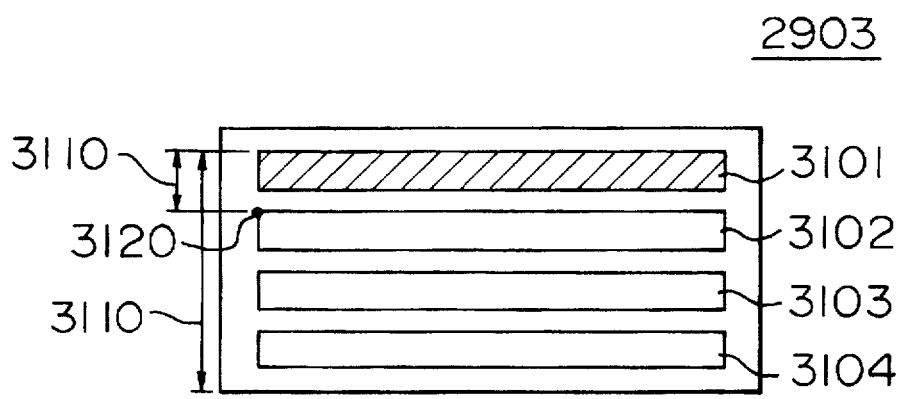
FIG. 32 is an explanatory diagram of an output of a simple vertically repeating form.

There are four repeating types. One of these repeating types may be designated. A simple repeating 2903 is such that, as shown in FIG. 32, assuming now that the repeating region designated at the step 107 is an inclined portion 3101, a layout similar to this inclined portion 3101 is simply repeated along the lower (vertical) direction. The repeating sequence is realized by sequentially displaying the inclined portions from 3102 in an order of number.

Figure 33:
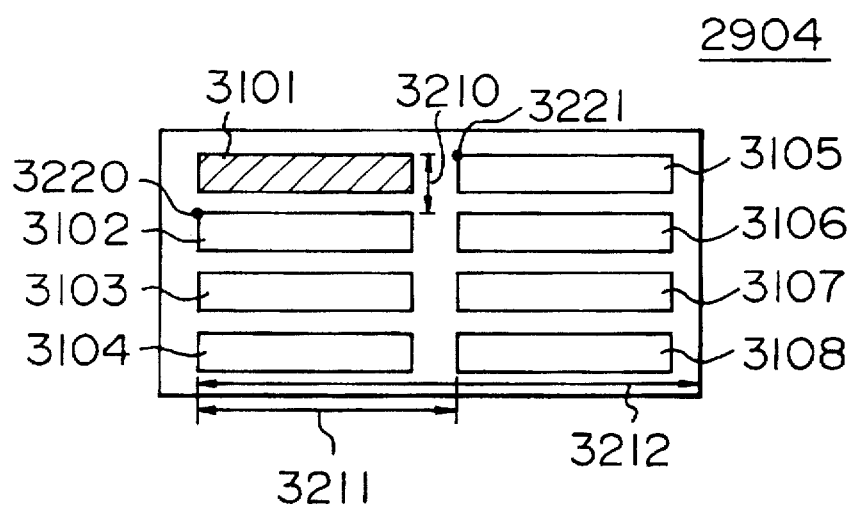
FIG. 33 is an explanatory diagram of an output of a multi-columns vertically repeating form.

When a designation is made of multi-columns vertically repeating columns 2904, as indicated in FIG. 33, the repeating operation is once performed along the lower direction, thereafter is moved to the right direction, and then again repeated from the upper direction to the lower direction.

Figure 34:
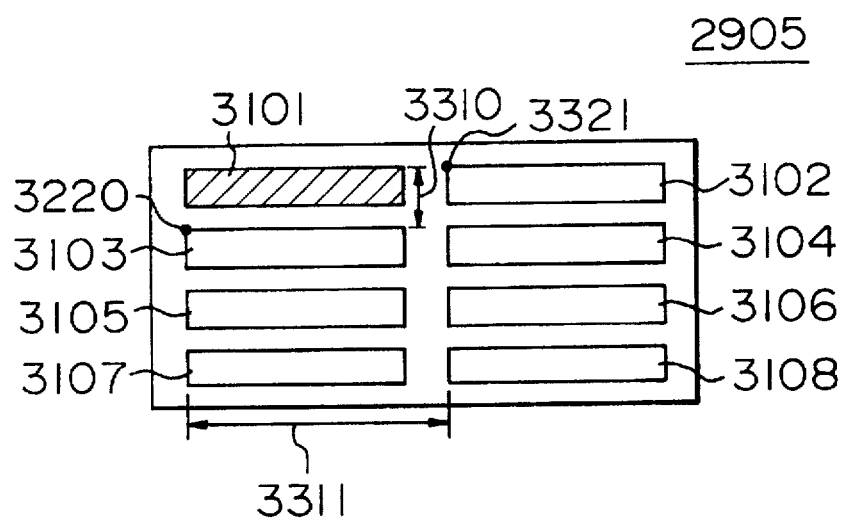
FIG. 34 is an explanatory diagram of an output of a multi-columns horizontally repeating form.

As indicated in FIG. 34, when multi-column horizontally repeating columns 2905 are designated, the repeating operation is once repeated along in the right direction, thereafter is moved to the lower direction, and is again repeated from the left direction to the right direction.

Figure 35:
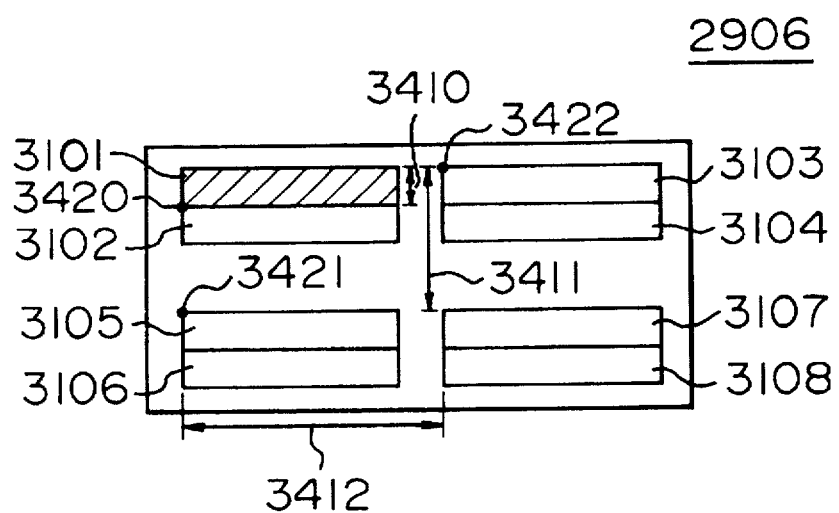
FIG. 35 is an explanatory diagram of an output of a multi-bricks repeating form.

As shown in FIG. 35, multi-bricks repeating 2906 are such that the repeating operation is once repeated along the lower direction, and a repeating block similar thereto is first repeated along the right direction and then along the lower direction. Accordingly, a region 2907 into which the number of the repeating operation performed with the block is inputted, is provided with this menu 2906. "1" is set to an initial value of this repeating number.

After the repeating parameter input window has been produced, the maximum number of repeating times is calculated and then displayed on regions 2901 and 2902 (step 3002). Since the coordinate values of the most upper-left position and of the most lower-right position within the repeating range are stored into entries from 802 to 805 of the repeating data region 800 at the step 107, the maximum horizontal width and the maximum vertical width are obtained based on these values. A calculation is performed how many repeating regions can be arranged at a maximum within a paper information area 700 having a horizontal size of 702 and a vertical size of 703. Thereafter the user selects one of the repeating type menu 2903 to 2906 by way of the mouse device (step 3003). At this time, when the repeating type corresponds to the multi bricks 2906, the user enters the number of repeating operation 2907 within the brick. Subsequently, if required, the user updates the values of the maximum repeating operations 2901 and 2902 (step 3004). It should be noted that the user is allowed to input only the values smaller than the above-explained number which were originally displayed.

(3-3) Input of Repenting Position (step 109)

Figure 36:
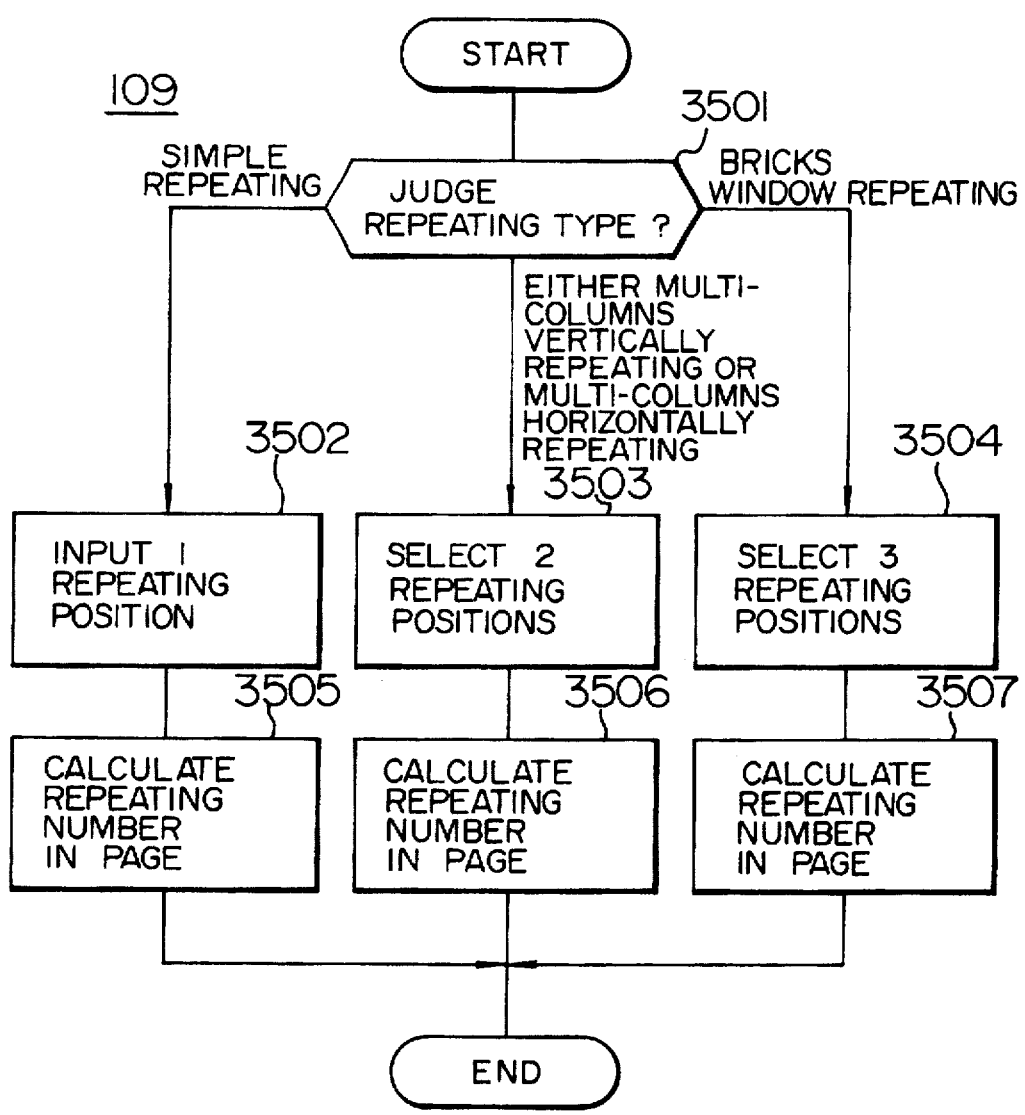
FIG. 36 is a flow chart for indicating a repeating position input sequence.

After the repeating parameter has been entered, the user inputs the repeating position (step 109). This process operation will now be explained more in detail with reference to a flow chart of FIG. 36. At a step 3003, a check is done about the type of repeating selected by the user (step 3501). The user designates the repeating position, the number of which is different from each other, depending upon the type of repeating. When the type of repeating is a simple vertical repeating, the user designates one of the repeating positions (step 3502). Concretely speaking, as represented by a point 3120 in FIG. 32, the user designates a position of item data which will be arranged subsequently. When the type of repeating corresponds to either the multiple vertically repeating columns, or the multiple horizontally repeating columns, the user designates two repeating positions (step 3503). These two points correspond to either points 3220 and 3221 of FIG. 33, or points 3320 and 3321 of FIG. 34. When the type of repeating corresponds to the multiple bricks, the user designates 3 points (step 3504). The three points correspond to points 3420, 3421 and 3422 of FIG. 35. In any case, the user directly designates the positions within the arrange table positioning region 619 by employing the mouse device 203. In case of the simple vertically repeating column, only the number of repeating operation along the Y-axis direction is obtained (step 3505); in case of the multi-columns vertically repeating columns and the multi-columns horizontally repeating columns, the number of repeating operation along the X-axis direction and the Y-axis direction is obtained (step 3506); and further in case of the multi-bricks repeating, the number of repeating operation within the bricks is obtained in addition to the calculation of the number of repeating operation along the X-axis direction and the Y-axis direction. For instance, in case of the simple repeating operation shown in FIG. 32, with respect to the calculation of the repeating number, the number of repeating margin of the size 3110, which can be entered into the range of the possible repeating size 3112, can be simply obtained from an integer part of the size 3112 X the size 3110. Similarly, the number of repeating margin along the X-axis direction may be obtained from an integer part of the size 3212 - the size 3211.

(3-4) Application of Repenting (step 110)

After the repeating position has been designated, the repeating process is applied, so that the remaining records of the relational table are automatically and sequentially displayed at the arrange table positioning region (step 110).

Since this process operation is different from each other, depending upon the type of repeating, the respective process operations for the simple repeating column, the multiple vertically repeating columns, the multiple horizontally repeating columns, and the multiple bricks will now be explained with reference to FIGS. 37 to 42.

First, the process operation in case of the simple repeating column will now be explained in accordance with a flow chart shown in FIG. 37. A margin value 3110 along the Y-axis direction is substituted by a program variable $\Delta y$ (step 3601), and a program variable $\Delta x$ indicative of a margin value along the x-axis direction is substituted by "0" (step 3602). An initial value of "1" is entered into a program variable "j" for counting the number of data which has repeatedly been displayed on the screen (step 3603). A check is done whether or not the value of the program variable "j" is smaller than the repeating number along the y-axis direction (step 3604). If the value of the program variable "j" is larger than, or equal to the repeating number, the simple repeating process is completed. If the value of the variable "j" is smaller than the repeating number, the value of the base record width 504 is added to the value of the first number 503 of the base record (step 3605), and then a check is done whether or not the actual data is located at the place of the first number of the new base record (step 3606). If no data is present, then the process operation is accomplished, whereas if the actual data is present, the repeating display is executed with the present base record being as a target (step 3607). This repeating display sequence (step 3607) will now be explained more in detail in accordance with a flow chart shown in FIG. 41.

First, first item data 900 of the arranged item data is derived (step 4001). If no item data is present, then the process operation is ended. If there is item data, then a check is done whether or not the repeating target flag 909 of the above-described item data is set to "ON" (step 4003). If the target flag 909 is set to "ON", then another check is done whether or not the type of item data 905 corresponds to "mapping" (step 4004). If the type of item data 905 corresponds to "mapping", the corresponding data is derived (step 4005). The derived data is such a data that the field name 404 on the relational table data 400 is coincident with the mapping field name 906, the record number 403 of which is indicated by a value obtained by adding the value of the mapping record number 907 to the value of the first number 503 of the base record. If the type of item data does not correspond to the mapping data (in case of "text" or "straight line"), the process defined at the step 4005 is omitted and the position of the above described item data is updated (step 4006). In the above-explained updating process operation, the value of the program variable Δx is temporarily added to the values of the coordinate values 901 and 903 along the x axis direction among the information indicative of the item data arranging positions for the item data area 900, and the value of the program variable Δy is added to the values of the coordinate values 902, 904 along the y-axis direction. The above-described item data is represented by the updated coordinate positions (step 4007). Thereafter, the subsequent item data is derived (step 4008) and then the process operation is returned to the step 4002 at which a similar process operation will be performed to the remaining item data. It should be noted that when the repeating flag of the above-described item data becomes "OFF" at the judgement process 4003, the process operation is carried out with regard to the next item data at a step 4008.

As described above, after the first repeating process of the repeating item data has been performed, 1 margin value is furthermore added to the value of the program variable Δy (step 3608), "1" is added to the repeating counter variable "j" (step 3609), and the process operation is returned to the step 3604 at which the above-described process operation is repeatedly performed. As a result, a one page display of the repeating operation is accomplished on the screen.

With reference to a flow chart shown in FIG. 38, the process sequential operation for the repeating application in case of the multi-column vertically repeating columns will now be explained. First, the margin value 3210 along the Y-axis direction is substituted by the program variable Δy (step 3701), and the program variable Δx indicative of the margin value along the X-axis direction is substituted by "0" (step 3702). Then, "1" is substituted into the program variable "j" used to count the number which has been repeatedly displayed along the Y-direction of the screen (step 3703), and further "0" is substituted into the variable "i" used to count the number which has been repeatedly displayed along the X-direction (step 3704). Thereafter, a check is done whether or not the value of the variable "i" is such a numeral value smaller than the repeating number along the X-axis direction (step 3705). If the value of the variable "i" is greater than, or equal to the repeating number, then process operation is ended. If the value of the variable "i" is smaller than the repeating number, then another check is done as to whether or not the value of the program variable "j" is smaller than the repeating number (obtained at the step 3506) along the Y-axis direction (step 3706). When the value of the variable "j" becomes greater than the repeating number (when the repeating display for a certain 1 column is accomplished), 1 margin 3211 along the X-axis direction is added to the value of Δx (step 3709), and "1" is added to the variable "i" used to count the repeating number along the X-axis direction (step 3710). Then, "0" is set to the variable Δy (step 3711), and "0" is similarly substituted into "j" (step 3711). As a consequence, the process operation is advanced to the next column along the X-axis direction. Thereafter, the process operation is returned to the step 3705. In the judgement process 3706, when the value of the variable "j" is less than the repeating number along the Y axis direction, the width of the base record is added to the first number of the base record (step 3605), and then a check is made as to whether or not data is present at a place indicated by this addition result (step 3606). If there is no data at this place, then the process operation is accomplished. If there is such a data at this place, the repeating display for the present base record is executed (step 3607). As described above, after the first repeating operation for the repeating item data has been performed, 1 margin 3210 is further added to the value of the program variable Δy (step 3707), "1" is added to the repeating counter variable "j" (step 3708), and then the process operation is returned to the step 3706 at which the repeating display for the subsequent place along the Y-axis direction is executed. With the above-described process operation, 1-page repeating display on the screen is completed.

With reference to a flow chart shown in FIG. 39, the process sequential operation for the repeating application in case of the multi-columns horizontally repeating columns will now be explained. This process operation corresponds to the process sequential operation for the multi-column vertically repeating columns shown in FIG. 38, in which the process along the Y-axis direction is substituted by that along the X-axis direction. First, the margin value 3311 along the X-axis direction is substituted into the program variable Δx (step 3801), and the program variable Δy indicative of the margin value along the Y-axis direction is substituted by "0" (step 3802). Then, "0" is substituted into the program variable "j" used to count the number which has been repeatedly displayed along the Y-direction of the screen (step 3803), and further "1" is substituted into the variable "i" used to count the number which has been repeatedly displayed along the x-direction (step 3804). Thereafter, a check is done whether or not the value of the variable "j" is such a numeral value smaller than the repeating number (obtained at step 3506) along the Y-axis direction (step 3805). If the value of the variable "j" is greater than, or equal to the repeating number, then process operation is ended. If the value of the variable "j" is smaller than the repeating number, then another check is done as to whether or not the value of the program variable "j" is smaller than the repeating number (obtained at the step 3506) along the X-axis direction (step 3806). When the value of the variable "i" becomes greater than the repeating number (when the repeating display for a certain 1 column is accomplished), 1 margin 3210 along the Y-axis direction is added to the value of Δy (step 3809), and "1" is added to the variable "j" used to count the repeating number along the Y-axis direction (step 3810). Then, "0" is set to the variable Δx (step 3811), and "10" is similarly substituted into "i" (step 3812). As a result of the above process, since the process operation is advanced to the next column along the Y-axis direction, the process operation is returned to the step 3805. In the judgement process 3806, when the value of the variable "i" is less than the repeating number along the X-axis direction, the width of the base record is added to the first number of the base record (step 3605), and then a check is made as to whether or not data is present at a place indicated by this addition result (step 3606). If there is no data at this place, then the process operation is accomplished. If there is such a data at this place, the repeating display for the present base record is executed (step 3607). As described above, after the first repeating operation for the repeating item data has been performed, 1 margin 3210 is further added to the value of the program variable Δx (step 3807). "1" is added to the repeating counter variable "i" (step 3808), and then the process operation is returned to the step 3806 at which the repeating display for the subsequent place along the X-axis direction is executed. With the above-described process operation, 1-page repeating display on the screen is completed.

Next, the process sequential operation for the repeating application in case of the multi-bricks repeating will now be explained with reference to a flow chart shown in FIG. 40. This process operation corresponds to the process operation for the multi-columns horizontally repeating columns shown in FIG. 39 in addition to the repeating process operation within the brick along the Y-axis direction. First, the margin value 3410 within the bricks along the Y-axis direction is substituted into the program variable Δz (step 3901), and "0" is substituted into the program variable Δx indicative of the margin value along the X-axis direction, and the program variable Δy representative of the margin value along the Y-axis direction (step 3902). Then, "1" is substituted into the program variable "k" used to count the number of the repeating display within the bricks (step 3903), and "0" is substituted into both of the counter variable "i" for the repeating number along the X-axis direction and the counter variable "j" for the repeating number along the Y-axis direction (step 3904). Thereafter, a check is done whether or not the value of the program variable "j" is such a numeral value smaller than the repeating number (obtained at step 3507) along the Y-axis direction (step 3905). If the value of the variable "j" is greater than, or equal to the repeating number, then process operation is ended. If the value of the variable "j" is smaller than the repeating number, then another check is done as to whether or not the value of the program variable "i" is smaller than the repeating number (obtained at the step 3506). When the value of the variable "i" becomes greater than the repeating number (when the repeating display for a certain 1 column is accomplished), 1 margin 3411 along the Y-axis direction is added to the value of Δy (step 3913), and "1" is added to the variable "j" used to count the repeating number along the Y-axis direction (step 3914). Then, "0" is set to the variable Δx, and "0" is similarly substituted into "i" (step 3915). As a consequence, the process operation is advanced to the next column along the Y-axis direction. Thereafter, the process operation is returned to the step 3905. In the judgement process 3906, when the value of the variable "i" is less than the repeating number along the X-axis direction, a check is made as to whether or not the program variable "k" is smaller than the repeating number within the brick (step 3907). If the variable "k" is greater than the repeating number within the bricks (namely when the repeating operation within a certain brick is accomplished), "0" is set to the values of the program variables "k" and Δz (step 3910). Then, in order to display the next brick along the X-axis direction, 1 margin 3412 is furthermore added to the value of Ex (step 3911). "1" is added to the variable "i" (step 3912), and then the process operation is returned to the step 3906.

On the other hand, when the value of the program variable "k" is smaller than the repeating number within the brick in the judgement process 3907, the width of the base record is added to the first number of the base record (step 3605), and then a check is made as to whether or not data is present at a place indicated by this addition result (step 3606). If there is no data at this place, then the process operation is accomplished. If there is such a data at this place, the repeating display for the present base record is executed (step 3916). This step 3916 may be realized by executing the position updating operation along the Y-axis direction at the step 4006 of FIG. 41 in such a manner that not only the variable Δy, but also the variable Δz are added. After the repeating display, 1 margin 3410 within the brick is added to the value of the variable Δz (step 3908). "1" is added to the value of the variable "K" (step 3909), and then the process operation is returned to the step 3907 at which the subsequent repeating process with the brick is performed. As a result, 1-page repeating display on the screen is completed, and the arrange table is represented on the arrange table positioning region 619.

In accordance with the above-described preferred embodiment, table data having a simple two-dimensional format may be changed into a layout desired by a user by way of a simple interactive operation. In this case, the user may designate not only the top record of the base record, but also arbitrary records present before/after this top record with respect to the table format data arranged by the user in the interactive operation.

Also, since the data content of the relational table 300 is directly displayed on the arranged table positioning region 619 with the original display format thereof, the user may produce the form, as if he would directly arrange the data on this form. Furthermore, since it is not required to execute a programming operation to produce a form, even such an unexperienced user may simply define a desirable form.

It should be noted that although the above described preferred embodiment is to repeatedly display the first page, the present invention is not limited to this repeating display operation, but may be modified. For instance, any pages after the second page may be easily displayed. This modified data display sequence according to the present invention will now be described with reference to a flow chart shown in FIG. 42.

First, a user inputs a page number to be displayed by using the keyboard 202 (step 4101). Subsequently, the base record is temporarily moved by the inputted page number (step 4102).

The number "N" of shifted record is calculated by the following equation (3) under condition:

P: inputted page number,
X: repeating number within page along X-axis direction,
Y: repeating number within page along Y-axis direction,
Z: repeating number within brick, and
H: base record width.

$$N=(P-1)*X*Y*Z*H \qquad (3)$$

As a result, the top number of the base record is temporarily changed into such a value obtained by adding only this N record to the original top number of the base record.

Then, a check is done as to whether or not there is data at a place of this new top number of the base record (step 4103). If there is no data, then the inputted page number is changed to the original page number and displayed (step 4107). The top number of the base record is returned to the original number (step 4108), and the process operation is ended. On the other hand, if there is the data in the judgement process 4103, the arrange table positioning area 619 is cleared (step 4104), and the item data whose repeated target flag 909 is set to "OFF" among the arranged item data of the item data area 900, is only once displayed (step 4105). Thereafter, the repeating application process is executed, thereby displaying the repeating item data (step 4106). The process operation defined at this step 4106 may be realized by changing the previously explained repeating application at the step 110 (see flow chart from FIG. 37 to FIG. 40) into the following conditions.

Figure 37:
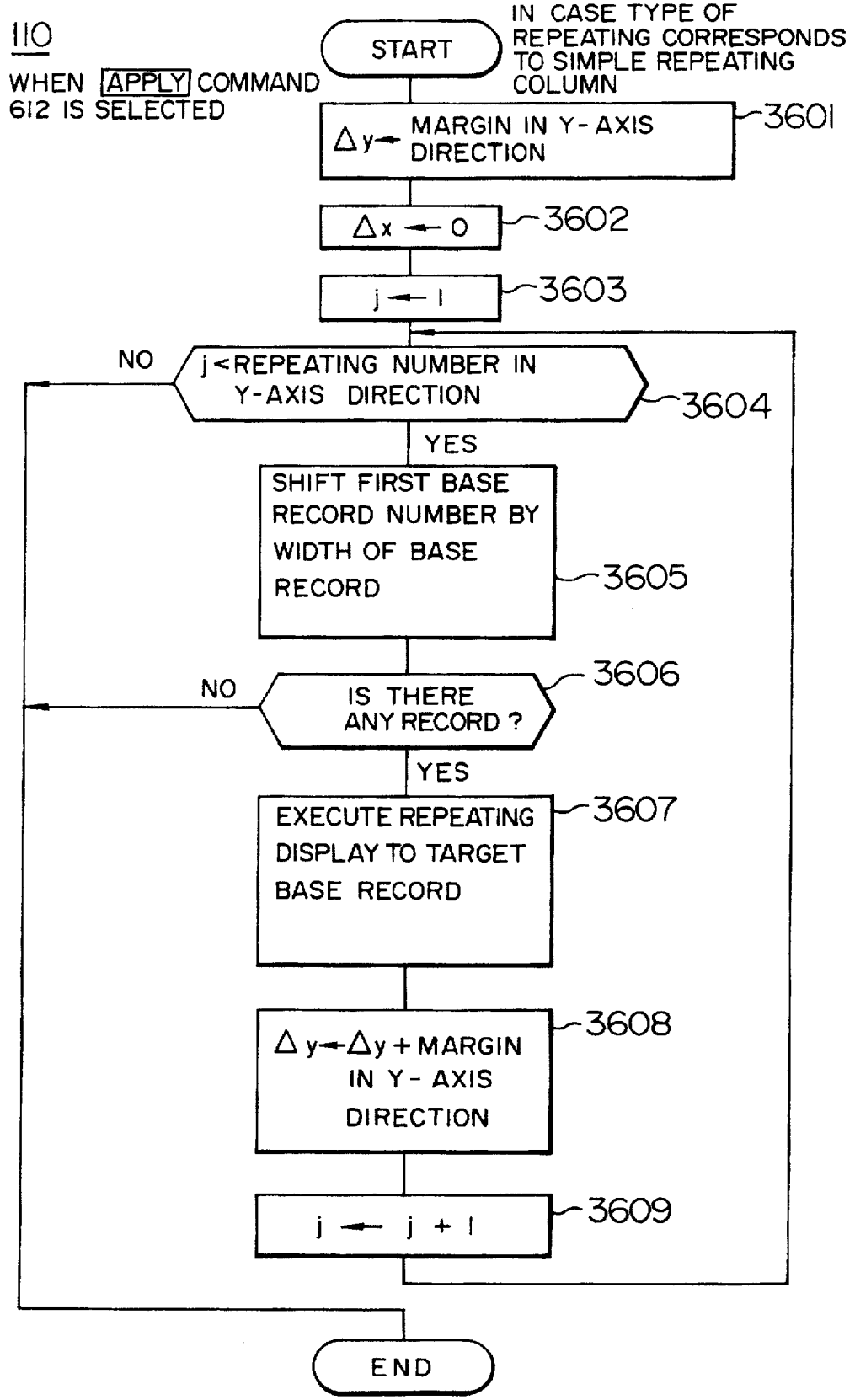
FIG. 37 is a flow chart for representing a repeating display sequence when a simple repeating is applied.

That is, in the flow chart of FIG. 37, "0" is set to Δy at the step 3601, and "0" is substituted into "j" at the step 3603.

Figure 38:
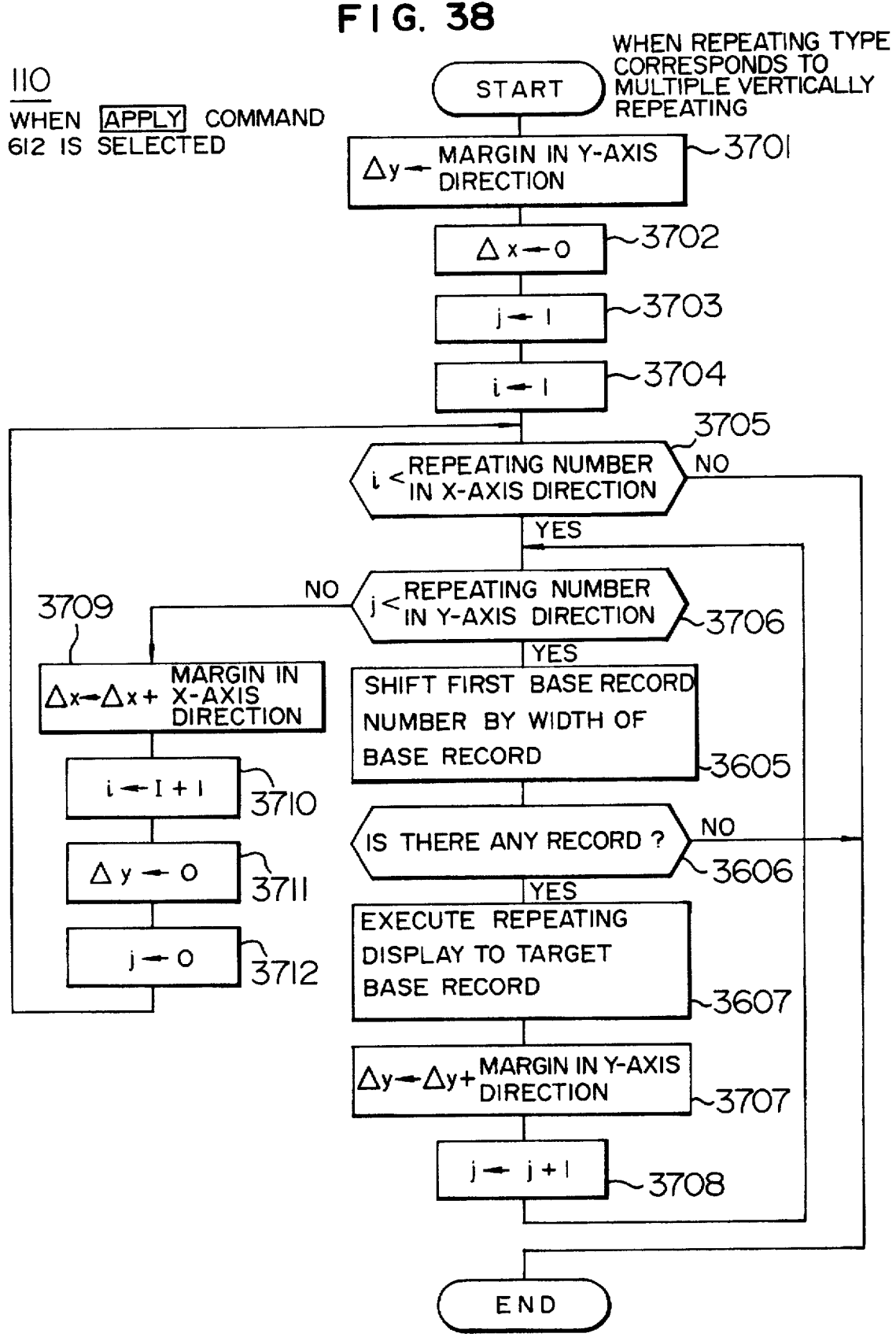
FIG. 38 is a flow chart for showing a repeating display sequence when a multi-column vertical repeating is applied.
Figure 41:
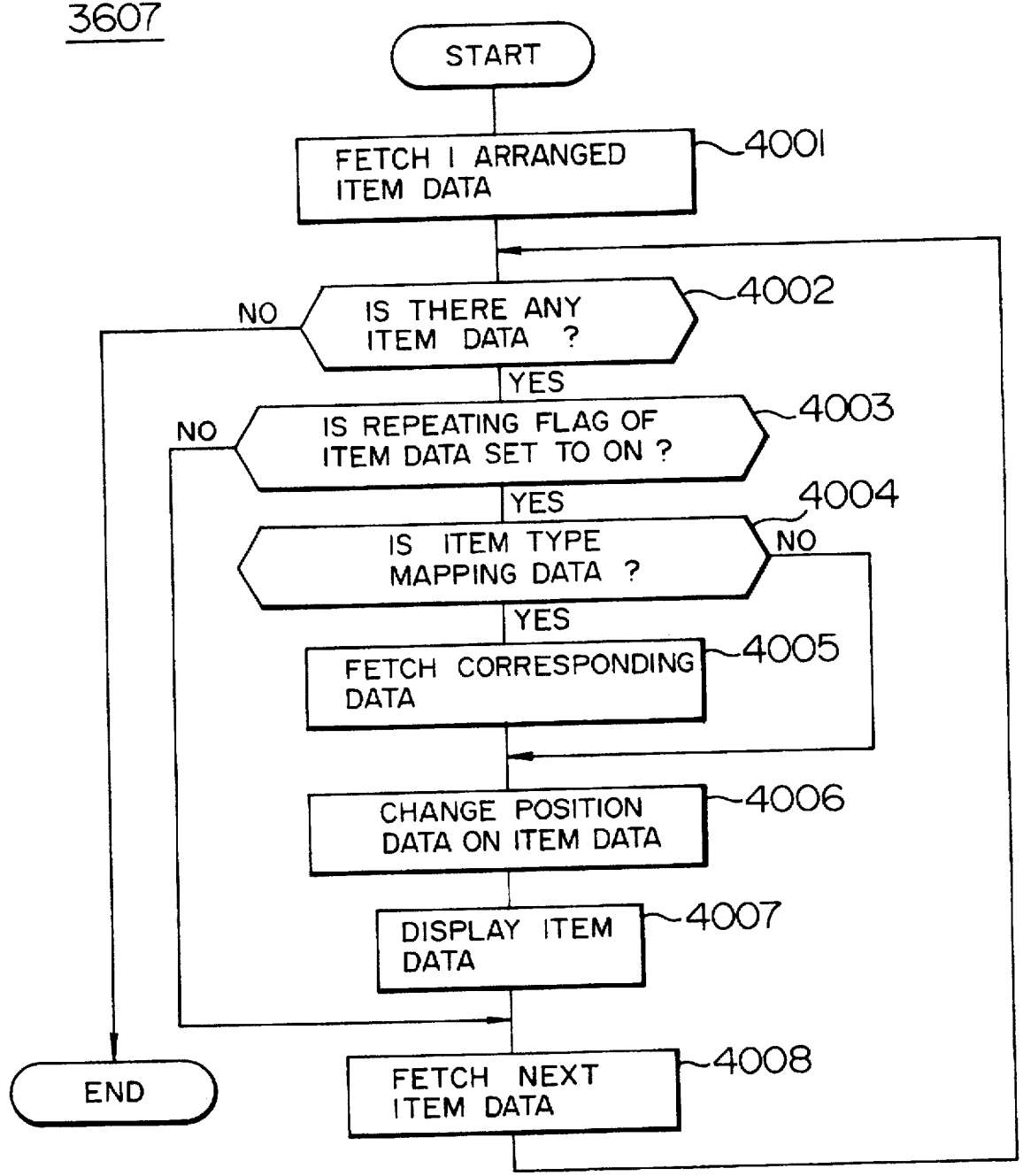
FIG. 41 is a flow chart for indicating a repeating display sequence at a single repeating.

In the flow chart of FIG. 38, "0" is set to Δy at the step 3701, and "0" is substituted into "j" at the step 3703.

In the flow chart of FIG. 39, "0" is set to Δx, and "0" is substituted into "i" at the step 3804.

In the flow chart of FIG. 40, "0" is set to Δz, and "0" is substituted into "K" at the step 3903.

Figure 42:
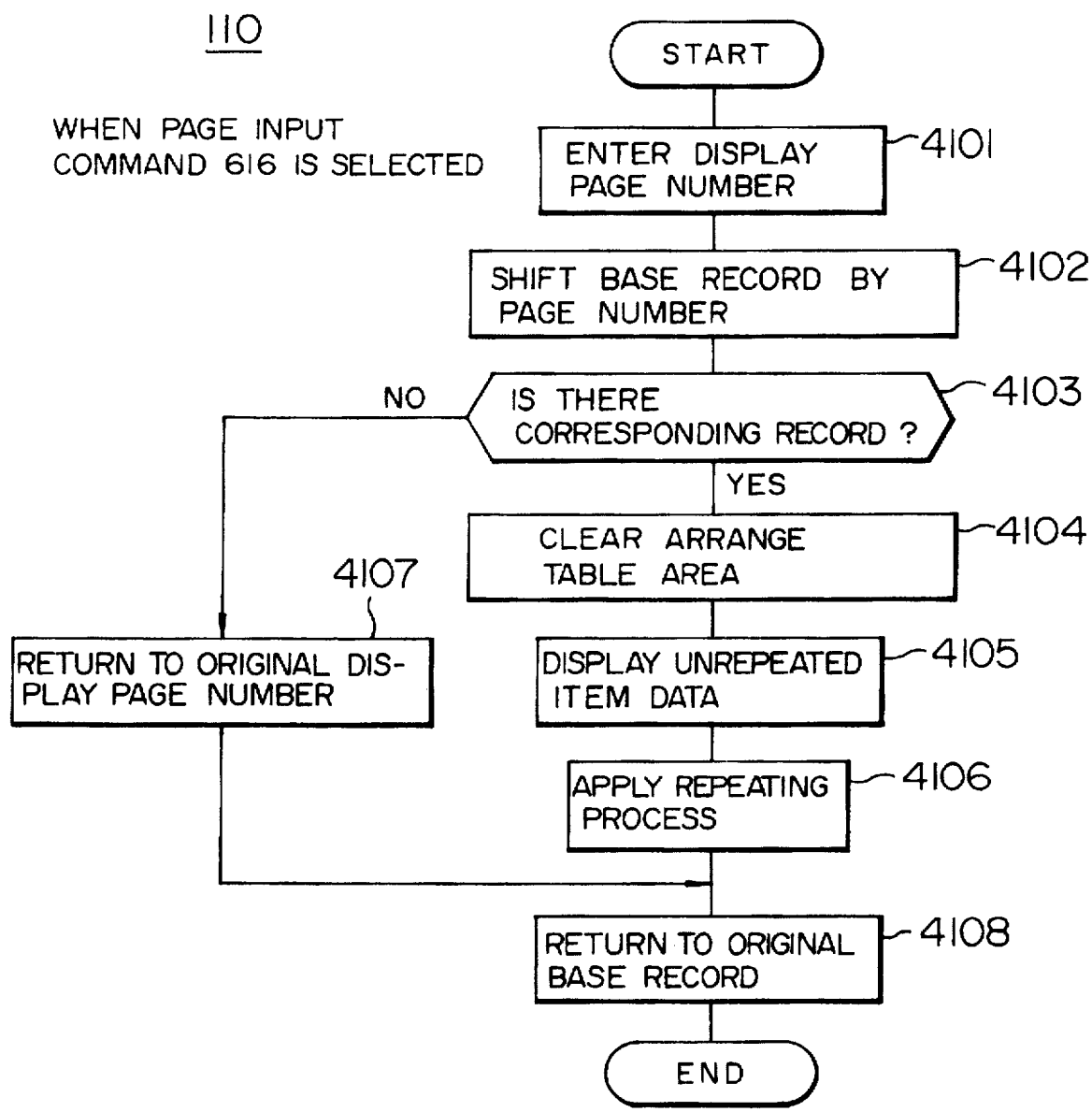
FIG. 42 is a flow chart for showing a sequence to display a designated page of a form.

With the above-described variations, the page designated by the user may be repeatedly displayed. When the user selects the paging regions of the commands 617 and 618 by using the mouse device, the process operation as defined after the step 4102 shown in the flow chart of FIG. 42 is executed, while displaying either a front page, or a rear page with respect to the presently displayed page. As a result, form scrolling operation can be done in page units.

Figure 43:
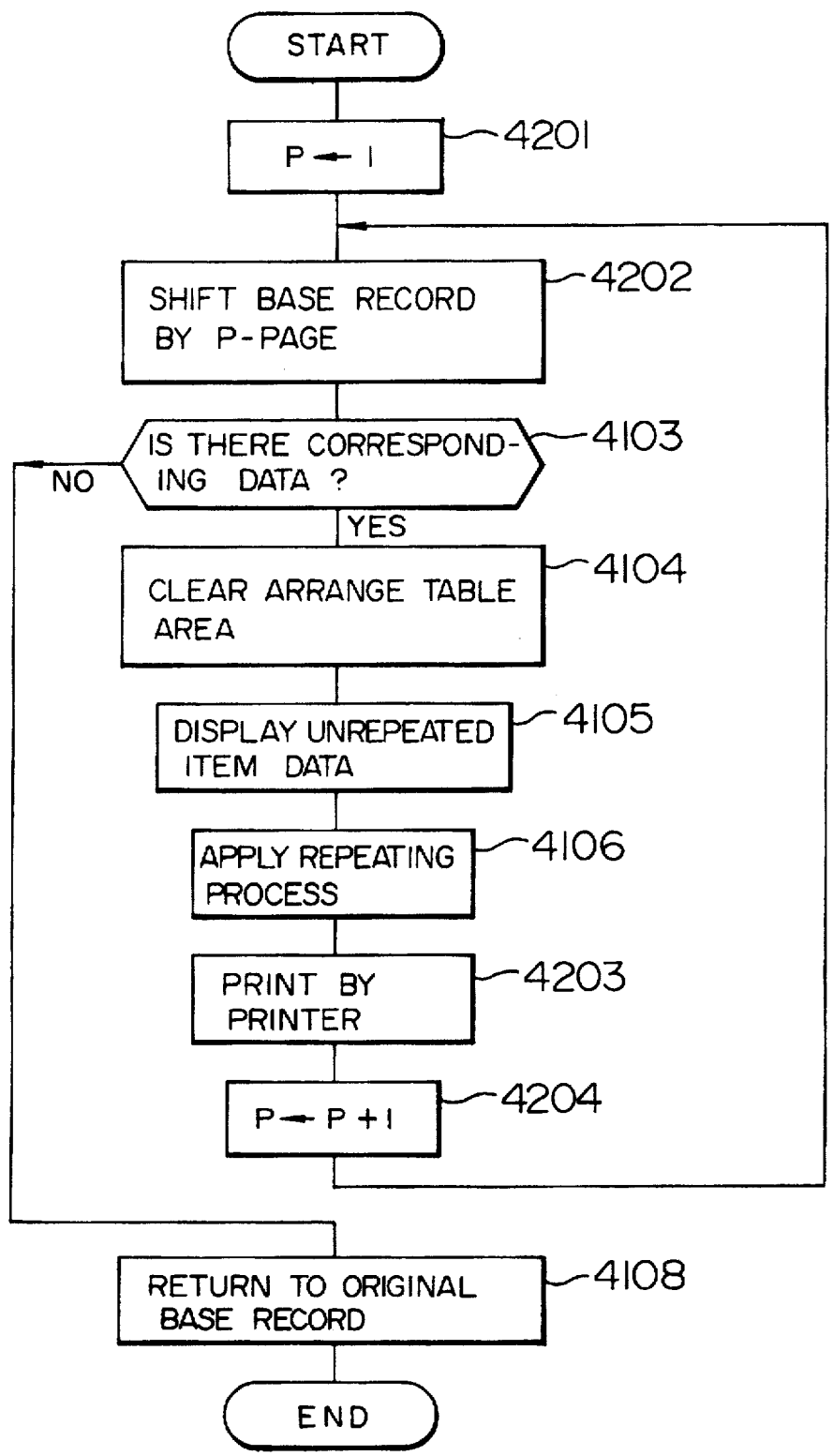
FIG. 43 is a flow chart representing a sequence to print all pages.

Although the form is displayed on the screen in the above-described preferred embodiment, this form may be printed by a printer 204 if this preferred embodiment is slightly modified. This new preferred embodiment will now be explained with reference to a flow chart of FIG. 43. This flow chart corresponds to such a flow chart that the previous flow chart of FIG. 42 is changed and then a plurality of pages can be continuously displayed.

First, "1" is set to a variable "P" indicative of a page to be displayed (step 4201). Then, the top number of the base record is temporarily moved by the page of the variable "P" (step 4202). The record number stored in the variable P may be calculated by the above-described equation (3) at the step 4202. Then, a check is done whether or not there is corresponding data at the place of this new top number of the base record (step 4103). If there is no corresponding data, then the base record is returned to the original base record (step 4108), and the process operation is completed. On the other hand, if there is the corresponding data, the arrange table positioning area 619 is cleared (step 4104), the unrepeated item data is displayed (step 4105) and the repeating application is executed (step 4106). Thereafter, a content similar to the content displayed on the arrange table positioning area 619 is printed out to the printer 204 (step 4203). Then, to advance the page to be displayed, "1" is added to the variable "P" (step 4204) and the process operation is returned to the step 4202. With the above-described process operation, the repeating application process is sequentially executed from 1 page to the succeeding pages, the contents of the display screen are updated until there exists the record of the relational table data 400, and also the contents same as those of the display screen are printed out by the printer 204.

In accordance with the above-explained preferred embodiment of the present invention, the table data in the two-dimensional format may be changed into forms having various sorts of layout by way of the interactive operation. In this case, the user can designate not only the record functioning as the base on the table format data, but also arbitrary records positioned before/after this record as the arrangement data. Furthermore, since the repeating display is carried out by sequentially skipping the records by only the width of the designated record, the data which extends over the plural records may be arranged on the form, and this data is repeatedly displayed to produce the form. Accordingly, the user can perform the form producing work involving the repeating display with flexibility and high efficiency.

As described above, as a result of the process operations defined at the steps 111, 112 and 113 shown in FIG. 1, the data extending over the plural records can be repeatedly displayed on the form. Furthermore, there are some possibilities to provide such a specific column in the form that a value of summation, or average for a plurality of data repeatedly displayed is written. A description will now be made of such a process operation for changing a layout of such a specific column as a subtotal, a total, and an average on a form. The process operation for changing the layout of the specific column is executed at the steps 121 and 114 after the steps 111, 112 and 113 shown in FIG. 1. In the following preferred embodiment, an explanation will now be made of a process operation for changing into a form with a desired layout based on an instruction by a user, with respect to a form arrangement data table 450 in order to display relational format table data 350 containing a total as a specific column in a form format, and to this relational format table data 350. The relational format table data 350 shown in FIG. 1 is stored into an external memory unit 208, and corresponds to such a table data that a total is added as a specific column to the previously shown relational table data 400. A construction of the relational format table data 350 is shown in FIG. 44. For the sake of simple explanation, both of the table format and the data content, which are different from the table data of FIG. 5 have been employed as the table data shown in FIG. 44. In other words, table data whose specific column contains plural sorts of totals is employed as a concrete example, and in particular, a process operation for changing the layout of the specific column will now be explained. The form arrangement data table 450 shown in FIG. 1 is data corresponding to the base record data 500 and the arrange information 600, and also is an initial value (information representative of an initial arrangement) for representing the table data 350 in the form format.

As indicated in FIG. 1, after the form has been displayed on the screen of the display 201 based on the relational format table 350 and the form arrangement data 450 (step 121), a layout change is performed based on the instruction of the user (step 114). During this process stage, a special form arrangement data table 1000 related to the layout of the specific column is produced and also referred. The step 114 is arranged by a step 122 at which the user designates the column whose layout is to be changed, a step 123 at which a designated place is identified and display data is separately managed, and furthermore a step 124 at which the layout of the display data is changed and the relevant portion is changed. Until there is no target to be changed, the process operations as defined at the steps 122, 123 and 124 are repeated.

Prior to an explanation of the process operation, a structure of the relational format table data 350 shown in FIG. 44 will now be described. The table data 350 is constructed of a column 330 on which a field name of data is arranged, and regions positioned under this column, for storing concrete data. As the concrete field name of FIG. 44, there are sales floor "321", goods "322", turnover "323", profit '324' and quantity "325". For instance, the data 331 of the top column represents that "as to the televisions sold at the first sales floor, a turnover amounts to 400,000 yen, profit thereof becomes 40,000 yen, and 4 sets of television are sold".

In the field name "record type" 326, such information as a subtotal, a total and an average, which indicates a speciality of the respective column data is stored. For example, since the column data 331 is normal data, the record type is "0". On the other hand, the column data 332 indicates the total for the first sales floor, since this data has a different meaning from the above-explained column data 331, the record type thereof becomes 1. Similarly, "2" indicative of the total is set to the record type of the column data 333. Actually, the record type is not displayed on the display. As shown in FIG. 44, since the total column and the subtotal column are not clearly distanced from the normal column in the display mode for the normal table data, a user cannot readily recognize the total column and the subtotal column from the overall table data. The specific data such as the column data 332 and 333 are displayed with different layout from that of the normal column data 331, so that the total column and the subtotal column can be easily seen as well as understood, which is an object of the present invention.

Next, a structure of the form arrangement data table 450 shown in FIG. 45 will now be explained.

Before explaining the regions 411 and 412, a table structure located under these regions will be described. In this table, the display position of the data displayed on the display 201 is stored in relation to the display content, and each of the columns 431, 432 and 433 corresponds to a unit of single data. The respective display data are arranged by the number 413 indicative of ID of this display data; the item type 414 for discriminating the line, text, mapping to indicate the relational format table data 350; and the size 415 for representing the width of the line in case of the line data, or the size of the display character in case of the character. Furthermore, the display data are constructed of coordinate values X0(416), Y0(417), X1(418), Y1(419) indicative of the position of the line, or the character displayed on the display 201; the repeating flag 420 for indicating whether the display data is one displayed on the screen, or is repeatedly displayed in a similar format; and the text/field name 421 for storing the corresponding field name in case that either the concrete text information for the text case, or the relational format table data 350 is pointed out.

It should be noted that the coordinate values 416 to 419 indicative of the display positions correspond to (X0, Y0), (X1, Y1) for the coordinate values of the line data at the starting point and the ending point. In case of the character data, the upper left point and the lower right point of the character data display position correspond to (X0, Y0) and (X1, Y1). For example, the display data of the column 433 represents the value of the field name "sales floor" in the relational format table data 350, and implies that the character having the medium size is outputted into the rectangular region defined by the upper left coordinate (20, 50) and the lower right coordinate (60, 70), and the data is repeatedly outputted in a similar form.

The record type 411 is such a value for indicating which record of the record type 326 among the relational format table data 350 is displayed when the above-described display data is actually represented on the display 201. In the example of FIG. 45, since "0" has been set to the record type 411, only the normal column data is displayed. In the interval 412, when such a display data where "ON" has been set to the repeating flag 420 is repeatedly displayed, an amount to sequentially move the display position on the display 201 along the lower direction (Y-axis direction) of the screen, is stored.

(4) Display of Form on Screen (step 121)

Figure 48:
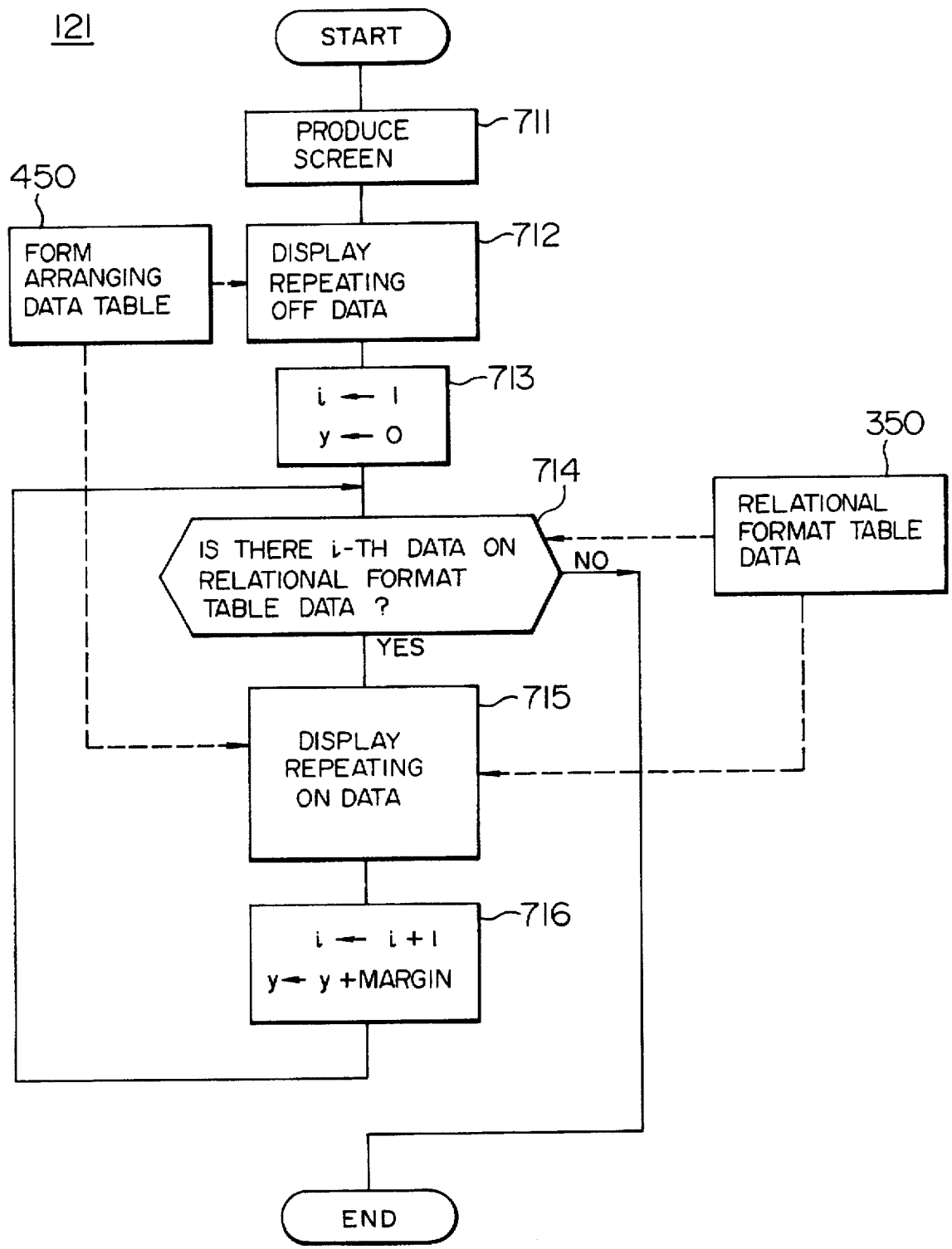
FIG. 48 is a flow chart for showing a display process sequence of an initial form.

At a step 121, a form with a layout similar to the relational format is displayed on the display 201 with employment of the above-described form arrangement data table 450 and relational format table data 350. A detailed process sequence of the step 121 will now be explained with reference to a flow chart shown in FIG. 48.

Figure 46:
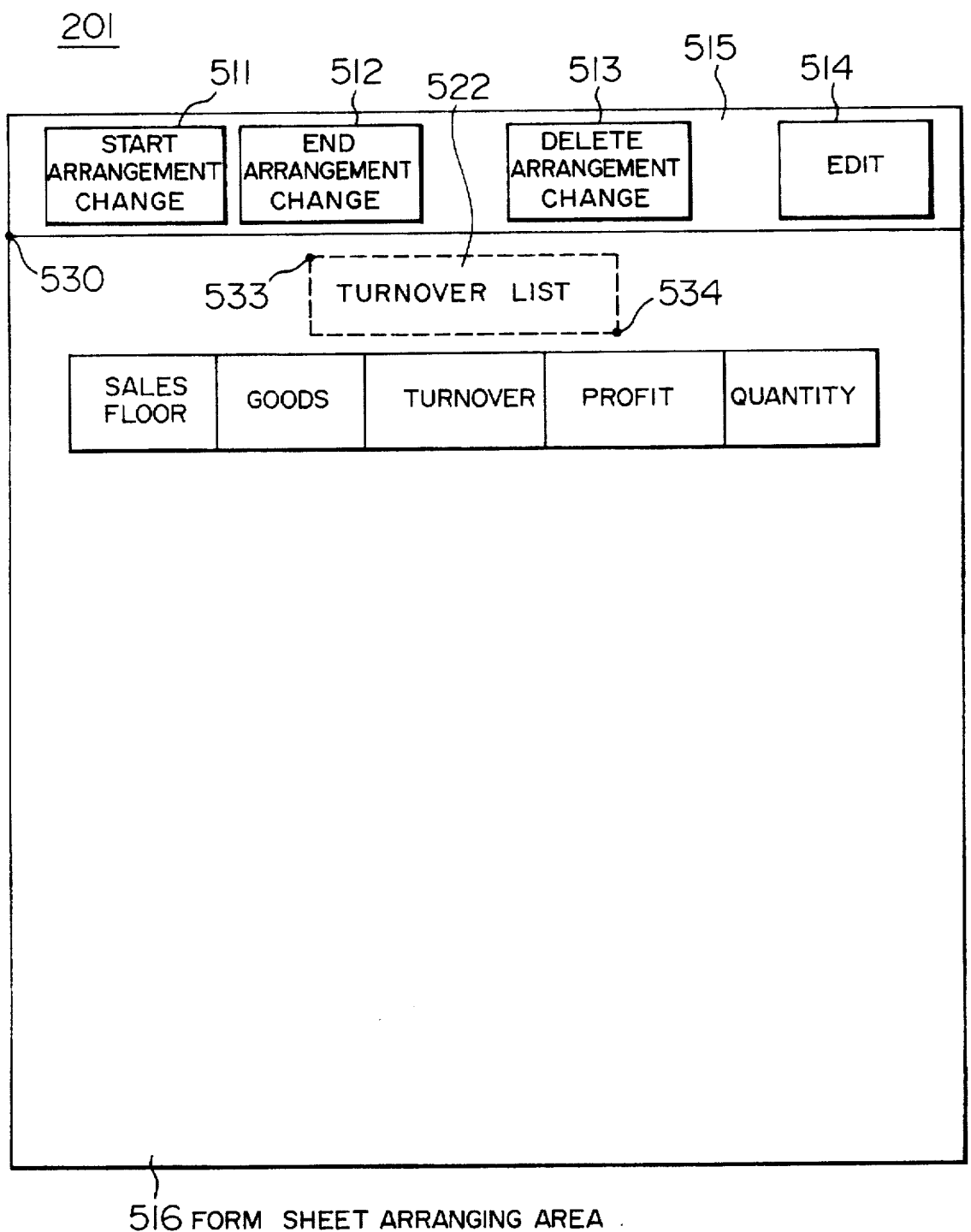
FIG. 46 is an example of a form display screen output.

A screen to display a form is represented on the display 201 at a first step (step 711). An example of this screen output is shown in FIG. 46. The screen is arranged by a command menu region 515 used to execute various functions of the system and an actual form display region 516. At a time when the process operation of the step 711 is executed, nothing is represented in the form display region 516.

Next, data whose repeating flag 420 is set to "OFF", is fetched from the form arrangement data table 450, and then is outputted to the form arrangement region 516 (step 712). An example of a screen output after this process operation is shown in FIG. 46. For instance, the column 432 of the form arrangement data table 450 shown in FIG. 45 represents that such a text whose repeating flag 420 is set to "OFF" and which indicates "a turnover list", is indicated within a rectangle defined by coordinate values (807) and (165, 23) of the form arrangement area 516. In the display example of FIG. 46, the coordinate positions 533 and 534 correspond to the rectangular coordinate values, and the actual menu string 522 is outputted into this rectangle. It should be noted that the point 530 indicates a coordinate origin (0, 0), the right direction shows a positive X-axis direction, and the down direction represents a positive Y-axis direction in the form display region 516. As described above, all of the data whose repeating flags 420 are set to "OFF" are represented. In the example of FIG. 46 both of the field name of the form and the line data used to separate the field names are represented as unrepeated data.

Thereafter, the display process for such a data whose repeating flag 420 is set to "0", is executed.

First, "1" is set to the program variable "i", and "0" is set to the program variable "y" (step 713). The variable "j" indicates which column data of the relational format table data 350 is to be displayed. The first column of this table data is set as the initial value. The variable "y" shows a correction amount of the display position along the Y-axis direction when the repeating data is displayed. A summation between this correction value and the coordinate value of the table 450 becomes the actual display position.

Then, a check is done whether or not there is data at an i-th column of the relational format table data 350 (step 714). If there is no data, then the process operation of the step 121 is completed. If there is data, then the data whose repeating flag 420 is set to "ON" is derived from the form arrangement data table 450, and then is outputted to the form arrangement region 516 (step 715). The process operation defined at the step 715 is similar to that of the step 712, but is performed in such a way that a value obtained by adding the value of the variable "y" to the values of the Y-axis coordinate Y0(417) and Y1(419), is used as the actual display position coordinate values. When the value of item type 414 is mapping, the data actually derived from the relational format table data 350 is such a data contained in the corresponding data to the column number indicated by the variable "i", and of the field 330 indicated by the value of the field name 421.

Figure 47:
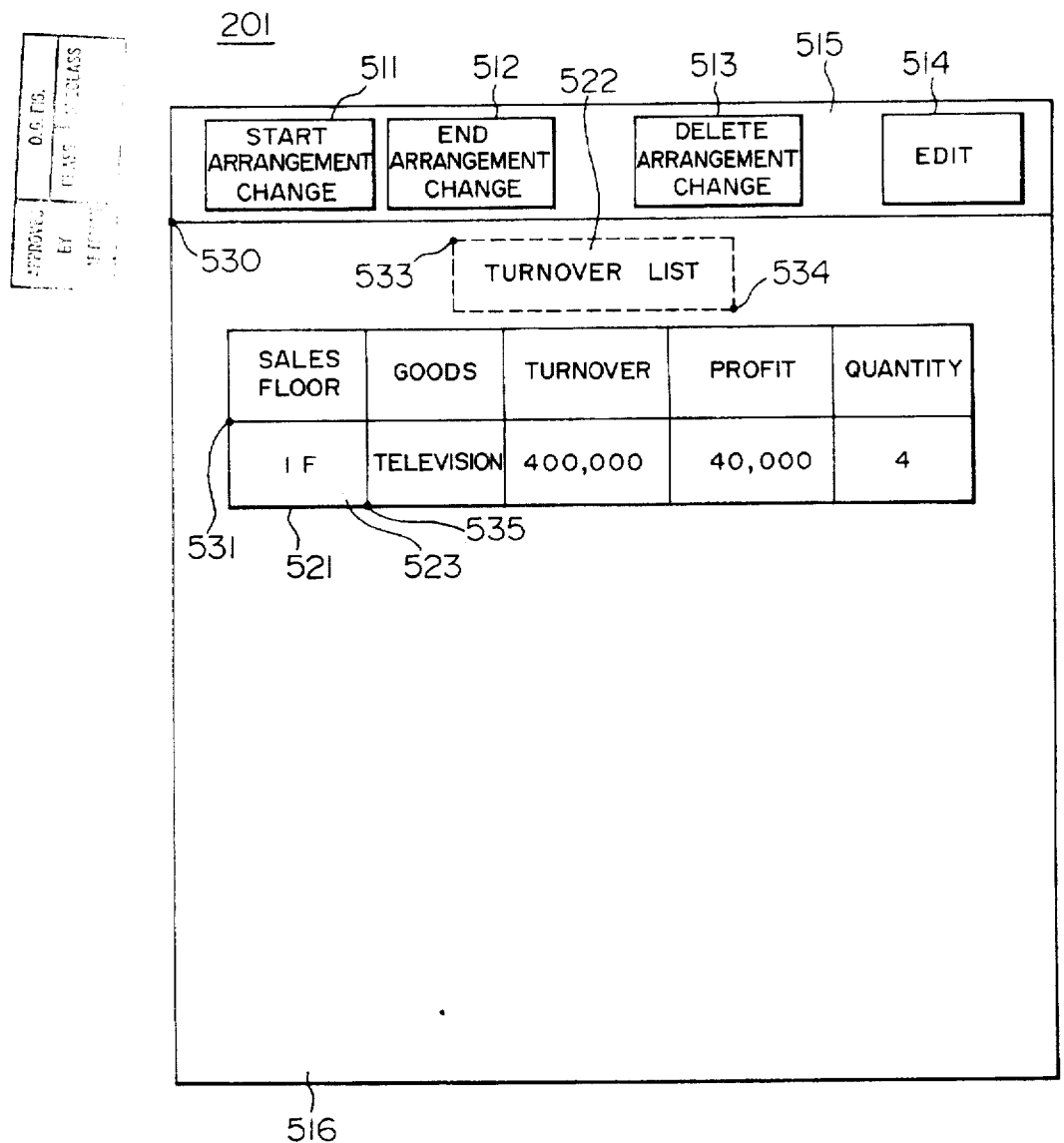
FIG. 47 is an example of a form display screen output.

Subsequently, 1 is added to the variable "i", so that the column to be displayed is advanced to the next column of the relational format table data 350, and the value of the margin 412 is added to the variable y (step 716). Thereafter, the process operation is returned to the step 714 at which a similar process operation is repeatedly performed. As a result, the values of the relational format table data are successively displayed on the screen. For instance, the column 433 of the form arrangement data table 450 is used to display the data appearing in the column of the sales floor 321. At a step 715, first column data "1F" is displayed within a rectangle (20, 50) and (60, 70) at a first stage, and second column data "2F" is displayed within another rectangle (20, 70) and (60, 90) at a second stage. An example of an output screen after the first process operation is completed is shown in FIG. 47. The first coordinate position (20, 50) and (60, 70) correspond to points 531 and 535, and the actual data value 523 is displayed on the coordinate position. The line data 431 corresponds to a segment 521.

(5) Update of Layout (step 114)

(5-1) Designation of Layout Update Column by Mouse Device (step 122)

In FIG. 49, there is shown an example of an output screen of the relational format table data 350 after the process operation defined at the step 121 has been executed. After the relational format table data has been displayed, the following layout updating operation is carried out for the displayed table data. First of all, a user inputs a target whose arrangement is changed by employing the mouse device 203 (step 122). The user designates such a column that is changed with its position on the screen of the display 201 on which the content shown in FIG. 49 is represented. At this time, the coordinate value (x, y) is entered by employing the mouse device 203.

(5-2) Discrimination of Designated place and Separate Management of Table Date (step 123)

Figure 50:
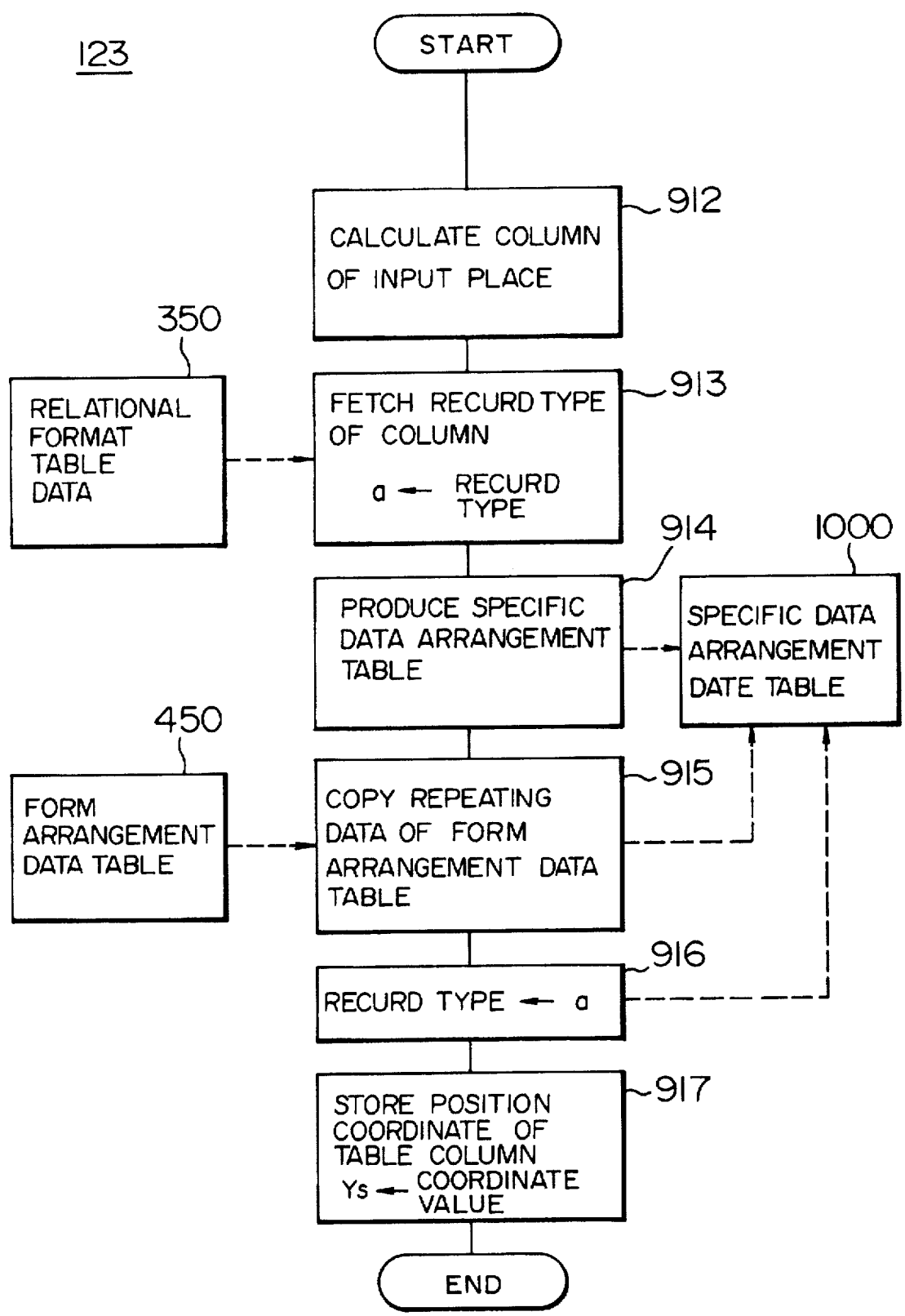
FIG. 50 is a flow chart for indicating a process sequence to identify a specified record an to separately manage arrangement information.

Next, discrimination can be established that the designated column corresponds to which column of the corresponding relational format table data 350 based upon the coordinate value designated at the step 122. The arrangement data on the discriminated column are separately managed by an exclusive table 1000 (step 123). A detailed process sequence of the step 123 will now be explained with reference to a flow chart shown in FIG. 50. First, it is recognized which column of the relational format table data corresponds to the place designated by the coordinate value inputted at the step 122 (step 912). At the step 912, when a designation by the mouse device 203 is made of the arrangement change start 511 for the screen command menu 515 after the step 122, the process operation thereof is initiated.

A calculation method for the column number of the table data corresponding to the inputted coordinate value will now be described. That is to say, the column number "n" is obtained by the following equation (4) based on the coordinate value (Xmin, Ymin) of the screen point 821, the coordinate value (Xmax, Ymax) of the point 822, and the repeating margin value 823 ($\Delta Y$):

$$n-[(y-Ymin+\Delta Y)/\Delta Y] \quad (4),$$

where brackets indicate Gauss' symbol, and only the integer part of the value at the right-hand term is substituted into the left-hand term.

The coordinate along the X direction may satisfy such a condition:

$$Xmin \leq x \leq Xmax.$$

If this condition could not be satisfied, and the calculated value of "n" would be smaller than "0", or would be equal to the actually not existing column number, the process operation is returned to the step 122 at which the coordinate value may be again inputted by using the mouse device. It should be noted that the coordinate values of the above-described points 821 and 822 may be simply obtained by deriving the maximum arrangement coordinate value and the minimum arrangement coordinate value from the data whose repeating flag 420 of the form arrangement data table 450 has been set to "ON". Symbol $\Delta Y$ denotes the value of the margin 412.

When the point 824 shown in FIG. 49 is designated by the user, the following concrete values are obtained:

(x,y)=(28, 120)

(Xmin, Ymin)=(20, 50)

(Xmax, Ymax)=(216, 70)

$\Delta y=20$ $n=[(120-50+20)/20]=[90/20]=[4-5]=4$

As described above, correct discrimination can be made such that which data corresponds to the data arranged at the place designated on the screen.

Thereafter, referring now to the relational format table data 350, the record type 326 of the data of the column number obtained at the step 912 is derived, and is substituted into the program variable "a" (step 913). The point 824 of the above-described concrete example corresponds to the 4th column of the table data 350, whose record type is 1.

Thereafter, a single specific data arranging data table 1000 is produced (step 914). As represented in FIG. 51, a structure of this table 1000 corresponds to such a structure that the column of the repeating flag 420 has been deleted from the form arranging data table 450 shown in FIG. 45. Then, only such data whose repeating flag 420 is set to "ON" among the data of the form arranging data table 450, is successively copied to the produced specific data arranging data table 1000 (step 915). Furthermore, the value of the variable "a" substituted at the step 913 is substituted into the record type 1001 of the specific data arranging data table 1000 (step 916). The table 1000 i8 to store as separate data, the arrangement data of the column such as the subtotal column and the total column, which have been designated as targets whose layouts are to be changed. Every time the user designates the layout change target, this table is produced in which the arrangement data similar to that of the normal column is set as the initial value of the table. In the following concrete example of the arrangement changing process, the content of the table 1000 is updated. Namely, the table 1000 is a work area used to update the layout.

Subsequently, the coordinate value of the upper boundary of the display range for the column along the Y-axis direction among the coordinate values of the display positions of the designated column, is substituted into the program variable Ys and then is stored (step 917). In the concrete example shown in FIG. 49, since the designated column is the column 831, the coordinate value of the point 825 along the Y-axis direction is stored into the program variable Ys. The program variable Ys is such an information required to check whether or not the update data designated on the screen when the arrangement change is performed, corresponds to the data contained in the previously designated column.

(5-3) Layout Update of Display Data and Application to Relevant Portion (step 124)

With the above-described process operation, the user can specify the data for designating the place on the display screen, so that preparation for updating the layout of the data located at the designated place can be completed. After the target whose layout should be changed has been designated, the actual layout updating process of the arranged data is carried out (step 124). A detailed process sequence of this step 124 will now be explained with reference to a flow chart of FIG. 52.

First, a user designates the content of the screen shown in FIG. 49 by way of the mouse device to select data about the target to be changed (step 1111). A check is done as to whether or not the selected place corresponds to the end arrangement change 512 of the command menu (step 1112). If the selected place is not the end arrangement change 512, then a check is done as to whether or not the designated place corresponds to the column whose layout is changed with reference to the specific data arranging data table 1000 (step 1113). In this process, the value of the program variable Ys stored in the step 917 is utilized. In the concrete processing sequence, the respective display data of the specific data arranging data table 1000 are derived in unit of one column, and a judgement is done whether or not the following condition can be satisfied with employment of the coordinate values 416 to 419 and the value of the variable Ys. It is assumed that the coordinate value inputted at the step 1111 is (x, y):

$$X0 \leq x \leq X1 \quad (5)$$

$$Y0+Ys \leq y \leq Y1 \leq Ys \quad (6)$$

If either of the above-described condition formulae (5) and (6) could be satisfied, then the data of the selected column is designated as the operation target. If there is no data that can satisfy both of these conditions in the specific data arranging data table 1000, the selection is made of the column which is not to be changed. Then, the process operation is again returned to the step 1111 at which a target designation is again carried out. When the above conditions are satisfied, the value of the number 413 corresponding to the place of the data that can satisfy the conditions is stored (step 1114). For instance, when the point 826 on the screen of FIG. 49 is selected as the target, since the column 1002 of the table shown in FIG. 51 can satisfy the conditions, the value "10" of the number 413 is stored. In the above-described process operation, since the line data has a priority when the character data is overlapped with the line data, the item type 414 sequentially derives the columns of "line". The derived line columns are compared with each other. Next, with respect to the "text" and "mapping", the columns are derived for a comparison purpose.

Figure 53:
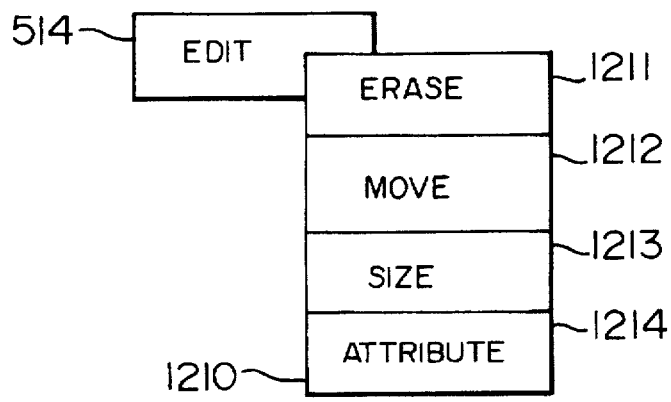
FIG. 53 schematically shows a display example of a sub-menu of an edit menu.

Subsequently, the user selects the operation content for the selected target from the screen. When the user selects an edit 514 of the screen command menu by employing the mouse device 203, a sub-command menu 1210 as shown in FIG. 53 is represented, and then the user selects a desirable sub-command from the menu 1210 by using the mouse device 203 (step 1115).

Figure 52:
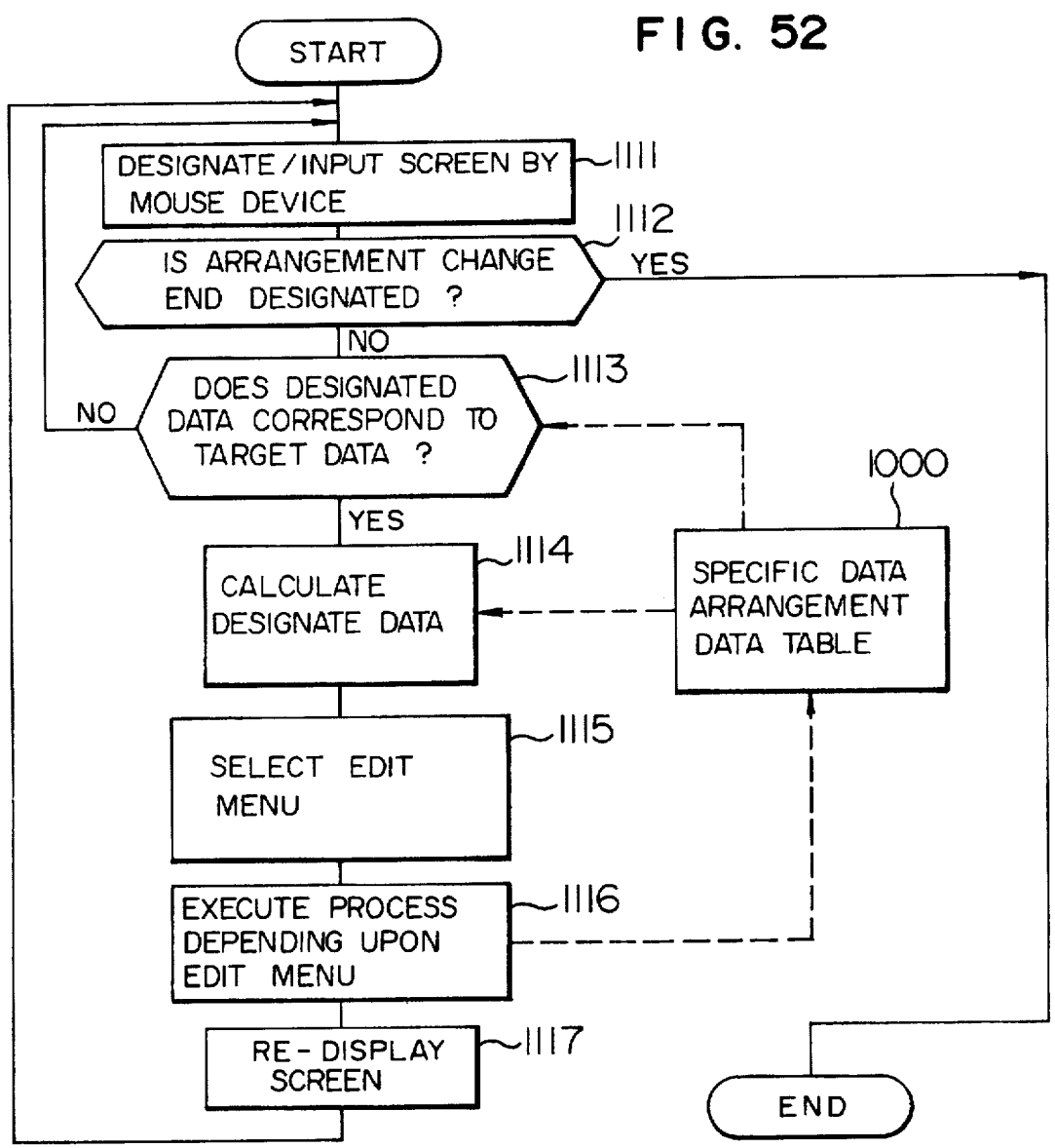
FIG. 52 is a flow chart for showing a process sequence to update arranging information.
Figure 54:
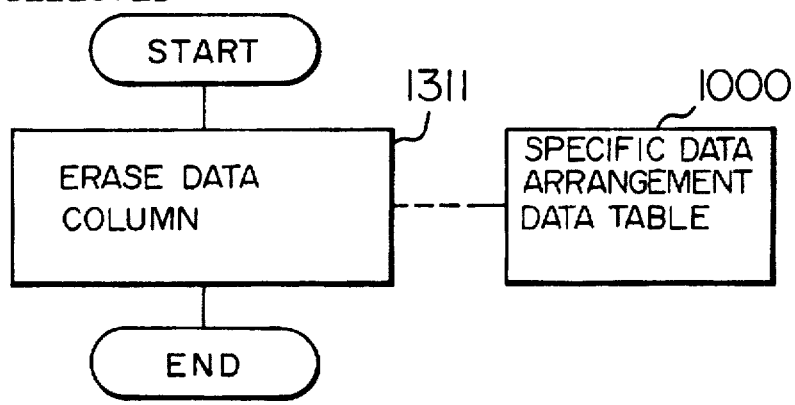
FIG. 54 is a flow chart showing a process sequence of a function to delete arrangement data.

Thereafter, a process sequence corresponding to the sort of the sub-command selected at the step 1115 is executed (step 1116). FIG. 54 shows a process sequence when a sub-command "Delete" 1211 is selected. The data on the column stored at the step 1114 is deleted from the specific data arranging data table 1000 (step 1301). For instance, if the point 826 shown in FIG. 49 has been already selected, the data on the column 1002 of FIG. 52 is deleted, and the data of the columns located below this column 1002 are sequentially shifted up and displayed.

Figure 55:
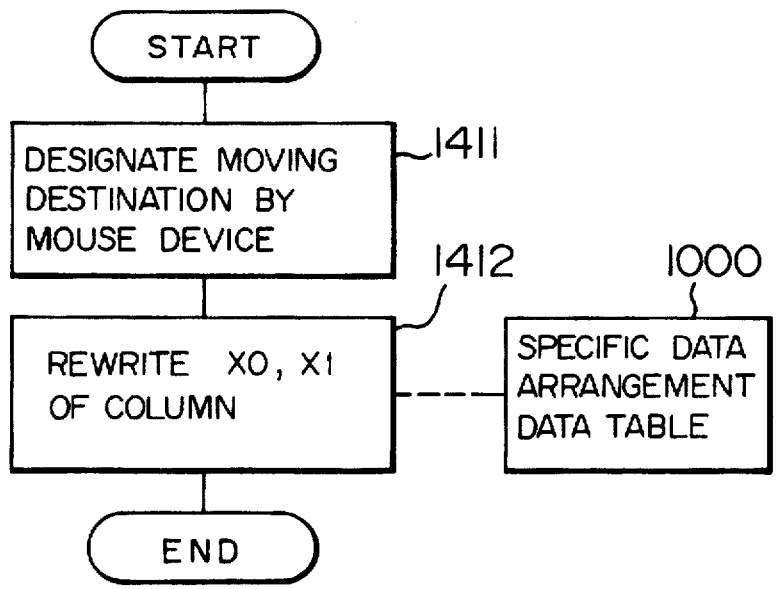
FIG. 55 is a flow chart for indicating a process sequence of a function to move arrangement data.

FIG. 55 shows a process sequence when a subcommand "Move" 1212 is selected. First, a user designates a left end position of the column to be moved on the screen by employing the mouse device 208 (step 1411). With employment of a coordinate value (X) of this left end position along the X direction, values of display position coordinates X0(416) and X1(418) of the columns to be moved are rewritten as follows (step 1412):

$$\Delta x = X - X O$$

$$X O = X$$

$$X 1 = X 1 + \Delta x$$

As a result, the display position coordinate is changed into such a data that the display position has been moved along the horizontal direction.

Figure 56:
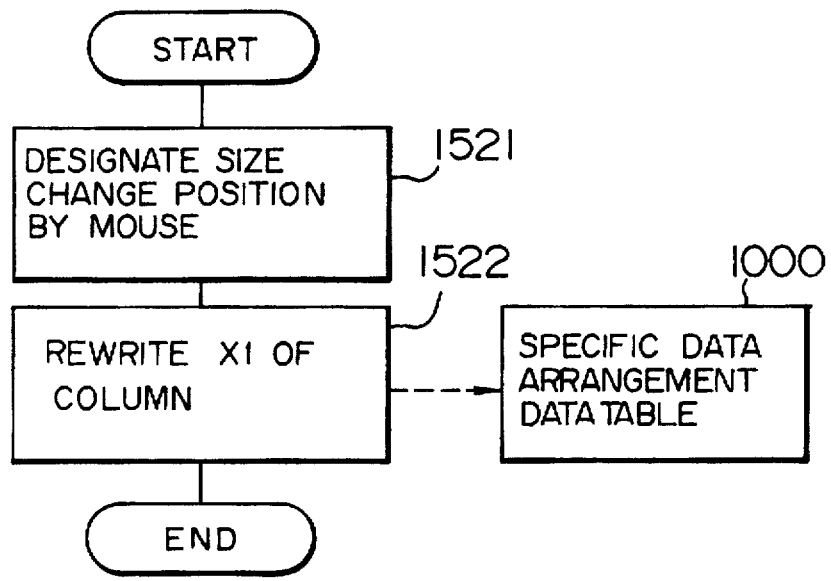
FIG. 56 is a flow chart for representing a process sequence of a size changing function of arrangement data.

FIG. 56 is a process sequence in case that a sub-command "Size" 1213 is selected.

First, a user designates a right end position of a column on the screen after the size has been changed with employment of the mouse device 203 (step IS21). With employment of a coordinate value (X) of this right end position along the X direction, the value of the display position coordinate X1(418) of the column to be changed is rewritten (step 1522). As a result, the coordinate value is changed into such a data that the position of the right end has been expanded/compressed along the horizontal direction.

Figure 57:
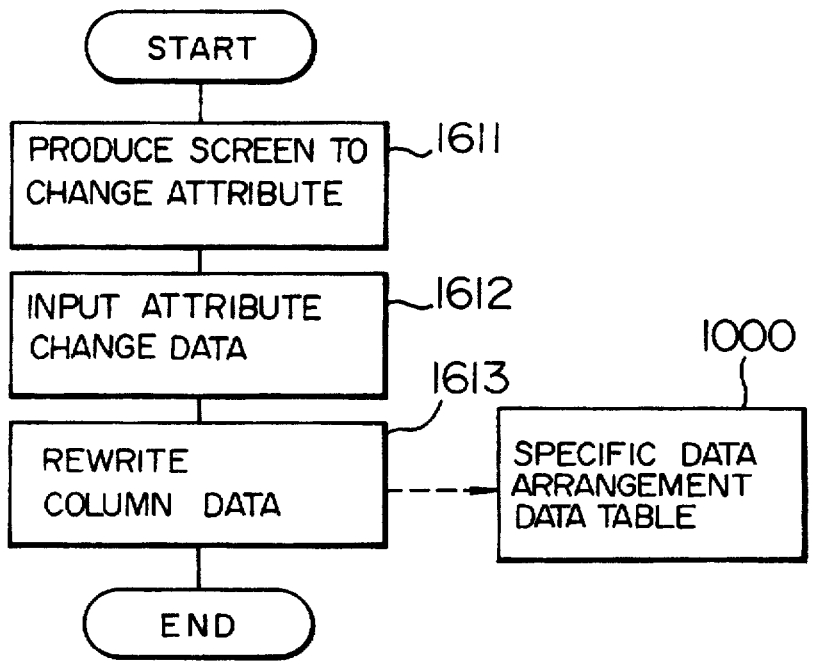
FIG. 57 is a flow chart for showing a process sequence of an attribute changing function of arrangement data.

FIG. 57 is a process sequence when a subcommand "Attribute" 1214 is selected.

Figure 58:
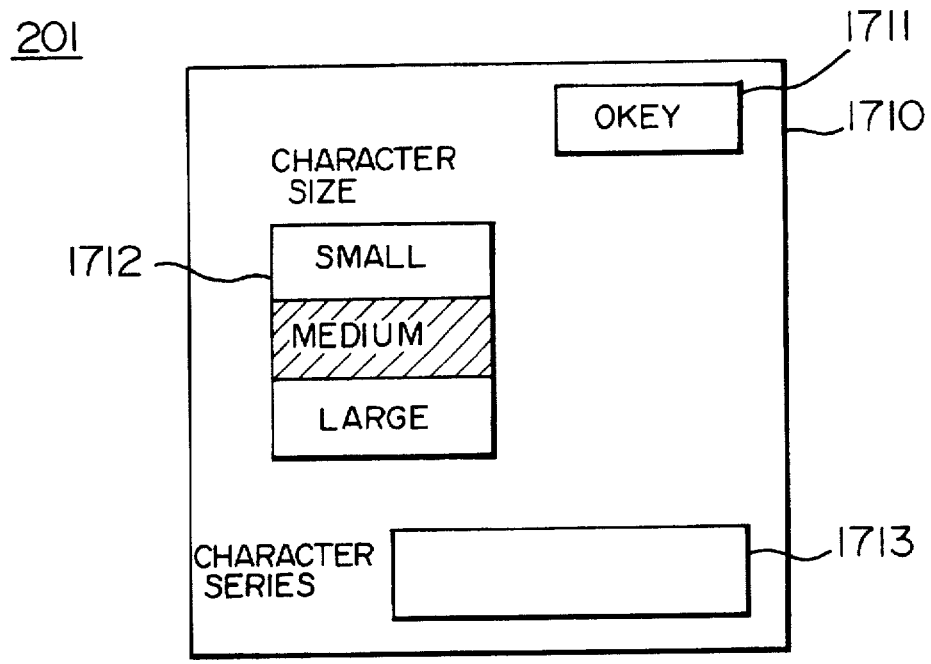
FIG. 58 schematically indicates an output example of an attribute changing interactive screen in case that arrangement data is a text.
Figure 59:
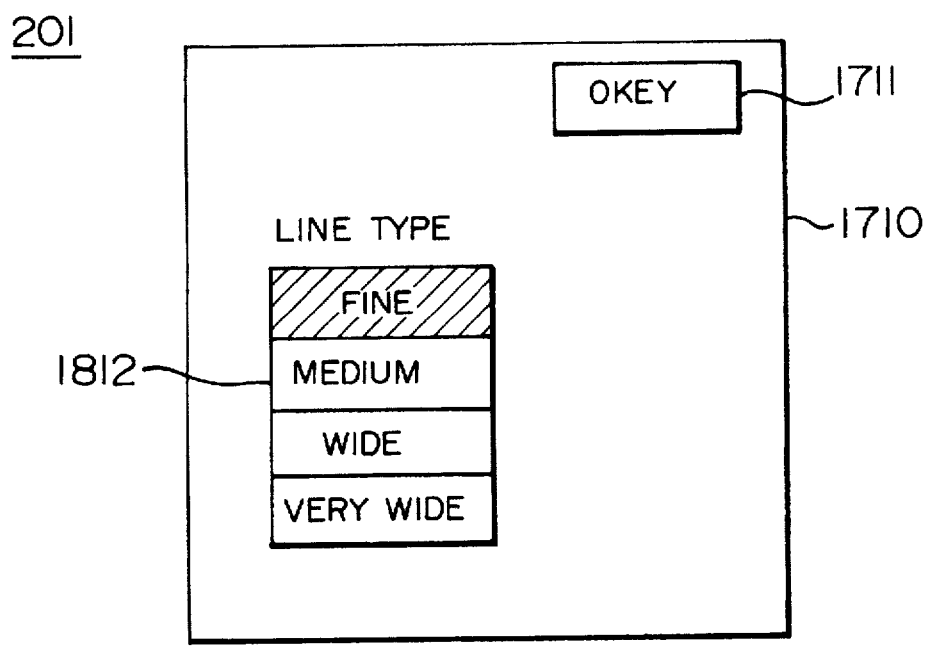
FIG. 59 schematically shows an output example of an attribute changing interactive screen in case that arrangement data is a line.

First, an attribute setting window 1710 as indicated in FIG. 58 or FIG. 59 is created on the display 201 (step 601). FIG. 58 is an example of such a window that the item type of the target column of the specific data arranging data table 1000, which has been identified at the step 1114 of FIG. 52, is either "text", or "mapping". In this FIG. 58, the setting value of the size 415 of the target column is displayed on the menu 1712 for the character size. In the concrete example of FIG. 58, "medium" is selected as the character size. When the previously designated target corresponds to the text, the text changing area 1713 is an area where the data on the actual menu string data 421 is displayed. On the other hand, FIG. 59 is an example of a window when the previously designated target is "line". In FIG. 59, the value of the line size 415 (namely, data indicative of a line dimension) is displayed on the menu 1812.

Next, the user changes the attribute value on the window shown in FIG. 58 or FIG. 59 (step 1612). The user selects the desirable attribute value from the menu 1712 or 1812 on the window by using the mouse device 203, otherwise inputs the data into the text 1713 with employment of the keyboard. Thereafter, if the user selects an accept 1711 of the menu by using the mouse device 203, the respective items corresponding to the content of the changed attribute value among the target column of the specific data arranging data table 1000 are updated (step 1613). Thereafter, the attribute updating window 1710 is detected from the screen. With the above-described process operation, the information about the character size of the designated character data and the size of the designated line may be updated.

Figure 60:
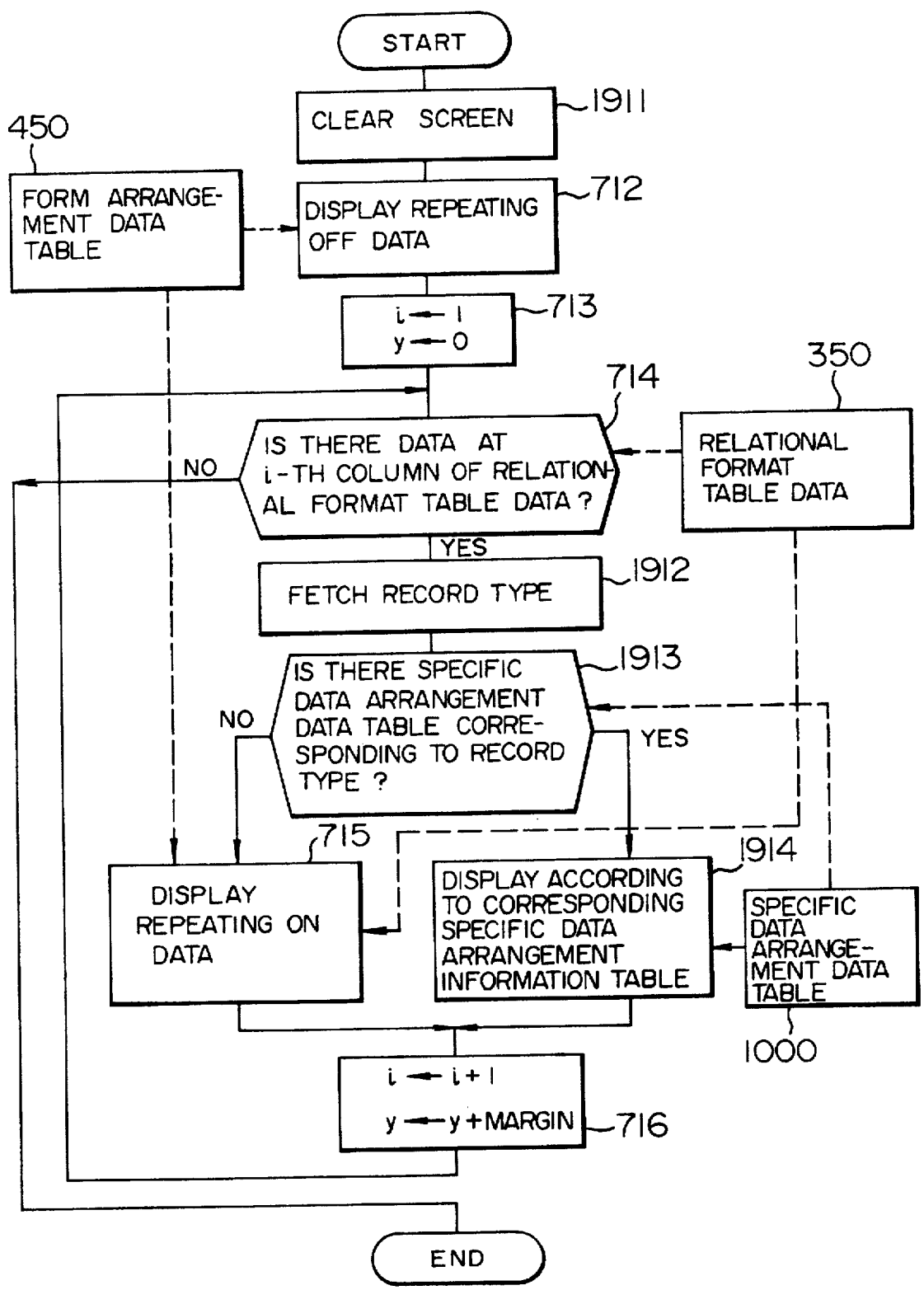
FIG. 60 is a flow chart for indicating a process sequence to re-display a form after arrangement data has been updated; and, FIG. 61 is an output example of a form after arrangement data has been updated.

After the process operations in accordance with the edit menu of the step 1116 has been executed, based upon the information updated at the step 1116, the layout of the actual display data is changed on the display 201 (step 1117). A detailed process sequence of the step 1117 will now be explained in accordance with a flow chart of FIG. 60.

First, after the form sheet arranging area 516 is cleared (step 1911), the data on the column whose repeating flag 420 is set to "OFF" is derived from the form arranging data table 450, and then is outputted to the form arranging region 516 (step 712). The process operation of this step 712 is identical to that as explained in FIG. 48.

Subsequently, "1" is set to the program variable "i", and "02" is set to the program variable "y" (step 713). The variable "i" indicates which column data of the relational format table data 350 is to be displayed. The first column is set as the initial value of the variable "i". The variable "y" is a correction amount of the display position when the repeating data is displayed along the Y-axis direction. A coordinate value to which this correction amount has been added, becomes an actually displaying position.

Then, a check is done as to whether or not there is data at an i-th column of the relational format table data 350 (step 714). If no data is present, then the process operation of the step 1117 is completed. To the contrary, if there is such a data, then the record type 326 of the i-th column of the table data 350 is derived (step 1912). A further check is done as to whether or not there exists such a specific data arranging data table 1000 having the value of the record type 1001 coincident with the value of this record type (step 1913). If there is no relevant table 1000, the data of the column whose repeating flag 420 is set to "0" is derived from the form arranging data table 450, and then is outputted to the form arranging region 516 (step 715). On the other hand, when there exists the relevant table 1000, the corresponding data is outputted from the specific data arranging data table 1000 to the form arranging region 516 (step 1914). The process operation of the steps 715 and 1914 is similar to that of the above-described step 712, in which the value obtained by adding the value of the variable "y" to the values of the Y-axis coordinates Y0(417) and Y1(419), is processed as the coordinate value of the actual display position. Also, if the value of item type 414 is "mapping", the data actually fetched from the relational format table data 350 is such a data contained in the data corresponding to the column number of the value indicated by the variable "i", and having the item 330 indicated by the value of the field name 421.

Next, 1 is added to the variable "i", the column to be displayed is advanced to the subsequent column of the relational format table data 350, and the value of the margin 412 is added to the variable "y" (step 716). Thereafter, the process operation is returned to the step 714 at which a similar process operation is repeatedly performed. As a result, the values of the relational format table data are successively displayed on the screen based upon the layout information corresponding to this record type.

(5-4) Addition of Arrangement Change (step 125)

As described above, after the form has been again displayed, the process operation is returned to the step 1111 at which a similar changing process operation is executed to other target. Thus, the layout for the column designated by the step 122 shown in FIG. 1 is continuously changed. Furthermore, when such a layout change is carried out for another column, as shown in the step 125 of FIG. 1, the process operation may be returned to the step 122.

FIG. 61 represents a display sample of a form whose layout has been changed by applying the above described process operation thereto. In FIG. 61, it is shown that the total columns of the respective sales floors and the total column of the overall sales floors are changed. A line indicative of the total column is represented with having a wide width, as compared with the width of the normal column, in order to induce an attention of a user.

In accordance with the above-described preferred embodiment, the user may change the layout information about the relational format table data on the display screen. When the layout changed by the user is, for instance, the total column, and the layouts of other total columns can be automatically changed and displayed in conjunction with this layout change. As described above, when the user changes one of the specific columns, and the portions thereof on the screen image, a plurality of portions having an attribute similar to that of this specific column are changed within one time. As a consequence, in case of the relational format table containing such a specific column data as a total and an average, the total and average portions can be displayed while having a different layout from that of other data by directly operating the screen image by the user. In other words, according to the present invention, such a form having a layout capable of being easily grasped and easily observed by the user can be simply produced.

In the above-explained preferred embodiment, the record type has been previously set to the respective columns of the relational format table data, whereby the total and the average columns are separated from other columns. As previously described, when the record type is provided with the respective column, for instance, the field name "if a turnover is higher than 100,000 yen, then the record type is set to "1", otherwise to "0", is applied to this preferred embodiment, the layouts of the columns whose turnover is higher than 100,000 yen can be distinguishably displayed.

Although the form is outputted on the display 201 in the above preferred embodiment, the form print may be readily realized by outputting the final display form obtained by the process sequence similar to the step 1117 to the printer 204. In this case, the print page control is performed in accordance with the process operation shown in FIG. 43.

We claim:

1. A method for generating a form from table format data by using a computer having an input unit, an output unit, and a memory unit for storing said table format data, comprising the steps of:

(a) displaying on said output unit said table format data and an output area for generating the form;

(b) generating the form by arranging data in a base row based on arrange information wherein the data corresponds to a plurality of fields designated on said table format data and repeatedly arranging data in other rows spaced from said base row based on said arrange information, into a designated place of said output area;

(c) changing an arrangement of specific data in a specific row in said generated form in said output area by an instruction issued from said input unit to dispose said specific data from a first location to a second location and thereby form a revised relational form of said table format data; and, (d) concurrently changing said other rows, in block, to dispose other specific data linked to said specific data by having a same attribute as said specific data wherein said other rows are rearranged to have said revised relational form.

2. The method of claim 1, wherein said step (b) comprises the steps of:

(b1) designating said base row on said table format data from said input unit;

(b2) designating said plurality of fields in said base row on said table format data from said input unit;

(b3) outputting data corresponding to said plurality of fields designated in said step (b2), into said designated place on said output area; and (b4) sequentially outputting data corresponding to said plurality of fields included in said other rows, into a place having a relative position from said designated place on said output area.

3. The method of claim 1, wherein said step (c) comprise the steps of:

(c1) outputting the form including a plurality of data generated at said step (b) and said specific data related to said plurality of data, to said output unit;

(c2) designating by said input device, said specific row including a group of said specific data on said form;

(c3) inputting from said input unit, information for changing said arrangement of group of said specific data designated in the step (c2), and changing said arrangement of said group of specific data based on said information; and (c4) changing an arrangement of another group of specific data having similar attribute information to said specific data designated in said step (c2) based on said information inputted in the step (c3).

4. A method for generating a form from table format data by using a computer, having an input unit, an output unit, and a memory unit for storing said table format data, comprising the steps of:

(a) displaying on said output unit, both of said table format data and an output area for generating the form;

(b) generating the form by inputting arrange information for arranging data corresponding to a plurality of fields in a base row designated on said table format data to form a first relational form of said table of format data; and, (c) repeatedly arranging other data, in block, in other rows positioned relatively from said base row based on said arrange information, wherein said other rows are arranged into a designated place of said output area comprising said first relational form.

\* \* \* \* \*